US012330066B1

United States Patent
Keppler et al.

(10) Patent No.: US 12,330,066 B1
(45) Date of Patent: Jun. 17, 2025

(54) JUST-IN-TIME GAME ENGINE FOR GAME WORLD DEVELOPMENT AND GAMEPLAY

(71) Applicant: RPG FUN, LLC, Menlo Park, CA (US)

(72) Inventors: Adam Keppler, Menlo Park, CA (US); Josh David Alpert, Los Angeles, CA (US)

(73) Assignee: RPG FUN, LLC, Menlo Park, CA (US)

( * ) Notice: Subject to any disclaimer, the term of this patent is extended or adjusted under 35 U.S.C. 154(b) by 0 days.

(21) Appl. No.: 19/009,016

(22) Filed: Jan. 3, 2025

(51) Int. Cl.
*A63F 13/67* (2014.01)
*A63F 13/58* (2014.01)

(52) U.S. Cl.
CPC .............. *A63F 13/67* (2014.09); *A63F 13/58* (2014.09)

(58) Field of Classification Search
CPC .................................. A63F 13/67; A63F 13/58
See application file for complete search history.

(56) References Cited

U.S. PATENT DOCUMENTS

| | | | |
|---|---|---|---|
| 2019/0362589 A1* | 11/2019 | Arnone | G07F 17/3244 |
| 2021/0146254 A1 | 5/2021 | Snodgrass et al. | |
| 2023/0147096 A1 | 5/2023 | Getselevich et al. | |
| 2023/0237348 A1 | 7/2023 | Polleri et al. | |
| 2023/0316000 A1 | 10/2023 | Mukherjee et al. | |
| 2024/0390801 A1* | 11/2024 | Ignatchenko | A63F 13/69 |

OTHER PUBLICATIONS

Convai Team, "Bringing NPCs to Life: AI-Driven Narrative Design in Unreal Engine and Unity", Convai Blog, Nov. 15, 2024, accessed at https://convai.com/blog/ai-narrative-design-unreal-engine-and-unity-convai-guide on Jan. 2, 2025, 10 pages.
Convai, "Embodied AI Characters for Virtual Worlds", accessed at https://convai.com/ on Jan. 2, 2025, 10 pages.
Google Gemini and Vertex AI, "Use AI to generate code with human language prompts", accessed at https://cloud.google.com/use-cases/ai-code-generation on Jan. 2, 2025, 8 pages.

(Continued)

*Primary Examiner* — Thomas H Henry
(74) *Attorney, Agent, or Firm* — Barnes & Thornburg LLP

(57) ABSTRACT

Disclosed are techniques for just-in-time (JIT) game development and gameplay. A system can include an oracle having AI models, the oracle being called by a game engine during JIT game development and JIT gameplay, and a data store that can be configured to store data field entries in encyclopedias that can be associated with JIT game worlds for respective players at their respective user devices. The game engine can perform a process including: receiving user input from a user device of a player, providing the JIT gameplay to the user device for presentation in one or more graphical user interfaces based on processing, by the oracle, the user input, and generating, simultaneously or in parallel, updates to the data field entries in an encyclopedia associated with the JIT game world for the player based on processing, by the oracle, the user input and the JIT gameplay.

30 Claims, 32 Drawing Sheets

(56) References Cited

OTHER PUBLICATIONS

IBM, "Code smarter, not harder: watsonx Code Assistant", accessed at https://www.ibm.com/products/watsonx-code-assistant?utm_content=SRCWWV&p1=Search&p4=43700079278200301&p5=e&p9=58700008656272267&gad_source=1&gclid=EAlalQobChMI5ITDuN3wiQMVLGhHAR0OzSTIEAAYAiAAEgL6NfD_BwE&gclsrc=aw.ds on Jan. 2, 2025, 5 pages.

Inworld Team, "Player agency, replayability & flow in video games", Inworld Blog, Nov. 29, 2023, accessed at https://inworld.ai/blog/player-agency-flow-in-video-games-replayability on Jan. 2, 2025, 11 pages.

Ludo, "Game Design & Ideator Hub: Effortlessly discover innovative ideas for your next hit game", accessed at https://ludo.ai/ideation on Jan. 2, 2025, 8 pages.

* cited by examiner

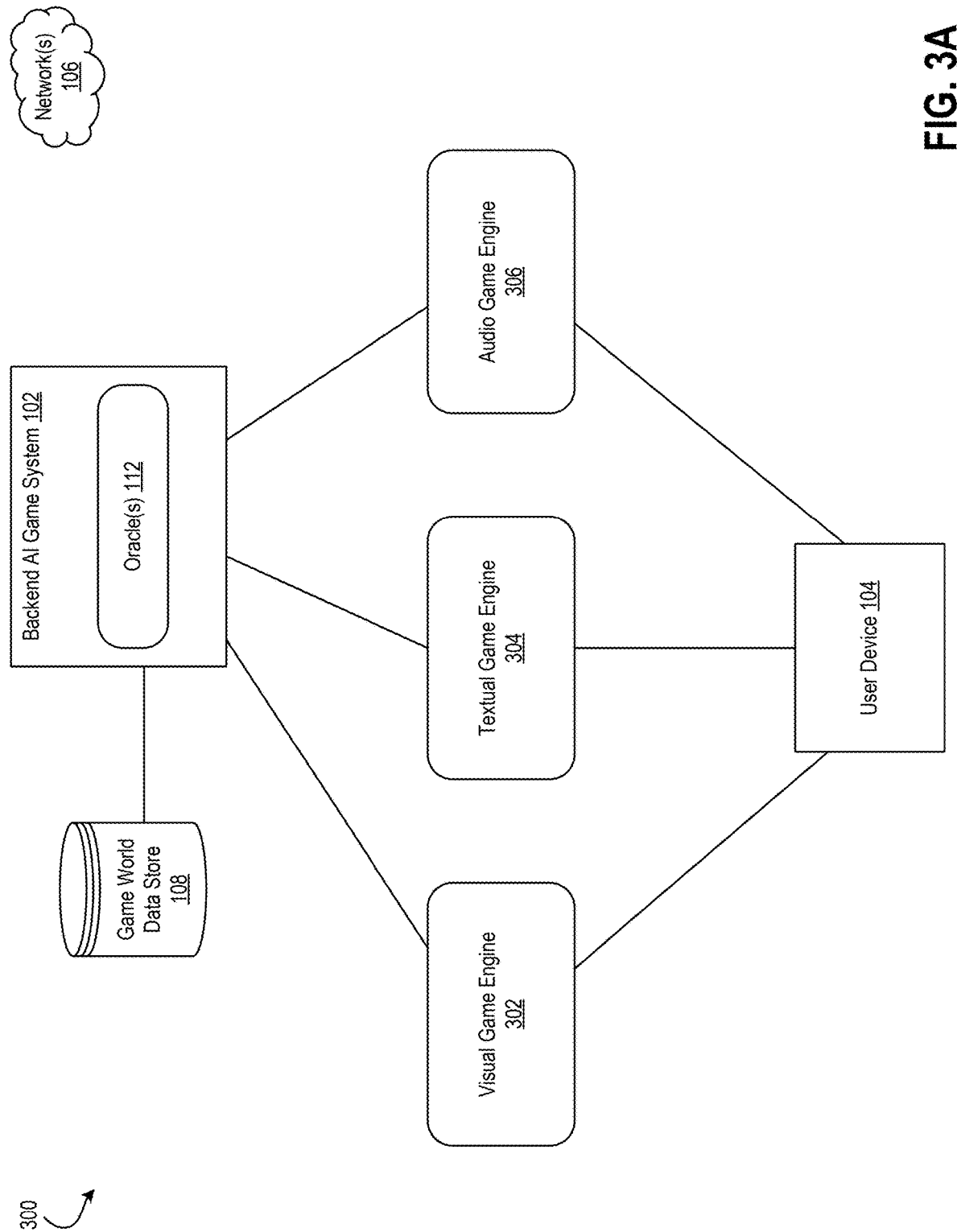

```
{
  "name": "Elaris Windwhisper",
  "class": "Rogue",
  "level": 3,
  "backstory": "Elaris grew up in a bustling port city, picking pockets to survive. Their natural charm and agility caught the attention of a local thieves' guild, where they learned their craft. Now, Elaris seeks redemption for their past deeds by using their skills to help those in need."
  "personality": None,
  "goal": None,
  "motivation": None
}
```

These are known/pre-determined fields that have not yet been populated

AI RPG Engine: Are we ready to fill in "personality"? — 902

AI (Oracle) Thinking: Yes, we can setup the personality based on backstory — 904

AI (Oracle) Final Answer: "personality": "Quick-witted and resourceful, with a knack for finding creative..." — 906

AI RPG Engine: Are we ready to fill in "goal"? — 908

AI (Oracle) Thinking: Not yet, we haven't fitted out enough details to know the character's goals — 910

AI (Oracle) Final Answer: "goal": None — 912

JUST-IN-TIME GAME ENGINE FOR GAME WORLD DEVELOPMENT AND GAMEPLAY

TECHNICAL FIELD

This disclosure generally describes devices, systems, and methods related to just-in-time (JIT) game world development and gameplay.

BACKGROUND

Game worlds, regardless of system, can require the developer to make pre-release decisions about content that can be seen or generated for a player. From visual and auditory elements to overarching narrative events and player actions, the developer can establish what the game system can use and/or render for the player in advance. Procedural generation and other such techniques can allow for the generation of a class of content, which is pre-defined and/or specified by the developer. This can limit scale and flexibility of content that can be generated, particularly narrative content and events in games or game worlds. Such limitations exist regardless of whether the game is delivered from a server or run client-side on a user computing device. Current systems offer narrative content that is limited to pre-established choices that follow well-defined branches.

SUMMARY

The disclosure generally describes technology for a game engine that takes on the form of an active game master (GM) and provides a player with JIT game world and gameplay, which is developed and generated in response to player interactions. The JIT world developed using the disclosed technology can require little to no prior development. Instead, games developed and played with the disclosed technology can be infinitely re-playable, uniquely tailored to a player's preferences, and continually evolving as the player plays the game. In some implementations, the game engine can be powered using artificial intelligence (AI) models, processes, and/or operations.

One or more embodiments described herein can include a system for just-in-time (JIT) game development and gameplay, the system including: a game engine, an oracle having one or more AI models, the oracle being called by the game engine during JIT game development and JIT gameplay, and a data store that can be in network communication with the game engine and can be configured to store data field entries in encyclopedias that may be associated with JIT game worlds for respective players at their respective user devices. The game engine can be configured to perform a process including: receiving user input from a user device of a player, providing the JIT gameplay to the user device for presentation in one or more user interfaces (UIs) based on processing, by the oracle, the user input, and generating, simultaneously or in parallel, updates to the data field entries in an encyclopedia associated with the JIT game world for the player based on processing, by the oracle, the user input and the JIT gameplay.

In some implementations, the embodiments described herein can optionally include one or more of the following features. For example, the updates to the data field entries in the encyclopedia associated with the JIT game world can be generated in parallel with providing the JIT gameplay to the player at the user device. The updates to the data field entries in the encyclopedia associated with the JIT game world can be generated as background processes while providing the JIT gameplay to the player at the user device. The oracle can include one or more large pre-trained AI models or systems. Providing the JIT gameplay to the user device for presentation can include providing instructions to the user device to cause the user device to visualize the JIT game world in the UIs.

As another example, the process further can include simultaneously or in parallel to transmitting, to the user device, the instructions for visualizing the JIT game world, updating one or more of the data field entries in the encyclopedia associated with the JIT gameplay based on the user input. The process may also include simultaneously or in parallel to transmitting the instructions for visualizing the JIT game world, trimming, using the oracle, a context of the JIT gameplay, and transmitting a transitional message for presentation at the user device. Sometimes, the data field entries in the encyclopedia associated with the JIT gameplay can include at least one of a game environment data, player data, nonplayer character data, game events data, game locations data, plot hooks data, or narrative state data. Sometimes, providing the JIT gameplay to the user device for presentation can include: checking whether a transition between game modes is required, and in response to checking that the transition between the game modes is required, changing one or more system behaviors. The game modes can include one or more from a group consisting of: a game setting setup mode, a character creation mode, a narrative gameplay mode, and a combat mode.

As yet another example, generating the updates to the data field entries in the encyclopedia associated with the JIT game world can include: looping through one or more of the data field entries in the encyclopedia that can be stored in the data store, populating, by the oracle and based on the looping, one or more basic fields in the encyclopedia, upserting, by the oracle, one or more well-defined objects in the encyclopedia, processing, by the oracle and based on the looping, hash-table data structures to update one or more entries in the encyclopedia, processing, by the oracle and based on the looping, a list to update one or more indexed data entry fields in the list, and returning information about the one or more data entry fields. Processing, by the oracle and based on the looping, the hash-table data structures can include: checking for existing keys, checking for new keys, and looping through the existing keys or the new keys to update one or more data entry fields associated with the existing keys or the new keys. Processing, by the oracle and based on the looping, the list can include: establishing a change plan, looping through the change plan, and processing each of the one or more indexed data entry fields in the list/array based on the change plan.

In some implementations, providing the JIT gameplay to the user device can include: receiving user input about rolling dice, and in response to the user input, initiating, by the oracle, a corresponding roll request. The oracle can be configured to identify whether a game master (GM), a player, or a non-player character (NPC) is rolling the dice. Based on identifying that the GM or the NPC is rolling the dice, the game engine can be configured to automatically roll the dice. Based on identifying that the player is rolling the dice, the game engine can be configured to transmit the roll request to the user device that causes the user device to present, in the one or more UIs, information about a specific dice roll. The roll request can include a title and description of the dice roll to contextualize the request to the player at the user device. The game engine can be configured to automatically link an outcome from the dice roll with one or more of the data entry fields in the encyclopedia. The one or more data entry fields can correspond to one or more of an ability, an effect, and an item in the JIT game world.

Sometimes, the game engine can be further configured to: annotate entities in the JIT game world with universally unique identifiers (uuids), and link the uuids to a database or a knowledge graph to establish data connections between actions in the JIT game world during the JIT gameplay, the entities in the JIT game world, and the user input. The game engine can be further configured to establish a game marketplace for publishers and the players to produce encyclopedia game states. The encyclopedia game states can be traded, shared, sold, and/or provided to the players in the marketplace. The encyclopedia can include a game representation for the JIT game world. The process further can include: receiving a document having information for establishing the encyclopedia, converting the document into a markdown representation, populating the data field entries in the encyclopedia based on the markdown representation, and plugging the markdown representation into an architecture of the game engine to be played by the player at the user device. The process can also include: providing the JIT gameplay to a group of user devices, the group of user devices including the user device, and attributing actions and inputs to players of the group of user devices to enforce narrative consistency during the JIT gameplay in the JIT game world for the players of the group of user devices.

One or more embodiments described herein can include a method for just-in-time (JIT) game development and gameplay, the method including: receiving user input from a user device, providing JIT gameplay to the user device for presentation in one or more user interfaces (UIs) based on processing, by an oracle, the user input, and generating, simultaneously or in parallel, updates to a JIT game world based on processing, by the oracle, the user input and the JIT gameplay.

The method can optionally include one or more of the abovementioned features and/or one or more of the following features. For example, generating the updates to the JIT game world can include updating one or more data field entries in an encyclopedia that may be associated with the JIT game world. Providing the JIT gameplay to the user device for presentation can include: identifying a current game mode in the JIT gameplay, checking whether a transition may be required between the current game mode and a next game mode, and in response to determining that the transition may be required, transmitting a notification for presentation at the user device indicating that the transition may occur while providing the JIT gameplay to the user device for presentation. Generating the updates to the JIT game world can include: looping through one or more data entry fields in an encyclopedia, populating, based on the looping, one or more basic fields in the encyclopedia, upserting one or more well-defined objects in the encyclopedia, processing, based on the looping, hash-table data structures to update one or more entries in the encyclopedia, processing, based on the looping, a list to update one or more indexed data entry fields in the list, and returning information about the one or more data entry fields. Sometimes, the method can also include: providing the JIT gameplay to a group of user devices, the group of user devices including the user device, and attributing actions and inputs to players of the group of user devices to enforce narrative consistency during the JIT gameplay in the JIT game world for the players of the group of user devices.

The devices, system, and techniques described herein may provide one or more of the following advantages. Traditional gaming systems may be used to generate and provide character interactions with a player based on the player's actions and/or audio or textual inputs. The traditional systems exhibit technical problems in that they do not provide fast, efficient, and automated JIT game world development and gameplay to the user to provide continuous and instantaneous gameplay. The disclosed technology provides technical solutions to such technical problems.

For example, the disclosed technology provides a non-fixed gaming structure that allows for the development of rules, lore (game history), locations (game maps), characters, events, and unrestrained player interactions in a JIT game world. The disclosed technology's architecture can facilitate interaction between an automated/autonomous system and the player, cataloguing, and guiding gameplay and game development with sufficiently low overhead, so as to bring expansive elements of world creation and development out of pre-development and into gameplay subject to player discretion. As a result, the disclosed technology provides for autonomous game world creation and maintenance throughout gameplay by a player. Human Game Mastering for Tabletop Role Playing Games (TTRPG) player conversations can now through the disclosed technology be conducted between a Computer Role Playing Game (CRPG) and its human player for autonomous creation of game worlds, taking what would traditionally be early development conversations in a game development studio and incorporating them into the gameplay experience, allowing for hyper-personalization with the disclosed technology. The disclosed technology can also set a level of rule enforcement based on an initial player choice (e.g., difficulty level) and maintain game consistency and rules throughout the game, which an AI system alone is unable to do. The AI of the disclosed technology can make choices to customize and/or tailor gameplay to the player's preferences as the game emerges and/or gameplay progresses. For example, the game engine of the disclosed technology can curate a soundtrack, font selections, sound effects, animations, and/or image/video/three-dimensional (3D) Model/Scene layout development based on specific aspects of the gameplay that are gleaned from the user inputs, player interactions with the current game world, and past gameplay, and any combination of other data that is generated for the game world. Similarly, the disclosed technology can impose dice rolls on a player and leverage internal sub-systems of the disclosed system to make its own rolls, thereby introducing a traceable level of non-determinism to the JIT gameplay. As a result, the disclosed technology allows for the full creation and management of a game in such a way that traditional computer game development and game engines cannot.

The disclosed technology also performs data processing in parallel while providing output to the player and managing player interactions. The disclosed system can be predominantly network/server-bound waiting for the AI to respond, as such issuing as many requests in parallel as possible, which can be beneficial to reduce processing time and turnaround. Such parallelism also allows for the AI to work more accurately and efficiently in part by processing smaller tasks. AI 'needle-in-a-haystack' and 'multiple-needle-in-a-haystack' tasks demonstrate that AI systems can have a finite amount of attention or intellectual capacity that can be applied per task. Thus, performance may diminish not just as context size grows, but also as an amount of relevant information in the context grows. As such, the more directed and limited a question, query, task, and/or prompt is to the AI, the higher the likelihood of a high-quality response due to a better utilization of the AI's available attention/capacity towards meaningful part(s) of the task. Moreover, contemporary AI has a tendency to impose limits on the length of the answer that can be provided in response to a query/prompt. As such, use of multiple requests can lead to not only superior quality, but also richer/longer generations. By constructing tasks/requests to the AI to benefit from the abovementioned attributes, both quality and latency can be improved over naïve or direct use of the AI. Furthermore, traditional game development and systems may not use AI, and require these decisions, designs, and operations to be performed by a human. The disclosed technology leverages the AI to focus on managing many individual tasks to power a responsive and interactive system. Similarly, as the queries to the AI are simplified using the disclosed approaches, smaller models can often be used to solve such queries well and while maintaining reasonable costs due to the associated lower per-token cost. The disclosed system can make use of variable amounts of compute to improve the quality of inferenced generations and a combination of techniques, thereby maximizing the efficacy of its components and including those that may leverage AI.

As another example, the disclosed game engine can exhibit agentic behavior. The engine may act not just as an interlocutor, but rather, as an orchestrator and director to provide JIT game world development and gameplay. AI can be plugged into a variety of areas in the disclosed system that would traditionally require large amounts of human-based coding and development. By building a balance of flexibility and structure into the disclosed system's code surrounding the AI, the disclosed technology can provide rigor that is commonly absent from large language models (LLMs) and large multimodal models (LMMs), while leveraging the LLM/LMMs intelligence as a replacement for coded intelligence. As a result, the disclosed technology provides a technical solution for existing gaming systems in the form of an AI-integrated system/architecture. This structure allows for lightweight and efficient processing of large amounts of data to ensure continuous and instantaneous gameplay for a player. While human game masters can perform a similar task, they do not offer a scalable on-demand solution. Existing game engines are also incapable of offering a dynamic free-form dialogue, much less game-world development in real-time based on the contents of the conversation, due to the requirements of establishing the game world in advance of release/deployment.

Similarly, the disclosed system proposes a series of new augmentations to the markdown markup language, which allow the AI to both receive and generate richer content. Accordingly, the disclosed technology enables new kinds of functionality and information transmission via these enhancements, such as allowing for dynamic generation and inclusion of dice rolls, font choices, text animations, use of animated gifs, sound effects, image, video, 3D-model/scene, and/or improved contextualization and information retrieval capabilities. Specifically for contextualization and information retrieval, relevant entities can be annotated with their universally unique identifier (uuid). The AI and other parts of the disclosed technology can then disambiguate between similarly named or described items via the uuid, request additional info about the entry via the uuid, and/or identify the uuid as part of various actions, such as die-rolls. Incorporation of the uuids, is one of the markdown expansions. These uuids can also be linked to a knowledge-graph, vector database, and/or other information storage and retrieval system further improving the disclosed system's ability to draw connections between active messages and earlier points in the conversation or other elements in the game world. The disclosed technology is also capable of using the AI and information storage and retrieval system, typically a vector database, to annotate user messages with the correct ids for entries included in the message/output. This can expand beyond contemporary Retrieval Augmented Generation (RAG) and Graph-RAG systems by allowing direct lookup operations driven by the AI through the markdown embedding of links into the AI prompts and generations allowing for a new kind of RAG, which can be called or referenced herein as Associative Retrieval Augmented Generation (ARAG), in which associative refers to the associative (direct) lookups allowed by the disclosed approach. These markdown mechanics allow for ARAG and can fulfill both client-side (e.g., frontend graphical) roles in addition to the backend (server-side) roles. Moreover, the uuid can enable associated text to become a link to a full record via the direct associative retrieval of an associated object, which can be shown to the player. The interface or presentation to the user can therefore be mirrored with the presentation to the AI, allowing for a consistent and intuitive means for interaction between the user and AI. The direct embedding of the link in the text can allow for associative (direct) lookups beyond the similarity lookups common of traditional RAG and/or Graph-RAG. In some implementations, the processing of the markdown enhancements may require the use of one or more language recognition and processing techniques, such as grammars, regex with or without stacks, lexical analyzers/parsers, and/or syntax analyzers/parsers. These techniques can dramatically improve the range of capabilities and reliability of interactions with the AI.

Beyond direct message(s) through the conversational interaction with the player, the disclosed technology can provide User Interfaces (UI) (e.g., graphical user interfaces or GUIs) that can enable the information from the AI to be represented in easily understandable, convenient, and contextualized manner for the player. The system can allocate results of one or more interactions into their correct functional role in the game world, thereby determining what type of content the response represents and may be associated with and how it should be represented in UIs to the player. For example, a game world can contain characters and items, and each of those objects can contain attributes. The disclosed system can track which attribute and respectively which parent object the attribute is linked to. For example, if the system is setting a cost attribute for an item, the system can track which item is being updated, which character or location has the current item, and then determine how to present this information as part of the item view system separate from the main conversation in the UIs described herein. The game world can require the storage and construction of many background elements to ensure consistency over the course of gameplay, this information often being hidden from the player or at the very least kept outside of a main view to avoid cluttering the UI. As such, the player may rarely be aware of a number of calls or complexity of parallel operations ongoing in the background. As such, the disclosed system can be interacted with on a small or handheld screen, as well as on a larger computing devices, etc. Additionally, translation of outcomes from these complex algorithms, AI, and/or models through the UIs can improve comprehension of considerable quantities of highly processed data and user input.

The details of one or more implementations are set forth in the accompanying drawings and the description below. Other features and advantages will be apparent from the description and drawings, and from the claims.

BRIEF DESCRIPTION OF THE DRAWINGS

FIGS. 3A and 3B illustrate example system diagrams of system components that can be used to perform the disclosed techniques.

FIG. 9 is a conceptual diagram of a process for updating structured objects or an encyclopedia component through interaction between a backend game system, its architecture, and/or one or more oracles.

FIGS. 12A, 12B, 12C, 12D, and 12E illustrate example UIs for a player who makes text transitions and animations in the game world using the AI game engine described herein.

Figure 1:
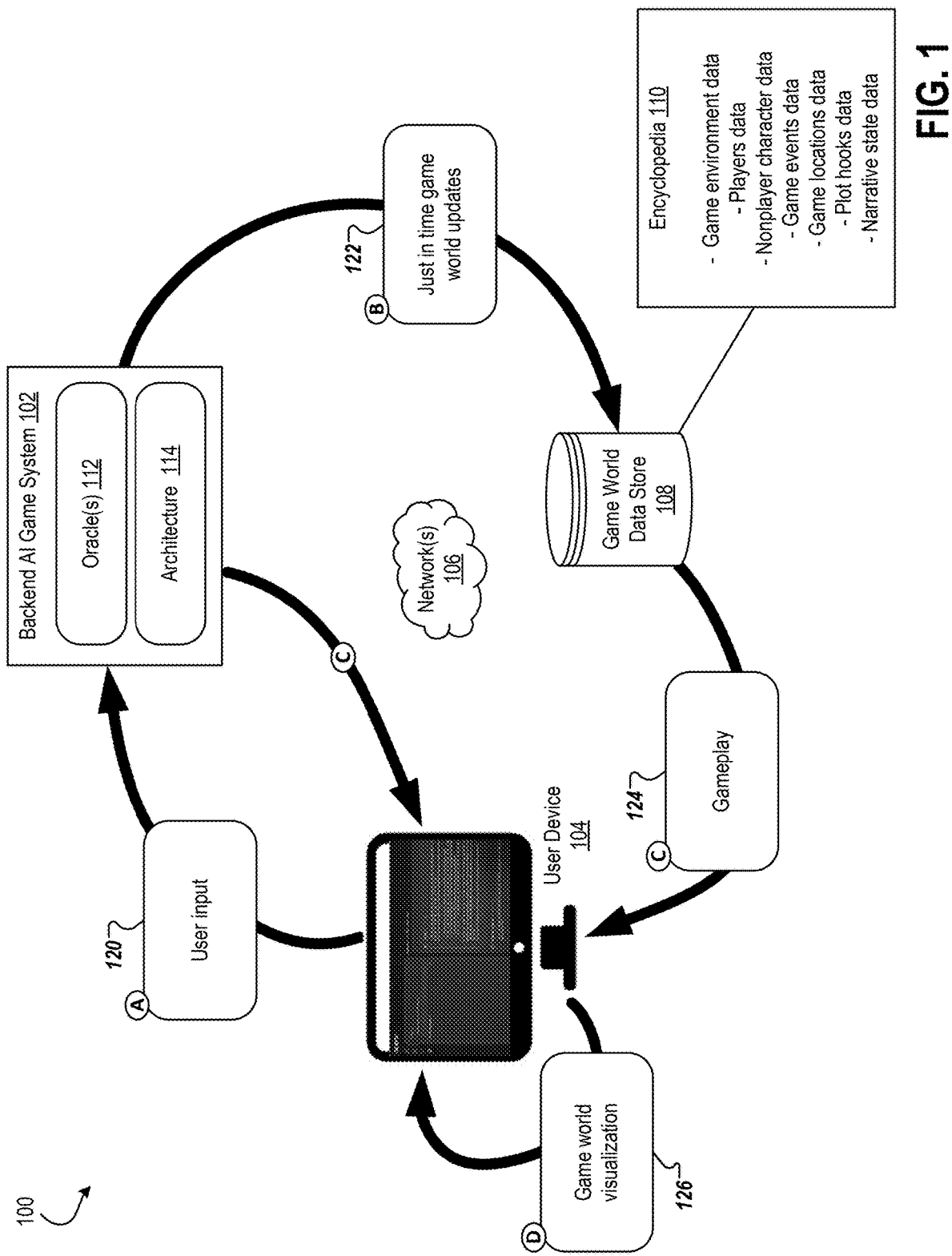
FIG. 1 is a conceptual diagram of JIT game world development and gameplay.

In the present disclosure, like-numbered components of various embodiments generally have similar features when those components are of a similar nature and/or serve a similar purpose, unless otherwise noted or otherwise understood by a person skilled in the art.

DETAILED DESCRIPTION OF ILLUSTRATIVE EMBODIMENTS

This disclosure generally relates to JIT game world development and gameplay using a game engine. The game engine can use/leverage one or more AI-based models, processes, operations, and/or techniques. For merely illustrative examples, the disclosure herein is described from the perspective of an AI game engine, although the disclosed techniques can also be performed using other types of game engines. The disclosed technology can be configured to create game worlds in the moment as the world and features within the world are required and while a player is interacting with the world and features therein. For example, rules, characters, buildings, or other aspects of the game world can be generated in the moment as a player is interacting with or acting in the world. Since nothing exists in the world, the disclosed technology can generate and update/modify any elements in/of the world as they come up in the world during gameplay.

Herein are definitions of one or more terms that may be used to describe the disclosed technology. The definitions are not intended to be limiting and are merely illustrative examples of the terms used to describe the disclosed technology. A setting can refer to a world, universe/multi-universe, dimension(s), and/or other environment where a game may take place. A game master (GM) can refer to a person running the game. The proposed technology offers an automatic scalable, on-demand, real-time GM without requiring a human in the loop. A check can refer to a challenge issued by the GM to a player to determine an outcome for a task, such as success, neutral, failure, critical success, etc. Tasks may be, but are not limited to physical or mental task such as climbing a wall or remembering a piece of in-game history. The check typically can be resolved via a dice roll. The game can also include one or more player character(s) (PCs) and/or a non-player character (NPCs). In some implementations, the disclosed technology can apply to tabletop role playing game (TTRPG), computer role playing games (CRPG), interactive fiction (IF), other similar games, and/or any combination thereof.

Although the disclosed techniques are shown and described from the perspective of a single player game, the disclosed techniques can also be applied to multiplayer gaming environments. In instances where the disclosed techniques are applied to multiplayer games, the AI game engine described herein can perform one or more additional processes to attribute actions and/or inputs to different players and update records accordingly. In TTRPGs, for example, there is typically a full party (typically 3-5 human players) and sometimes a few more NPCs. In CRPGs, co-op gameplay can exist where multiple players play in the same game world whilst controlling one or more characters. This disclosed technology can support group interactions, such that multiple NPCs can be controlled by the disclosed technology using the AI component to make decisions and statements on behalf of an NPC in a context-aware manner, while simultaneously each of the human players can control one or more characters contributing to a single cohesive game world. The disclosed technology can enforce narrative consistency such that claims in one part of the game world by any NPC may not violate the established truth of the setting. By establishing a complex and comprehensive game state, the disclosed technology can ensure consistency across interactions. The disclosed technology can also handle splits in a party of players, such as when player-controlled characters go to different places at the same time. To handle this, the disclosed technology can ensure the game state maintains its focus on multiple locations at once. The disclosed technology can determine which location/characters are applicable to messages/information being sent to the system and ensure that one player's suggestions for another player are not automatically implemented, but can be implemented if the target player agrees. The disclosed technology can also scale to support extensive amounts of players, such as with a Massive Multiplayer Role Playing Games, such as but not limited to Massive Multiplayer Online Role Playing Games (MMORPGs).

Referring to the figures, FIG. 1 is a conceptual diagram of a system 100 for JIT game world development and gameplay. The system 100 can include a backend AI game system 102, a user device 104, and a game world data store 108 that are in communication (e.g., wired, wireless) via one or more networks 106. One or more other user devices and/or data storage systems can be part of the system 100. The system 100 can provide a core game loop that drives interactions with a player at the user device 104. Advantageously, none of the components in the system 100 may be required to preprocess inputs/messages from the user device 104.

Instead, the user inputs/messages can go straight to processing by the backend AI game system 102. As a result, the disclosed system 100 can reduce and/or avoid delays in sending responses back to the player at the user device 104. The disclosed system 100 allows for continuous, real-time and interactive gameplay for the player while performing additional processing described herein in the background.

The backend AI game system 102 can be any type of computing system, computer, network of computing devices, and/or cloud-based system. Sometimes, the system 102 can be run on any type of computing system, computer, network of computing devices, and/or cloud-based system. The backend AI game system 102 can be the same as or similar to the AI game engine described throughout this disclosure. The backend AI game system 102 can be configured to provide JIT game world development and allow for the plyer at the user device 104 to play in that game world as it is developed and/or enhanced. The backend AI game system 102 can include one or more oracles 112. The backend AI game system 102 can include an architecture 114.

Figure 5:
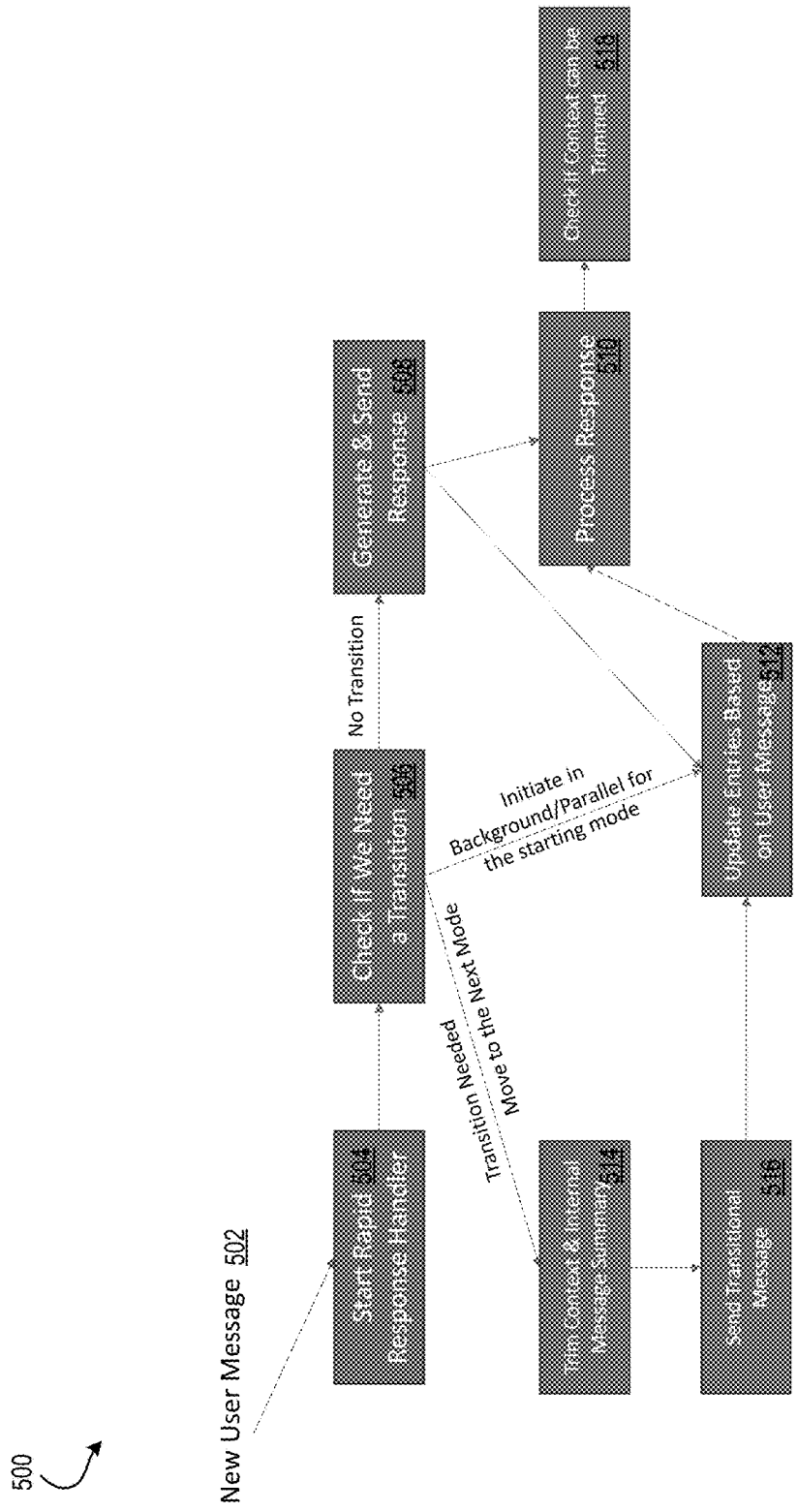
FIG. 5 shows a block diagram of a process for running a game loop using an AI game engine as described herein.
Figure 6:
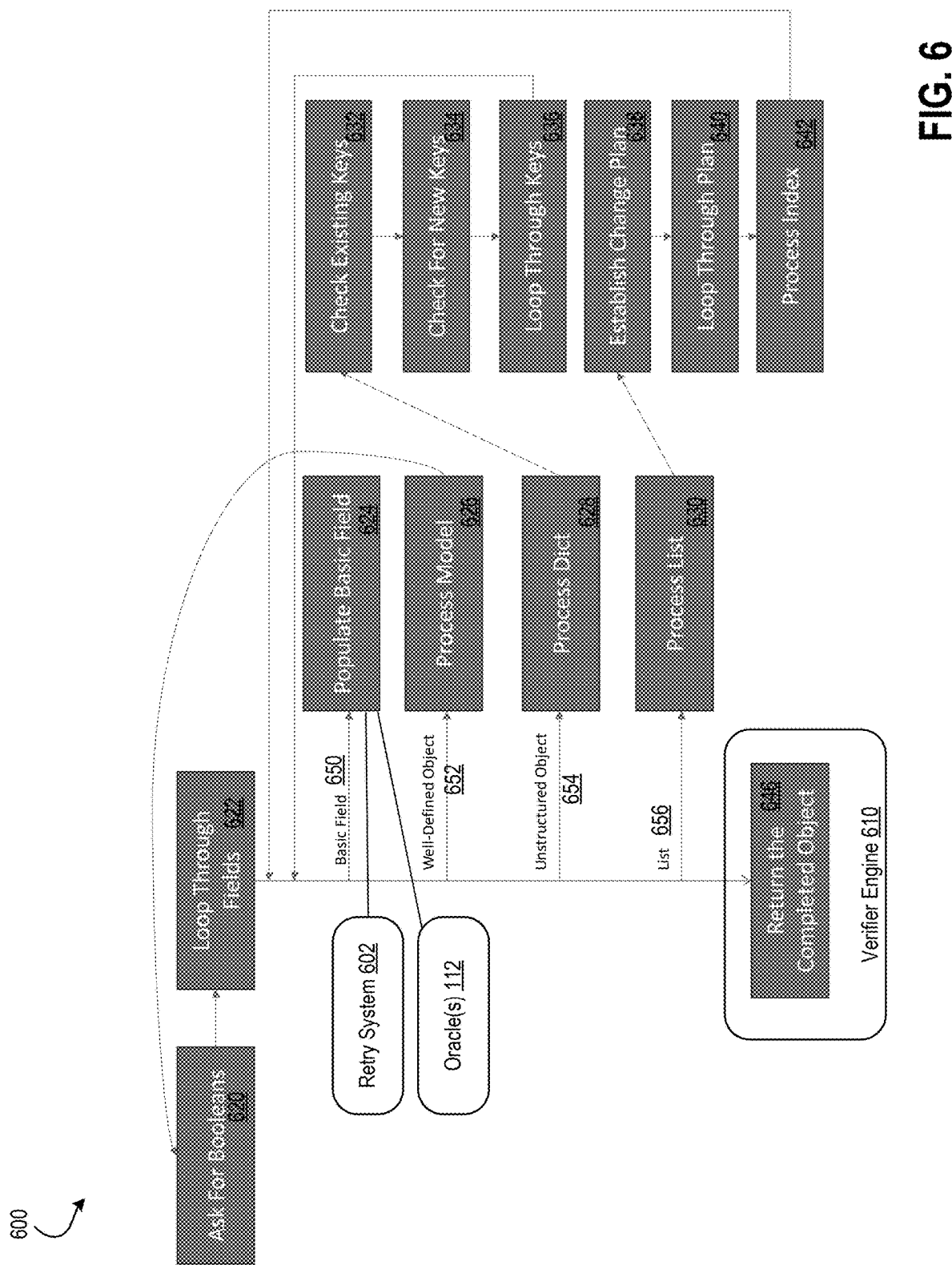
FIG. 6 shows a block diagram of a process for updating information in real-time as a game is being played.

The oracle(s) 112 can be executed by the backend AI game system 102 to perform any of the techniques described herein, such as in at least processes 500 of FIG. 5 and/or 600 of FIG. 6. The oracle(s) 112 can include a generative AI system. In some implementations, the oracle(s) 112 can include one or more large language models (LLMs), large multimodal models (LMMs), large pre-trained AI models/systems, and/or other models/systems. As additional or alternative illustrative examples, the oracle(s) 112 can include but is not limited to text to vector models, three-dimensional (3D) generation models, text to speech models, speech to text models, and/or audio models.

In some implementations, the oracle(s) 112 may predict a next token based on received user input or directives from the backend system 102. This process can be unconstrained so that the AI oracle 112 can generate any token in its vocabulary. This process can also be constrained/structured through various techniques such that the output is limited to a domain established by the backend system (102) through one of various measures to limit the oracle(s) 112's vocabulary to better address a goal or task as it generates the relevant tokens. In some cases, these restrictions may come in the form of a grammar.

The architecture 114 provides the infrastructure for each of the game modes, thereby allowing the backend AI game system 102 to determine what should be sent to the player at the user device 104 and how/when to update data stored in the game world data store 108 per the currently active game mode. For example, the architecture 114 can be configured to choose and/or specify the oracle(s) 112 (e.g., AI) to be implemented/used per operation being performed. Refer to the process 500 of FIG. 5 for further discussion about one or more operations that can be performed by the backend AI game system 102 as part of the architecture 114.

As described herein, the backend AI game system 102 is configured to decide whether or not to take an action or to determine which branch(es) to take in a process, such as the process 500 of FIG. 5 and/or the process 600 of FIG. 6. Thus, the backend AI game system 102 can be similar to a game master that makes decisions to create and subsequently run a game world. In a traditional system a decision tree/matrix established during development would be used to resolve branching decisions in the game world during gameplay. However, the backend AI game system 102 is configured to make these decisions without the need of pre-written code or pre-established trees/matrices/paths/branches/etc.

The user device 104 can be a computing device, mobile device, laptop, computer, smartphone, and/or cloud-based system. The user device 104 can include a display that can be configured to present the UI to the player. The UI elements can be generated or determined based on processes performed and decisions made by the backend AI game system 102. Such UI elements, as described herein, can be provided to the player at the user device 104 and updated in real-time to provide continuous gameplay for the player, even if or when the backend AI game system 102 is processing data and/or user inputs in the background.

The data store 108 can be a combination of a cloud-based data storage system, NOSQL database, vector database, a data lake, and/or another type of database. The data store 108 can be configured to maintain information for each of the game worlds/settings established, which can be referred to herein as an encyclopedia 110, which can be updated dynamically by the backend AI game system 102 during game setup and/or gameplay.

The encyclopedia 110 can include information, for a game world/game, that includes but is not limited to game environment data, players data, non-player character data, events data, locations data, maps data, plot hooks data, and/or narrative state data. Such entries in the encyclopedia 110 can be stored in lookup tables and/or a vector database, as described further below. The encyclopedia 110 can include one or more additional or alternative entry types, including but not limited to rules, creature, character, NPC, hordes, locations, location stacks, factions, items, containers, abilities, events, objectives, vehicles, effects, memories, maps, game setting, narrative state, game messages, playlists, dice system records, roll records, and/or any combination thereof. The encyclopedia 110 can maintain all information relevant to the game world from the first narrative message to any other moment in the game. Game saves can be established through deep copying (cloning) the encyclopedia 110 of game A. The cloned copy B can then be cloned once again to re-initialize a new playable game C from that save B without having changes impacting the original game A or the clone B. Each game, the original (A), the clone (B), and the loaded game (C) can be given its own unique game identifier, which can be propagated to each encyclopedia 110 associated with the game. The backend AI game system 102 can also manage multiple games at any given time and store many in parallel.

In some implementations, the game world can be derived from documents, such as PDFs, that contain information for the establishing of an encyclopedia. Using a combination of LMMs, optical character recognition (OCR) techniques, or other models/systems as the oracle(s) 112 the backend AI game system 102 can accurately convert the documents into an intermediary representation, typically a markdown representation that may incorporate the disclosed technologies markdown enhancements. Once the intermediate representation is created, the backend AI game system 102 can process the document(s) and populate the relevant encyclopedia 110 entries (including populating a rule database, as described below). Then, the markdown representation can be plugged into the architecture 114 and played by the player at the user device 104. Plugging the markdown representation into the architecture 114 can include providing the markdown representation to the architecture so that the game world derived from the document(s) can be played by the player at the user device 104. As such, the disclosed technology can breathe new life into existing TTRPG ecosystems via AI-based RPG gameplay.

In some implementations, the backend AI game system 102 can establish a game marketplace for publishers and/or players to produce encyclopedia game states, which can be traded, sold, or otherwise provided to players in the marketplace. At which point, a player can choose to create their own character in setup mode or simply choose one of a set of pre-provided options and then embark on an adventure into the narrative mode directly. In these modes, the backend AI game system 102 can be more tightly constrained in generation of the game world as there may be more relevant content from the beginning of the game. As an illustrative example, instead of generating new factions during the gameplay, the backend AI game system 102 may generally choose from existing ones to keep consistency with the predefined game settings, all while still allowing for the creation of new events and/or storylines within the game world.

Just as the backend AI game system 102 can generate the encyclopedia 110 from documents, the system 102 can additionally or alternatively generate documents from messages or other user input provided by the player at the user device 104. As an example, each encyclopedia entry can be created into a stat block/character sheet, or other structured representation. Narratively framed summaries of events can also be created to generate stories from the player's gameplay. As such, the disclosed technology can also be used to expeditiously generate RPG modules.

Data can be stored in the data store 108 using scalable database designs like NOSQL. As a result, the backend AI game system 102 can use data identifiers (IDs) to quickly and efficiently perform fast lookups in the data store 108. In some implementations, the data store 108 can include a vector database, which can be used to find similar entries using machine learning (ML) techniques that can create a high dimensional numeric representation of data and allow for similarity checks via quick math operations (e.g., cosine similarity). In some implementations, the data store 108 can include archival and/or image/asset storage, frontend assets, and/or large assets. Descriptive information and/or metadata can be stored in structures such as the vector database to facilitate easier and more efficient lookup during retrieval operations.

In some implementations, the data store 108 can include a database or other storage structure for rules. The backend AI game system 102 can be configured to generate a comprehensive list of rules similar to how the system 102 can create a list of requirements for a character in a particular game world. Through the vector database described above, the backend AI game system 102 can look up relevant rules during a narrative stage of gameplay in the game world and confirm that the relevant rules are being followed. The use of the rules storage can also be used to create and enforce game worlds, such as creating the encyclopedia 110.

Still referring to the system 100 in FIG. 1, game world development and/or gameplay can begin when the player provides user input in one or more UIs presented at the user device 104 (block A, 120). The user input can include messages, text, speech prompts, and/or other interactions with the UI, such as clicking, from the player indicating actions that the player would like to take in their game world. For example, the messages can include instructions or other information about a game world setup. As another example, the messages can include instructions about actions the player would like to take in the game world during gameplay. The user input can be provided, by the user device 104, to the backend AI game system 102.

The backend AI game system 102 can process the user input and provide responses in real-time or near real-time back to the user device 104 in the form of gameplay (block C, 124). The gameplay can include game setup, game world development, character development, narrative states, communication, and/or other modes in which the player interacts and/or takes actions in the developed game world. As the system 102 is providing nearly instantaneous responses to the user device in block C (124), the backend AI game system 102 may additionally be performing JIT game world updates in block B (122). As described further in reference to FIGS. 5 and 6, the backend AI game system 102 can determine whether data/entries in the encyclopedia 110 corresponding to the player's game world should be updated/modified. If so, then the backend AI game system 102 can perform additional operations in block B (122) to make those updates/modifications, all while gameplay is continuing with the player at the user device 104 in block C (124).

The user device 104 can provide game world visualization to the player in the one or more GUIs in block D (126). Block D (126) can be performed before, during, and after performing any one or more of blocks A (120), B (122), and/or C (124). Block D (126) can include displaying information and processing player commands. As an illustrative example, the player can request to roll dice, which includes providing visual interactive elements for presentation in the UIs at the user device 104. When the player, for example, selects a selectable option to roll the dice, the user device 104 can execute an animation to visualize the dice roll, then transmit results from the roll to the backend AI game system 102. The backend AI game system 102 can store the dice roll results in the data store 108 and update it in the future, when the player rolls the dice again. In some implementations, previous roll results can be polled from the data store 108 and presented in the UIs to the player (such as if the player scrolls back through the messages presented in the UIs to a message with the request to roll the dice).

Additionally or alternatively, block D (126) can include generating and providing soundtrack functionality and/or other special effects and/or audio during game world development and/or gameplay. The backend AI game system 102 can, using the oracle(s) 112, curate, play, pause, skip, and/or add/remove music to a soundtrack/playlist to be played during the development/gameplay. The sound curation can be performed as a background process and/or can prompt the player to ask the backend AI game system 102 via user inputs to curate the music.

As an illustrative example of soundtrack/music curation, the backend AI game system 102 can setup a list of song names that are available to be passed to the oracle(s) 112 to generate various information in relation to the song. The information can include but is not limited to instruments featured, song description, related genres, related scenes, related game settings, related game systems, related characters or archetypes, etc. The backend AI game system 102 can then store, in the data store 108, an ID for each song along with a song length field and the fields generated by the oracle(s) 112 (AI). Such information can be stored in the vector database described above, as an illustrative example. By placing this information into the vector database, the backend AI game system 102 can perform rapid similarity lookup between text descriptions of a game setting (e.g., tone, genre, tropes) and text representation of the songs produced by the AI. As such, the backend AI game system 102 can quickly create curated background playlists and/or soundtracks for the player's game. One or more different background songs can be played on loop during setting generation. The backend AI game system 102 can also regenerate songs and/or playlists after a predetermined amount of time and/or when events occur in the game such that the background music/songs match an atmosphere of player interactions in the game. The audio can also include relevant ambient effects such as rain, crowd noise, etc., that can be generated and managed via the same techniques described herein for the music.

The system 102 can also generate other types of audio by integrating high-quality speech to text AI systems. AI systems, the oracle(s) 112, in tandem with the architecture 114 can establish a description of the NPC and their speech patterns, which can then be passed to an AI voice generation system (e.g., oracle(s) 112) to create a unique distinct voice for each NPC. A corresponding voice ID can then be reused by the backend AI game system 102 when generating messages from that particular character to provide an audio version of the message. The voice ID can be maintained in the game world data store 108. The system 102 can also leverage one or more real-time streaming oracle(s) 112 to provide a real-time discussion with the player. These techniques can allow for a player to interactively ask the character to slow down, speed up, change accents, and/or even interrupt the oracle(s) 112 mid-conversation. Such features can be augmented to provide added privacy by using a voice clone system that can be configured to convert the player's voice to a different voice, which can be sent to the oracle(s) 112 instead of the player's actual voice. These features can also be used to adjust audio responses generated by the oracle(s) 112 with different voices, should that be desirable. Although the audio additions described herein may change a final response call to the player and adjust their communication loop, these audio features may not require fundamental reworking of the encyclopedia 110 or a narrative tree/engine. The audio features can be enabled or disabled as part of the AI game system 102.

Additionally or alternatively, block D (126) can include rendering animations that are specific to a message, prompt, other portion of text, or other input provided by the player as user input in the UIs. Additionally or alternatively, block D (126) can include the backend AI game system 102 annotating output text or other data to be visualized and presented at the user device 104 with certain languages and/or stylizations that are unique to the particular game world, game settings, user preferences, gameplay, and/or messages, prompts, or other inputs provided by the player.

Additionally or alternatively, block D (126) can include generating images or other 3D renderings for one or more scenes in the game world and/or gameplay. For example, the backend AI game system 102 can utilize the oracle(s) 112, such as with text-to-image, to generate images from text, which in turn would have been generated by the LLM, LMM, or other model/system portions of the oracle(s) 112. The images can be combined with audio generations for NPC statements to establish talking face video through one or more third party systems. Moreover, LMM systems, combined with a periodic capturing of player video should it be provided, can allow the player to communicate with the oracle(s) 112 via video and/or audio. This feature can allow for the oracle(s) 112 to run the player's game in a phone and/or video call-style environment. This feature can also include sending frames or real-time streams of the players' face(s) to a supplemental AI system that can be configured to read facial expressions and provide relevant supplemental data to the conversational oracle(s) 112 such that the oracle(s) 112 can react to both video and audio reactions of the player(s). Additionally or alternatively, the oracle(s) 112 may use one model/system for all the modalities available (e.g., audio, text, image, video, streaming, etc.) or a combination of multiple such models/systems. A similar frame or real-time stream capture system can also be used by the system 102 to support the oracle(s) 112 viewing the players' screens and/or game world visualization/rendering, such as but not limited to shared simulated tabletop and/or map to further enhance the game experience. Through integration of a tabletop visualization system or traditional game engine with the backend system 102, the oracle(s) 112 can receive information regarding the players' actions and changes to a visual domain and through the same integration make its own changes accordingly, thereby allowing for a shared UI and/or visually rendered and interactable game world.

The oracle(s) 112 can additionally or alternatively be used to create/generate landscape images or other scene imagery for locations during the gameplay. Such image generations can be made during gameplay, in real-time or near real-time such that the generated images can be outputted at the user device 104 while the player is playing the game. To generate the images, the backend AI game system 102 can receive and process general settings information, such as date, game genre/tone, NPC attributes (e.g., personality, attire), other objects' attributes, etc. to generate a prompt to an AI image generator (e.g., AI model) in the oracle(s) 112. As an illustrative example, the AI image generator can be an open-source or proprietary model and may or may not be trained for special tasks. Sometimes, such as in the case of text-to-image generation, the oracle(s) 112 can include multiple available AI systems. In those cases, the backend AI game system 102 can choose from amongst multiple different AI models which should be selected for the image generation task. The selection can be made based on factors, such as style of the image and/or what each AI model is best at producing/creating.

In yet some implementations, one or more of the AI models included in the oracle(s) 112 can generate/create 3D rendered playable gaming scenes for the player to interact with, which can also be based on inputs such as prompts or other text from the player and/or the backend AI game system 102. Additionally, this can be combined with a more traditional pre-existing library of locations, items, furniture, and/or other 3D Models, which can be used in tandem with the on-demand generations. Moreover, the backend system 102 can combine these entries and determine unique layouts/scenes tailored to the narrative. This information can be stored in the encyclopedia 110 to ensure consistency over the course of the game. With this form of oracle(s) 112 and an integration with a traditional game engine for rendering, the disclosed technology can provide a graphical game experience compatible with keyboard, mouse and/or controller. The backend game system 102 can conduct the curation of which assets may be needed to be rendered and a broader layout of the scene. The disclosed technology can further be hooked up to other gaming engines that have 3D models, textures, etc. The 3D models, textures, etc. can reside on the other gaming engines while the disclosed technology can drive the physics, lighting, and other characteristics of the player's game world. Advantageously, the disclosed technology can result in generating entire Triple-A (AAA) style games on the fly, providing infinite playability and branching/choice. AAA games deliver top-tier quality in terms of graphics, gameplay, story, and production values. This is another element of the disclosed system 100 that can offer flexibility, as it is independent of a specific visual engine just as it is independent of any specific AI model for the oracle(s) 112 and revolves around the management of the game world and state, which allows it to communicate with other systems.

Still referring to FIG. 1, block D (126) can include general curation by the backend AI game system 102, which can be visualized at the user device 104. Similar to soundtrack curation and selection described above, the system 102 can generally perform curation tasks. The system 102 can include a user-preferences tracking sub-system, for example, which can allow for the tracking of the player's common preferences across games and storing related information in the data store 108 to link to the player rather than a particular game. With this, the system 102 can optimize new/future games and gameplay to a player's preferences without the need for the player to explicit state such preferences.

In some implementations, block D (126) can include dice rolling functionality presented and selectable by the player in the GUIs at the user device 104. During character setup and/or during a narrative game mode, the player may be prompted with a selectable option in the UI of the user device 104 to roll the dice. On the backend, this can be implemented by providing the oracle(s) 112 with access to a tool or option allowing it to initiate a roll request. The oracle(s) 112 can identify who may be rolling the dice (e.g., the GM, the player, an NPC). For the GM and NPCs, the roll can be immediately made by the architecture 114, however in the case of a player, this request can induce the architecture 114 to send a special signal to the UI indicating the specific die roll needed including instructions on how to roll the die in die-notation as well as indicating who needs to roll. This request may also include a title and description for the roll to better contextualize the request to the player. Sometimes it may also be linked to an ability, effect, and/or item recorded in the encyclopedia 110. If the player rolls, the user device 104/frontend can send the result to the system 102, which may trigger a message to be created by the system 102 containing the roll result. Sending the result can also trigger the oracle(s) 112 to respond based on the outcome of the roll. During character creation, this can typically be done for rolling initial game statistics to randomly see how powerful a character may be. During gameplay, this can be done to resolve checks (e.g., randomly determine if the player is successful) or the impact/outcome of an event. The rolling can also be done for other reasons, such as but not limited to randomly determine loot, and/or by the GM to see if an NPC can complete a task or if a random event occurs. The use of rolls in the disclosed technology is largely the same as that in TTRPG, CRPG, and/or IF context, with exception being that CRPGs and IFs tend to hide the dice in most cases, while the default for the disclosed technology is to make the roll mechanic prominent in the UI. Moreover, the backend AI game system 102 can both deliver the dice rolling requests and send updates about the encyclopedia 110 entries in the background simultaneously.

The system 100 can provide one or more additional features. For example, while the player may be working on detailing their character by providing inputs in the UI at their user device 104 in block D (126), the player can also receive, in the UI, live updates to their character from the oracle(s) 112 based on the player's prior messages/inputs or the inputs of another player. Similarly, as a game transitions from setting development to character development, development of certain NPC(s) and location(s) may begin to take place, such that by the time the player is ready to begin playing the game, the game world is already in a playable state. As such, the disclosed system can make many inferences and take action(s) on their basis based on limited player interactions. The disclosed technology can also allow the player to view these operations as they take place if they so choose or for them to remain hidden. As the player develops their character, information about their character can be sent back and forth between the oracle(s) 112, the backend system 102, and the user device 104, even as other operations take place in parallel. Unless the player navigates in the UI to browse that particular content/element, the background information may not be displayed until it becomes relevant (such as an NPC being introduced).

For additional expediency, the disclosed technology maintains an encrypted local copy of relevant elements such as the player's chat and/or game data, such as portions of the encyclopedia 110, which can be stored and maintained on the user device 104 to allow for fast resuming of gameplay. Once the game is opened, a series of queries can be launched to update the frontend/the GUIs presented at the user device 104, although the cached information can be used/presented first.

As yet another example, the backend AI game system 102 can provide the ability for a human GM to run the game alongside the oracle(s) 112 such that the human GM can send and receive hidden suggested messages to aid them and drive the story. A whisper mode can also be provided so that the GM and players can communicate privately.

In some implementations, the player may want to reuse their character from a different game. The disclosed system 100 can support importation of characters from one game to another, which can include cloning an object (e.g., a character) and the linked/associated items. The new cloned object can then be assigned the new game ID and linked to the new game world. The disclosed system 100 can additionally or alternatively provide a scan feature, in which a picture or PDF of a character sheet can be provided, which the backend system 102 can provide to the relevant oracle(s) 112 models to process and convert into one or more entries for the encyclopedia 110. Such techniques, such as importing elements from prior games or documents as well as the aforementioned marketplace, can also be expanded to allow for creation of content libraries (items, containers, locations, etc.) that players could draw on for future games. The players can also share their own content with other players using the disclosed system 100, similar to the game world marketplace described above.

As another example, the disclosed system 100 can provide persistent commands (e.g., commands that persist throughout the game). If a player provides a message to the oracle(s) 112 where every response and/or entry should be created under the guidance of that command. For example, the player can request all content in the style of a pirate and this instruction can be preserved and appropriately provided to the oracle(s) 112 to ensure that the player's request is satisfied. Thus, the architecture 114 can track the temporal relevance of commands not just based on in-game dates but also based on persistent player preferences. The proposed pattern also can follow a similar structure for overarching elements such as the general description, tone, and/or genre from the setting of the game, which tend to be relevant to most of the oracle 112 operations to provide consistent responses and theming to the game.

In some implementations, the disclosed system 100 can add mini-games, such as chess or poker, to the player's gameplay. As a result, the player can play a game within the game, where the oracle(s) 112 can continue to act as an interlocutor, but can also share interaction with an alternative UI specific to the mini game, such as moving chess pieces and observing a chess board in a chess mini-game. The mini-games can be played by the player against the oracle(s) 112/AI of the backend AI game system 102. The oracle(s) 112 may also engage in banter and otherwise make for a more engaging gameplay experience for the player than traditional applications/bots. In some implementations, the mini-game implementation may be generated JIT, while in other implementations, it may draw on a library of options.

Additionally or alternatively, the backend AI game system 102 can generate long-form content through self-play. If the oracle(s) 112 is permitted to take over for the player character(s), then a full game world and narrative progression system can be developed. The oracle(s) 112 (e.g., AI) can be the GM and the player, thereby pursuing the path of both hero and antagonist. The backend AI game system 102 can generate books and/or series through its consistent self-play and long-running plot setup. With the audio features described above, the system 102 can convert the books into audiobooks. With 3D asset generation and/or AI models for facial expression and motion or video generation integrated into the oracle(s) 112, the system 102 can additionally or alternatively generate animated films or other types of films/movies. This method can also be used for the generation of new game worlds, content libraries, and/or encyclopedias. The disclosed system may also apply similar approaches on a user driven game to generate media based on the user's game.

As described herein, blocks A-D (120-126) can be continuously performed, such as when a player is building their game world and/or playing the game. In some implementations, one or more of the blocks A-D (120-126) can be performed at the same time. For example, gameplay (block C, 126) can occur at the same time as the JIT game world updates (block B, 122), the user input (block A, 120), and/or the game world visualization (block D, 126). In some implementations, one or more of the blocks A-D (120-126) can be performed in different orders. For example, the game world visualization (block D, 126) can initially kick off the other operations, such as the user providing input in block A (120) and/or the gameplay in block C, 124).

Figure 2:
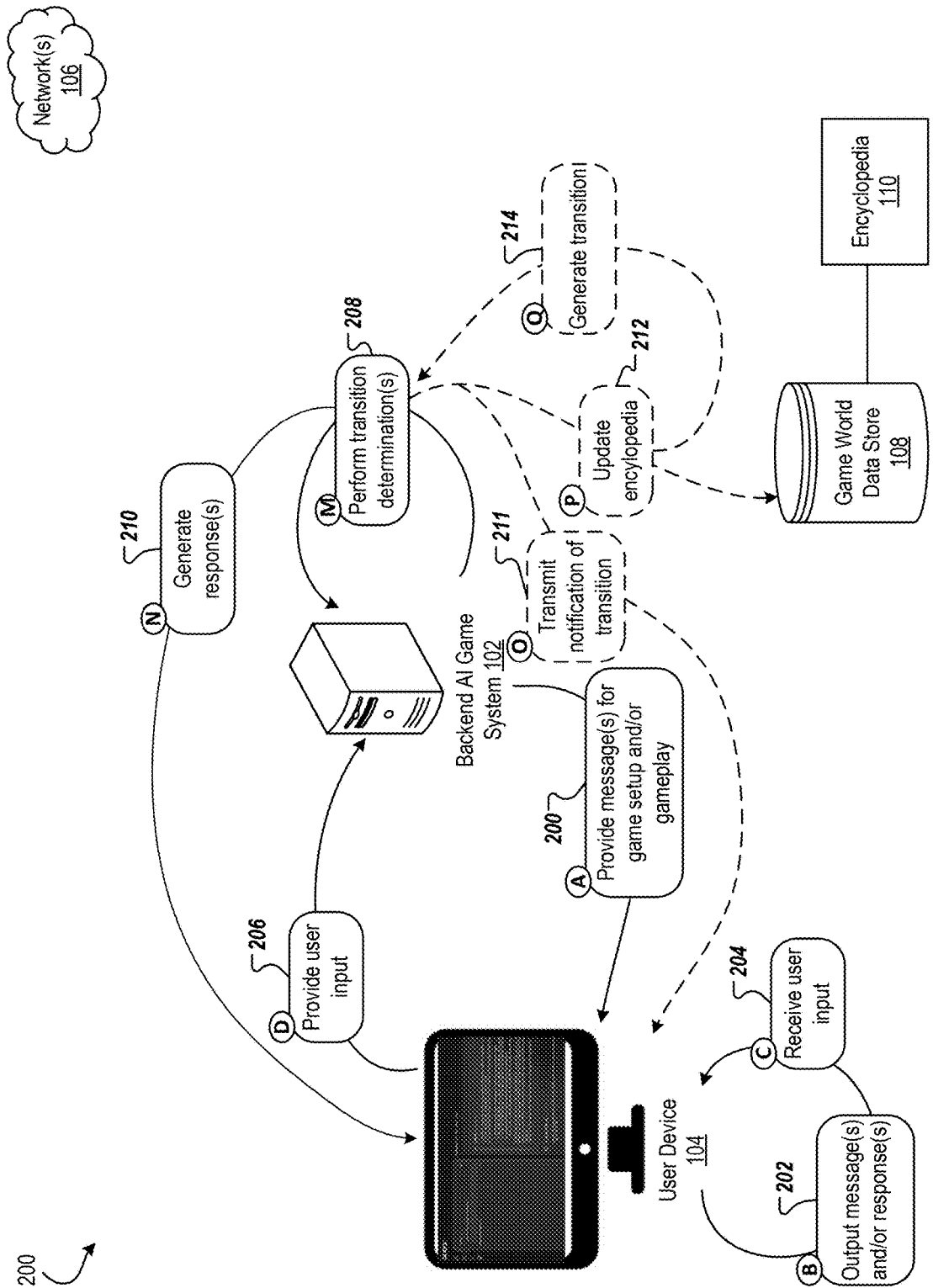
FIG. 2 is another conceptual diagram of JIT game world development and gameplay.

FIG. 2 is another conceptual diagram of a system 200 for JIT game world development and gameplay. The system 200 is similar to the system 100 described in reference to FIG. 1. For example, the system 200 can include the backend AI game system 102, the user device 104, and/or the game world data store 108 communicating via the network(s) 106.

In the example system 200, the backend AI game system 102 can provide one or more messages for game setup and/or gameplay to the user device 104 (block A, 200). The prompts can include instructions or guidance to the player at the user device 104 to provide settings or other information for developing their game world. For example, the system may converse with the user with instructions, such as but not limited to "Fear not if you're new to this world of tabletop RPGs, because I'm here to support you all along the way. Whether you're a seasoned hero or just stepping into the dungeon for the first time, we'll have a blast together!", "Keep an eye on the right side of your chat window; that's where your character data and other essential game info will appear for your convenience!", "Whether you're a seasoned veteran of tabletop RPGs or a fresh-faced newcomer, I'm here to support you every step of the way. Feel free to ask me any questions or suggest what you'd like to tackle next-your input makes this adventure even more engaging!", "We will tackle some vital topics together to lay down the groundwork for our adventure: 1) The Setting for our game. 2) Creating your Player Characters (PCs). 3) Choosing a rule system to guide our gaming experience. 4) Establishing the starting location where our story unfolds. 5) And then, we begin our thrilling quest!", "Do you have a specific background in mind for your character?" The above are merely intended to be illustrative examples of prompts, messages, and/or responses that can be presented to the player at the user device 104. One or more additional or other prompts, messages, and/or responses may also be generated and presented at the user device 104. For example, the prompts, messages, and/or responses can be dynamically generated based on preferences of the player, prior gameplay, and/or inputs provided by the player at the user device 104.

The user device 104 can output the message(s) or responses in block B (202). Refer to discussion about game world visualization in FIG. 1 for outputting the message(s).

The user device 104 can receive user input from the player at the user device 104 interacting with the outputted message(s) in block C (204). The user input(s) can be provided to the backend AI game system 102 (block D, 206). Refer to FIG. 1 for further discussion.

The backend AI game system 102 can then perform one or more background processes whilst providing real-time continuous prompts and gameplay to the user device 104. For example, the system 102 can determine whether one or more transitions are needed in block M (208). Such a determination can be performed using the oracle(s) 112 (e.g., AI) and/or architecture 114 described in reference to FIG. 1. Refer to FIG. 5 for further discussion about the transition(s) determination(s). If a transition(s) is not needed, then the backend AI game system 102 can generate one or more response in block N (210). The response(s) can be transmitted in real-time/instantaneously to the user device 104 to be outputted at the user device 104 (block B, 202). The player can provide user input (block C, 204) based on the outputted response(s). The system 100 can iterate through one or more of the blocks described herein in response to receiving the user input, thereby providing a JIT continuous game development and gameplay loop.

Referring back to the transition(s) determination(s) in block M (208), if the backend AI game system 102 determines that a transition is needed, the system 102 can transmit a notification of transition to the user device 104 (block O, 211). The notification can be transmitted immediately for real-time continuous gameplay by the player.

At the same time as or after transmitting the notification, the backend AI game system 102 can update the encyclopedia 110 (block P, 212). Refer to FIG. 6 for further discussion about updating the encyclopedia 110.

The backend AI game system 102 can optionally generate a transition before, during, or after performing blocks O (211) and/or P (212). The transition can then be provided to the user device 104 as part of generating a response prompt (block N, 210).

As described above, the blocks described in FIG. 2 can be iteratively performed so long as the player is developing their game world and/or engaging in gameplay. The blocks described in FIG. 2 can also be performed in one or more different orders, in parallel, and/or simultaneously, as described in reference to at least FIG. 1.

Figure 3B:
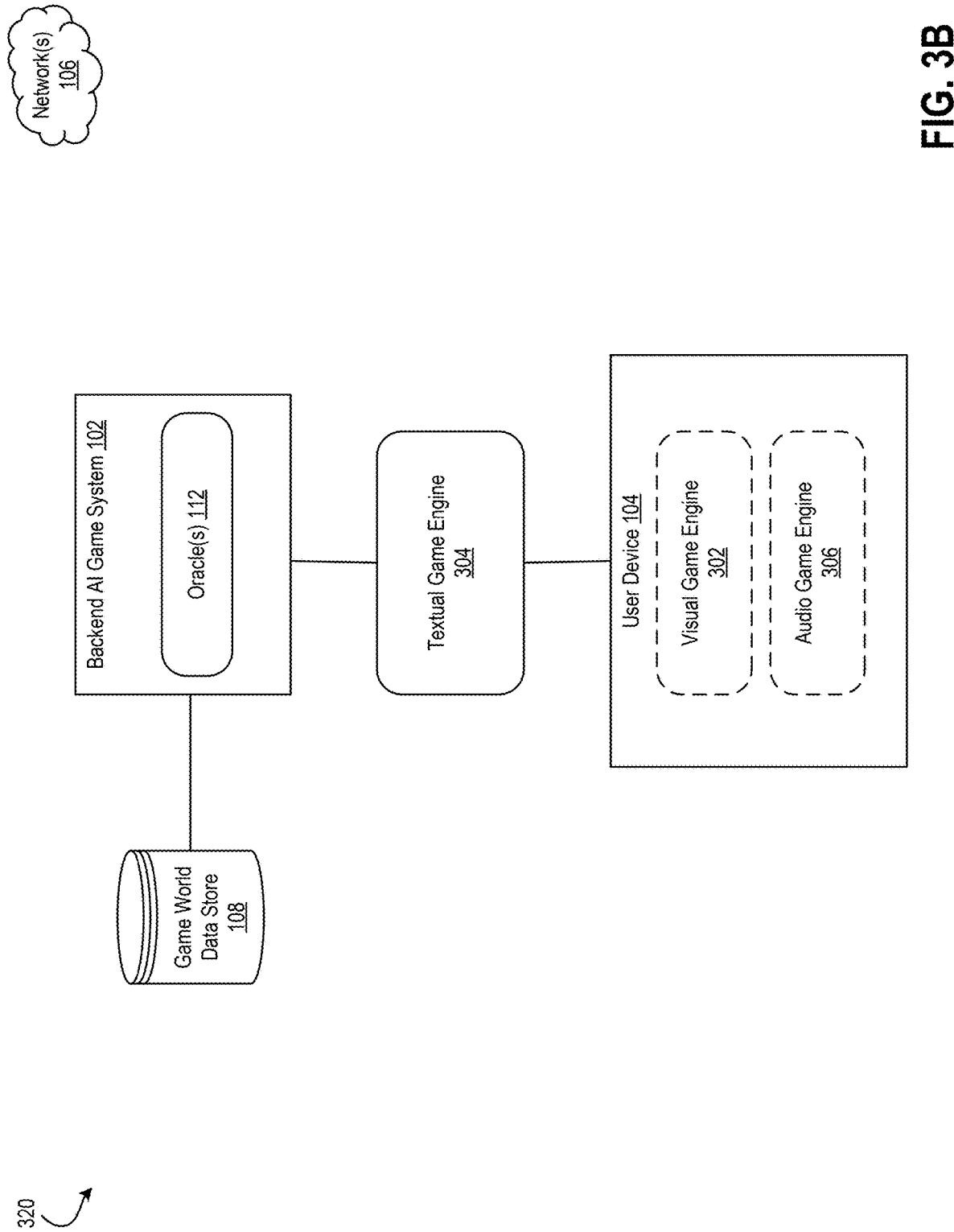

FIGS. 3A and 3B illustrate example system diagrams of system components that can be used to perform the disclosed techniques. In FIG. 3A, an example system includes the backend AI game system 102 having the oracle(s) 112 communicating with the game world data store 108 via the network(s) 106. The backend AI game system 102 can also communicate, via the network(s) 106 with a visual game engine 302, a textual game engine 304, and an audio game engine 306. The engines 302, 304, and/or 306 can be part of the backend AI game system 102. In some implementations, the engines 302, 304, and/or 306 can be separate and distinct from the backend AI game system, such as engines provided by third party computing systems. In some illustrative implementations, the engines 302, 304, and 306 can reside as intermediary engines between the backend system 102 and the user device 104. Sometimes, the engines 302, 304, and 306 can reside at the user device 104. The engines 302, 304, and 306 can represent systems for rendering and/or administering the interaction between the player and the backend system 102, in some implementations.

In brief, the visual game engine 302 can be configured to generate visualizations of a game world as the game world is being played by a player at the user device 104. The engine 302 can be a game engine and/or a hybrid system receiving inputs from the oracle(s) 112, such as 3D models, custom images, and/or other dynamically generated instructions. The visual game engine 302 can receive inputs and/or instructions from the backend AI game system 102 about visualizations that should be generated by the engine 302 and then provided for display and/or interaction on the user device 104. The inputs and/or instructions can be generated based on the oracle(s) 112 receiving and processing messages, prompts, or other user input from the user device 104, as described in reference to FIGS. 1 and 2. The visual game engine 302 can then provide instructions to the user device 104 for presenting the visualizations in UIs described herein at the user device 104.

The textual game engine 304 can be configured to render text, messages, prompts, or other textual information related to the game world as the game world is being played by the player at the user device 104. The engine 304 can receive inputs and/or instructions from the backend AI game system 102 about text and any special modifications such as those provided through the disclosed system's markdown enhancements that should be generated by the engine 304 and then provided for display at the user device 104. The inputs and/or instructions can be generated based on the oracle(s) 112 receiving and processing messages, prompts, or other user input from the user device 104, as described in reference to FIGS. 1 and 2. The engine 304 can then provide instructions to the user device 104 for presenting the generated text in UIs described herein at the user device 104.

The audio game engine 306 can be configured to generate soundtracks, music, playlists, voices, ambient audio, and/or sound effects related to the game world as the game world is being played by the player at the user device 104. The engine 306 can receive inputs and/or instructions from the backend AI game system 102 about audio that should be generated by the engine 306 and then provided for rendering at the user device 104. The inputs and/or instructions can be generated based on the oracle(s) 112 receiving and processing messages, prompts, or other user input from the user device 104, as described in reference to FIGS. 1 and 2. The engine 306 can then provide instructions to the user device 104 for presenting the generated audio in UIs described herein at the user device 104.

The visual game engine 302, the textual game engine 304, and/or the audio game engine 306 can communicate back to the backend AI game system 102. For example, such communication can be in response to receiving messages or prompts from the player at the user device 104 that are in the form of visualizations (e.g., clicking by the player as an interaction in the visual game engine 302 UIs), text (e.g., text in a chat presented in the UIs for the textual game engine 304), and/or audio (e.g., speech for the audio game engine 306). The backend AI game system 102 can then feed such messages or prompts to the oracle(s) 112 as per rules and structure directed by the architecture 114 to perform the processing described herein and thus provide continuous JIT gameplay for the player at the user device 104.

In FIG. 3B, a system 320 can include the backend AI game system 102 communicating via the network(s) with the game world data store 108. The backend AI game system 102 can further communicate with the textual game engine 304, which can be part of the backend AI game system 102 and/or part of another computing system. The textual game engine 304 can communicate with the user device 104 via the network(s) 106. The user device 104 can optionally include the visual game engine 302, the audio game engine 306, and/or a combination thereof. The visual game engine 302 and/or the audio game engine 306 on the user device 104 can communicate back to the backend AI game system 102, for example, in response to receiving messages or prompts from the player at the user device 104 that are in the form of visualizations (e.g., interactions with a graphical rendering such as moving a character or clicking on an entry), and/or audio (e.g., speech). The textual game engine 304 can also communicate back to the backend AI game system 102 in response to receiving text prompts or messages as user input from the player at the user device 104. The backend AI game system 102 can then feed such messages or prompts to the oracle(s) 112 to perform the processing described herein and thus provide continuous JIT gameplay for the player at the user device 104. For example, the messages or prompts can be communicated back to the backend AI game system 102 as calls to check entries in an encyclopedia or other data structures described herein. If entries need to be added, removed, and/or updated, the backend AI game system 102 can make such changes.

FIGS. 3A and 3B provide merely illustrative examples of the combinations of the engines 302, 304, and 306. Any other combinations of the engines 302, 304, and 306 can be deployed in a cloud-based system, at the backend AI game system 102, at another computing system, and/or at the user device 104.

Figure 4A:
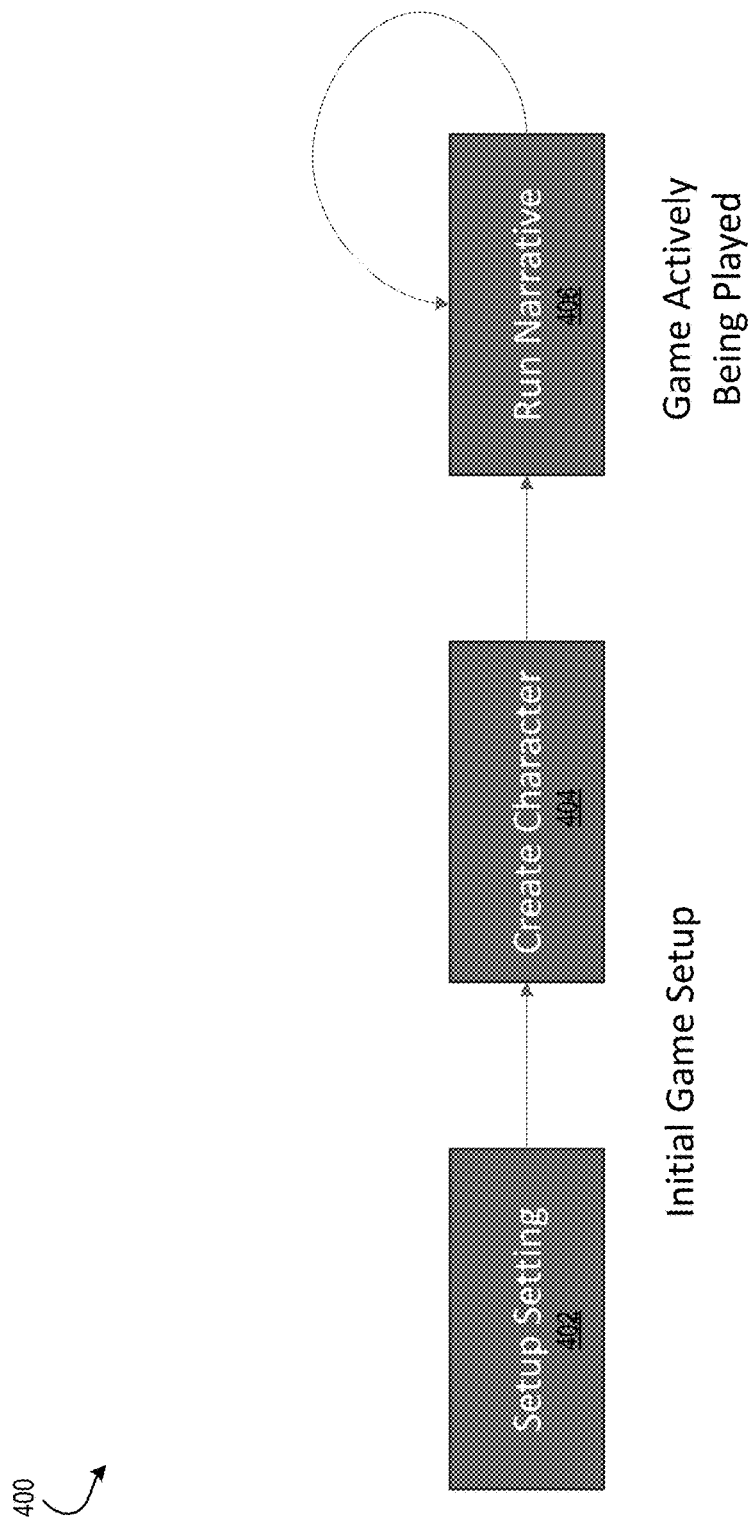
FIGS. 4A, 4B, and 4C illustrate different example game modes.
Figure 4B:
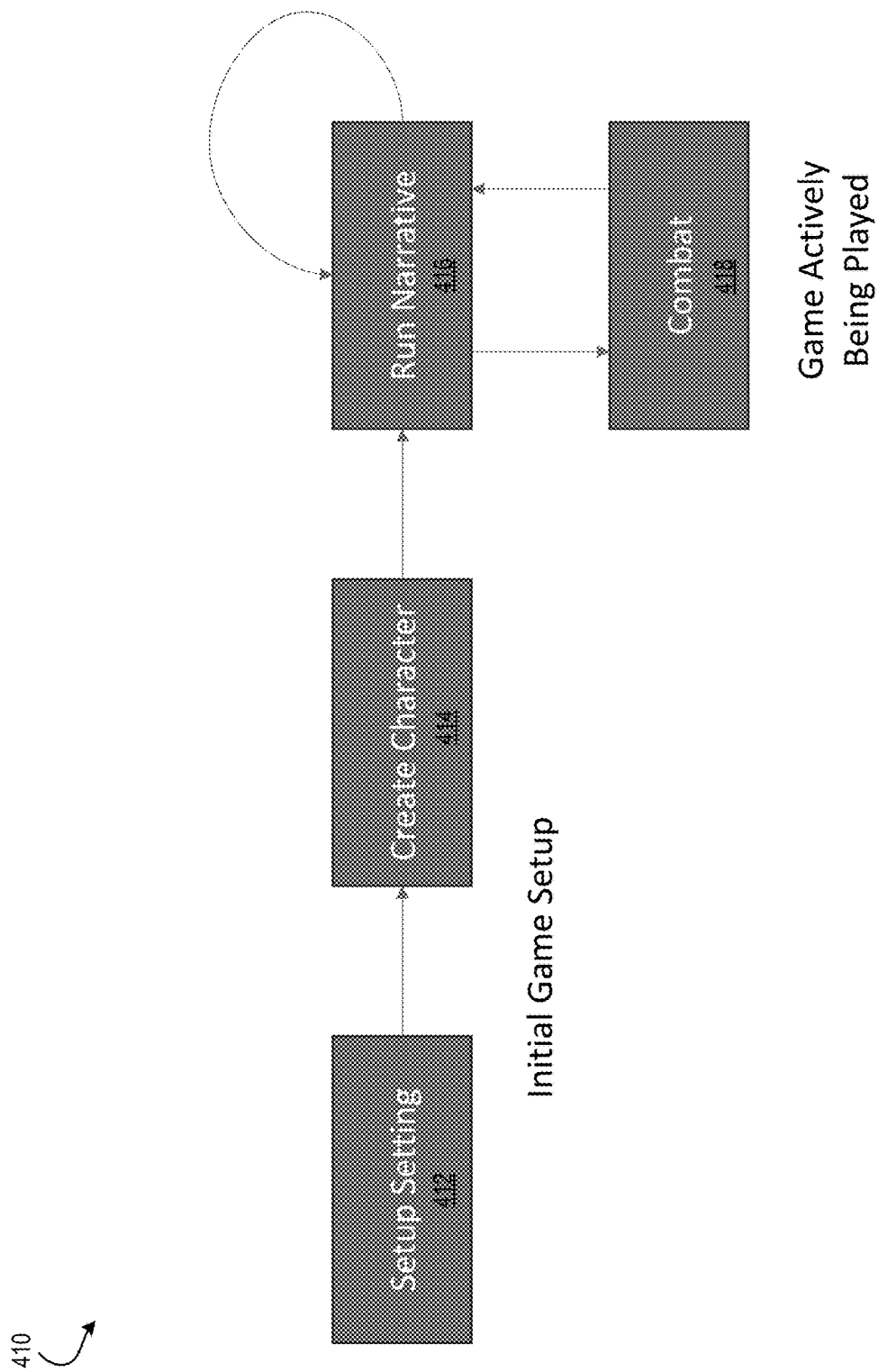
Figure 4C:
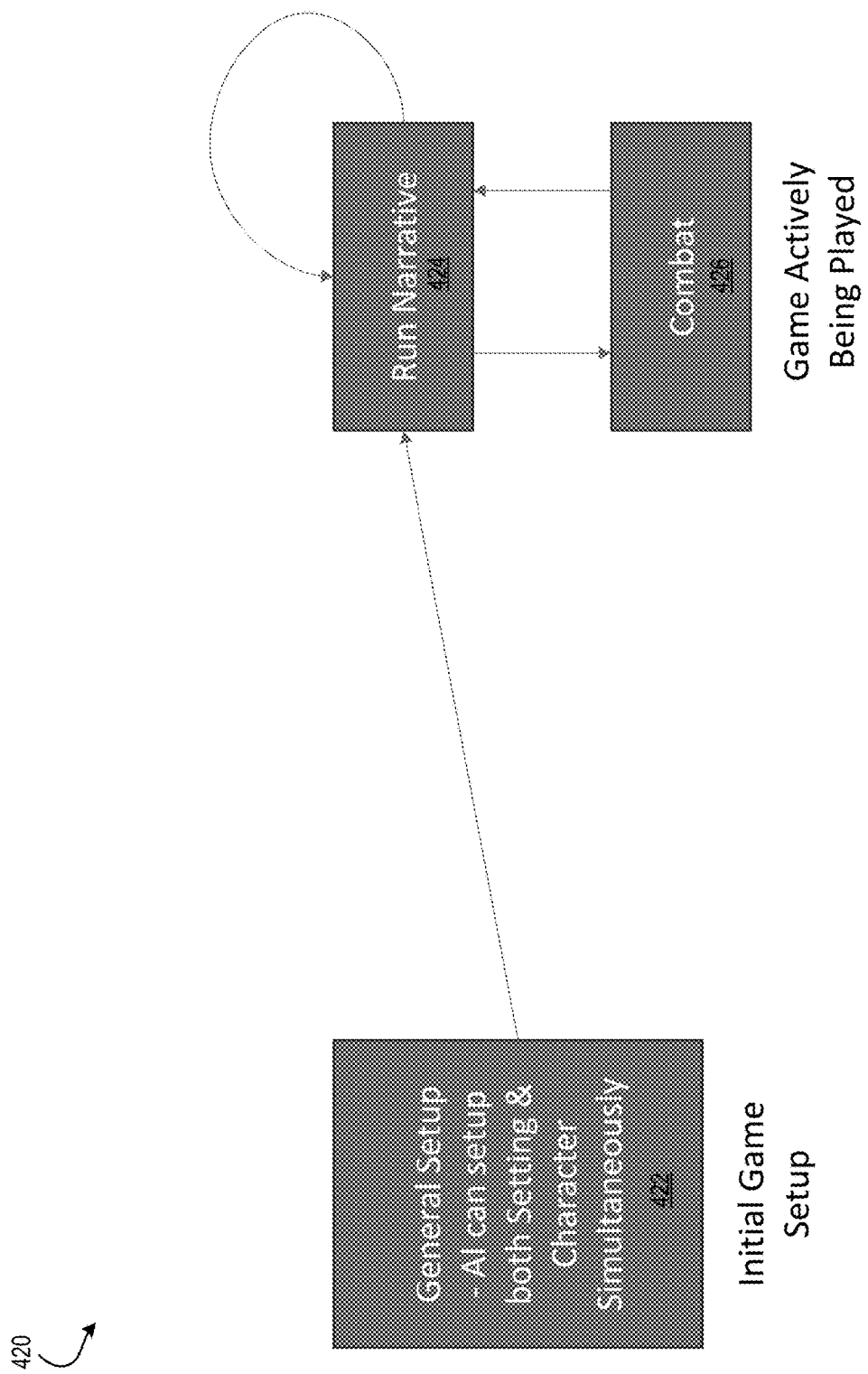

FIGS. 4A, 4B, and 4C illustrate different example game modes. The different game modes can be used to aid the AI described herein (e.g., the oracle(s) 112) in identifying appropriate actions to take (thus by constraining a domain for the AI to operate within). The different game modes can guide a style of statements/responses provided by the AI/oracle(s). The different game modes can also aid the AI in tracking what needs to be completed before a transition to the subsequent mode. For example, the AI can determine whether or not a current mode is complete and thus ready to transition to the next game mode. The different game modes can also constrain what entries in an encyclopedia or other data structure that the AI can update. The different game modes can aid the AI in determining what background processing should occur in response to each message provided by the player and/or provided to the player.

In some implementations, when players play a TTRPG or a player wants to play a CRPG, they need to first setup their character. In the TTRPG context, the GM and players must also agree on the game that they will play (e.g., system and setting). In the TTRPG context, this can be referred to as Session 0, as it is a precursor to a first actual gameplay session. The character creation can be broken into a session 0 (in the TTRPG context) or a separate menu (in the CRPG context) because at this point in time, the player has a more flexibility/freedom in how they can influence the game world and their character(s). For example, the player can grab rare items, adjust inventory, change their past/background, adjust their abilities, and/or adjust their character in ways that would not normally make sense under the more rigorous rules of gameplay in a structured world/conventional rule system or according to rules that are established during the first actual gameplay session. The system described herein replicates this by providing more freedom to the player in the game setup mode(s) such that they can make alterations as desired, but once transitioned into the game mode, the disclosed system becomes firmer in its enforcement of the game rules and rejecting player requests to make changes that would not be permitted under the established ruleset. Thus, the game modes described herein have a separation between game setup and gameplay.

In FIG. 4A, a game mode 400 includes a setup setting mode 402, which leads into a create character mode 404, which then leads to a run narrative mode 406. The modes 402 and 404 can be considered part of an initial game setup. The mode 406 can be considered an actual gameplay session. The game mode 400 has a railroaded setup, where a railroaded structure refers to a term in gaming for when the path of the game or a series of steps is established by the game runner (GM) rather than fully open to the player. The open alternative can be referred to as a sandbox environment. The game mode 400 requires and is driven by player interaction (e.g., chat messages, dice rolls). The game mode 400 is railroaded since the player must setup the game setting (block 402) then their characters (block 404). They cannot update the character while in the setup setting mode 402 or update the setting while in create character mode 404. Only once the character is created can the player progress to the run narrative mode 406 and play the game, where they are no longer railroaded. The term railroading can be used to refer to when the player must follow a particular path in gameplay.

In FIG. 4B, a game mode 410 includes a setup setting mode 412, which leads to a create character mode 414, which leads to a run narrative mode 416, which loops with a combat mode 418. The modes 412 and 414 can be part of initial game setup. The modes 416 and 418 can be part of an actual gameplay session. The transition between modes 416 and 418 is typically not considered railroaded as it may or may not occur and its occurrence is determined JIT rather than in advance. As such, in some implementations, it may not be forced by the GM. This mode 410 can represent a version of a game that incorporates combat, thereby causing the gameplay to potentially change between modes 416 and 418. During the gameplay session, the run narrative mode 416 can hand off to the combat mode 418 and then hand back to the narrative mode 416 once combat is done.

In FIG. 4C, a game mode 420 includes a general setup mode 422, which leads to a run narrative mode 424, which loops with a combat mode 426. The mode 422 can be part of an initial game setup. The modes 424 and 426 can be part of an actual gameplay session. The game mode 420 can provide an intelligent game mode, which can determine whether user actions are intended to update their character(s) and/or the game world/setting. Here, the game mode 420 may not enforce or direct changes to only a setting or only a player's character(s) but allows for more flexibility as the AI described herein (e.g., oracle(s)) determines which object should be updated based on the player's messages/prompts. Thus, the general setup mode 422 merges setting setup and character creation in a same step (they can be set up simultaneously and/or in any order in the same mode 422), which can provide an organic user experience.

FIG. 5 shows a block diagram of a process 500 for running a game loop using an AI game engine as described herein. The process 500 can be performed with the goal of sending a response to a player as fast as possible, thereby preferring to issue/transmit a new message to the player before (and/or while) integrating the original player's message into the respective encyclopedia or other data structure (thus integrating the player's message into a game state and/or game world of the player's game). This configuration can provide for higher engagement and faster responses by the player during gameplay. As a result, once the message has been sent to the player, a series of calls (often in parallel) can be made to update the encyclopedia and/or game state. The disclosed techniques can include backloading, which is when sending a response to the player is prioritized and actual computation involved in reflecting the player's message in the game state is delayed. In the process 500, the AI/oracle(s) described herein can be called a wide range of times from tens of calls to hundreds or thousands of times for each iteration of the process 500, which is made possible by the small and parallelized nature of the application. These calls reflect the importance of the oracle AI in supplanting the traditional role of a human GM or hand-crafted code for resolving the necessary operations required to perform complex problem solving or game/domain specific decision making that otherwise would require manual coding. The calls are guide-railed by the architecture 114.

The process 500 can be performed by the backend AI game system 102, and more specifically using the oracle(s) 112 and/or the architecture 114 described in reference to at least FIG. 1. The process 500 can also be performed by one or more other software modules, applications, and/or engines that are programmed to perform the disclosed techniques. Such software modules, applications, and/or engines can be implemented by one or more computing systems, devices, computers, networks, cloud-based systems, and/or cloud-based services. For illustrative purposes, the process 500 is described from the perspective of an AI game engine.

Referring to the process 500 in FIG. 5, a new user/player message can be received at the AI game engine (from a user device) in block 502. For example, once the player selects an option to create or begin a chat in a UI at their user device, the player's selection can trigger creation of the chat and also an AI-powered/generated opening message to the player. In some implementations, the opening message initiated by the AI game engine before any user interaction can be a random selection from pre-existing messages, since there may be no previous user input that can influence this message and a pre-selection would be faster than a generation. While in some implementations, it can be generated by an oracle providing more variability in the start message. In some implementations where the player has played other games using the disclosed techniques, the opening message may have its generation informed by the previous messages from the player's other games. The opening message can provide general instructions to the player about how to interact with the AI, about how to start game setup, and/or about the game (e.g., if the game has already been setup), it may also contain a greeting or game play suggestions, and may or may not be stylized uniquely for the player.

In response to receiving a new player message, the AI game engine can start a rapid response handler (block 504). The rapid response handler can retrieve top level information about the current game and game state by interacting with a database/datastore and an encyclopedia as described herein to prepare relevant information for subsequent operations.

Next, the AI game engine can check whether a transition is needed in block 506. In block 506, the AI game engine can determine whether to continue the current game mode (e.g., a setting conversation such as in block 412 with the player in a current game state), and/or confirm and initiate a transition to the next game state or mode (e.g., in the case of the setting in block 412, a transition to character creation in block 414).

Whenever player messages are received and regardless of a current game state, the AI game engine can confirm that they are in the correct game state. Additionally, the AI game engine can share relevant information about the game state, a trimmed chat context, a selection of recent messages (which can be determined by performing trim operations, such as described further in block 514), and/or recent incoming message(s) from the player. One or more checks (e.g., hard-coded) as part of the architecture described herein and in some cases powered by the oracle(s) described herein can also be enforced before allowing the player to exit the current state that will be performed before executing an AI driven check. As an example, a check can be hard-coded such as ensuring that one or more game or rule systems have been selected when establishing the game setting. This requirement can be enforced as the status of completion for the game or rule system selection can be directly checked. Alternatively, dynamic checks that are generated in tandem by the oracle 112 and architecture 114 can be created and enforced JIT by the disclosed technology. These checks may involve hybrid variations such as the architecture determining that the core fields for a game system must be present, but relying on the oracle(s) to delineate what those game fields are and to determine whether or not they are present. Thus, the architecture can hard code the pathway of the check and the instructions to the oracle(s), and the ultimate determination and parts of subsequent instructions to the oracle(s) can themselves be determined by the oracle(s). For example, once a user chooses to play a rule system, the architecture 114 can instruct the oracle 112 to generate a list of required entries for each PC and NPC in the background. A sample rule system may require that each of these entries have a 'Strength' statistic with a value between 0 and 100 to indicate the strength of their character. This information can be generated by the oracle 112 in response to the architecture 114's request. Once a candidate PC or NPC entry appears near completion and can be submitted to the oracle 112 along with the relevant requirements (in this example the requirements for the Strength attribute). The oracle 112 then evaluates whether the entry is compliant. As such, the disclosed technology may not require the pre-coding of different systems to handle these rule-systems but instead can leverage the oracle 112 and/or architecture 114 to dynamically enforce the relevant instructions. Moreover, a user could request that the oracle 112 ignore, alter, and/or append rules, such that the system is completely customized JIT per a user's preferences.

If no transition is needed, the AI game engine can proceed to block 508, in which AI game engine can generate and send a response to the player at the user device. The AI game engine can also perform block 512 in the background and/or in parallel with performing block 508. Block 512 is described further below and responsible for encyclopedia entry updates, such as the character when in character creation mode and/or narrative mode. In some implementations for multiplayer character creation, a sending player may already be done and ready to transition, while one or more other players are not yet done. In this example, the AI can respond to the sending player about the transition while politely nudging the remaining players to finish their characters or confirm a suggestion from the sending player. Generating the response in a narrative mode/state can involve a different process than in setting and/or character creation modes/states. For example, in the narrative mode, the AI game engine can perform a multi-step process that can also be variable based on which persona (e.g., narrator, GM, NPC(s)) the AI chooses to respond as. The first step can be to annotate/verify the player's message, as described further below. The player's message may not create items, only an AI generated message in some implementations. The message can then be generated based on determining the relevant persona and then generating the message per that personas flow. The AI game engine can also analyze the player and the AI response in order to create an NPC memory (e.g., if they could observe the events in the narrative state), change a location of a person or item, update plot threads, and/or update narrative states. The responses can also be generated in the narrative state with AI personas. For context, in a TTRPG, the GM can be both the rules arbiter and clarifier, the world, and characters in that world. As such, for describing world events, the AI can respond as narrator. When responding as specific character(s), the AI can respond as one or more NPCs. The AI can also provide the response as an organic dialogue between the character(s)/NPCs and break up the response into multiple messages rather than a single one. When clarifying rules or issuing a dice roll, the AI can respond as the GM, so as not to have an NPC breaking a fourth wall. The narrative response can also be responsible for identifying items relevant to a current conversation based on the recent messages, the setting, the narrative state, and/or the player(s)' character sheet(s). This can involve the AI game engine performing direct lookups based on embed links, vector searches, and/or by leveraging a location tracking system as described further below.

This system can also be tasked with retrieving pre-prepared content from the generation of the last message to contextualize the next messages' generation, parsing any markdown enhancements, and identifying whether the GM, Narrator, and/or any NPC with both observation and the ability to interact in the scene may choose to respond. It can then trigger parallel generation for each of these entities such that all necessary responses may be provided. These responses can also be synthesized to provide the most cohesive response format, such that if two NPCs are responding, their responses can be woven together as a dialogue between characters rather than independent monologues. This system can also be responsible for checking the location-to-listener records, which can help to account for whether or not someone is remotely observing the scene with the ability to interact, they can be brought into the interaction if they choose to act.

After generating and sending the response in block 508, the AI game engine can proceed to block 510, which is described below.

If a transition is needed in block 506, the AI game engine can move to a next mode/state and proceed to block 514, in which the AI game engine can trim context and internal message summary. The AI game engine can then proceed to sending a transitional message to the player at the user device in block 516 before proceeding to block 512, described further below. The AI game engine can trim information that is sent to the AI whenever there may be a transition so that the AI can process as little as possible to turn around fast and accurate results/responses.

As an illustrative example, when leaving a game setting setup mode to go to a character creation mode, the AI game engine can avoid generating any response from the game setting setup mode and instead can call a version of a character creation generator that has a prompt tailored to introducing the character creation mode. This version allows for automatically picking up where the game setting setup mode left off to help guide the player into the next steps of character creation. When leaving the game setting setup mode for the character creation mode, the AI game engine can also trigger one or more background operations/operations to be performed in parallel. The background options can include but are not limited to creating starting location(s), creating starting NPC party members, setting up an initial narrative tree, assigning player characters and NPCs to the starting locations, etc. Such operations can be performed in the background as early as possible by the AI game engine so that when the player does in fact reach the end of character creation and transitions to the narrative mode/state, all the abovementioned elements are already prepared.

In order for the game loop to receive a transition needed signal, a two-step process can be performed. In that process, the AI described herein can deem the game ready for the transition. The AI can also acknowledge/detect that the player is confirming the transition. As an illustrative example, the AI can detect that the game is ready for a transition and thus query the player. The AI can return a response to the player such as "We have prepared a wonderful world of adventure! Shall we explore it further or are you ready to begin setting up your character?" The player can input a response message, such as "I am ready to make my character!" The AI game engine can process the player response message to detect the player's confirmation to transition. The AI can then respond to the player with instructions about creating the player's character(s) while also performing additional background and/or parallel processing.

If the player is creating a character, the AI described herein can generate a list of fields to be populated in order to create a character for a current game system(s) determined during setting setup. As the player progresses through the character creation mode, one or more checks can be performed so that the AI game engine can return a recommended next step to fill out any missing fields. The AI can then present responses to the player to get information necessary to complete the missing fields. The check can also be performed to generate a boolean value indicating whether or not a transition is needed (e.g., the transition may be needed once the player provides information for all the missing fields). As such, character creation can be of variable length/dynamic, as it can be validated based on the game system and without a need to write a game system specific code.

In some implementations, a transition may be needed out of a narrative mode/state if combat has been initiated. In that case, the transition can be into a turn-based mode that may not update a narrative tree. In the combat mode/state, the UIs can be updated and the backend system 102 can now focus on listing participants, placing the participants in a correct order for each turn, and/or tracking health for each participant throughout the combat mode. The backend system 102 can also issue damage updates to the player if/when they are hit. When certain participants are knocked out or eliminated, the AI can also remove them from the tracking. Additionally and/or alternatively, normal inventory type updates/management can occur simultaneously/in parallel for consumables. On the backend, the AI game engine can also collapse messages that are provided during the combat mode into a summary so as to avoid cluttering a context window that is presented in the UI for the player at their user device or cluttering the context presented to the oracle(s).

If the transition is needed in block 506, the AI game engine can also initiate in the background and/or in parallel, performance of block 512, in which the AI game engine can update entries in an encyclopedia associated with the player's game based on the new user/player message for the prior state as the new state is being transitioned to. Refer to FIG. 6 for further discussion about performing the background and/or parallel processing.

In block 512, the AI game engine can update/populate different types of data fields. One or more game setting fields can be updated in block 512 during a game setting setup mode. A non-limiting illustrative list of example game setting fields include but is not limited to: user preference on setting spoilers, genre, tone, tropes, pacing instructions, general game description, start location description, magic level, tech level, travel level, weapons level, computing level, energy level, materials level, biological level, cultural level, bureaucracy level, nationhood level, social stratification level, commercial philosophy, governmental structure, nation state relationships, magic energy level, game systems to draw from, linked dice systems, plot hooks, geography landmarks, NPC cast archetypes, flavour text, core characters to include, starting party members, and/or notes. Sometimes, the AI game engine may only update one object: the game setting. Data fields such as plot hooks, geography landmarks, NPC cast archetypes, core characters to include, can be a complex type including multiple entries and/or sub-details within an entry. Moreover, some fields. while complex (e.g., list, dictionary/object) and/or simple (e.g., boolean, integer, string) can trigger generation of full new objects. A data field such as starting party members can indicate what other NPCs may be accompanying the player from the start of the game. This field can later trigger a background generation of these characters where full NPCs are generated based on the details provided. These operations can be backloaded and performed in the background to avoid delaying the AI game engine's response to the player.

During the character creation mode/state, only some entries may be updated in block 512. For example, the entries that can be updated can refer to one object—the player's character. If multiple characters per player are allowed, then data entries can be updated for any character controlled by the player in block 512. Performing block 512 can also include adding an additional lookup layer to identify which characters to update. Changes can be applied to multiple or all characters if so requested by the player. The AI game engine can also use a process model approach, as described further in reference to FIG. 6, similarly to the game setting setup mode, to recursively and parallelly handle the update to player character data fields. A non-limiting illustrative list of example player character fields include but is not limited to: name, background, demographics, role, faction affiliations, game stats, current health, ability groups, inventory, travel modes, and/or notes.

One or more other entries can also be updated by the AI game engine in block 512. For example, the AI game engine can update health, inventory, and/or currency data fields in the encyclopedia associated with the player's game. Consumables data fields can additionally or alternatively be updated (e.g., ammunition, currency, grenades, magical charges, gaming energy/potential (e.g., mana) by the AI deducting items when used and/or adding them back at appropriate times when such consumables are recharged/refreshed. Similarly, buying and selling items can result in the AI making the appropriate additions and deductions to the corresponding data fields in the encyclopedia.

During the narrative mode/state, the AI game engine can also update entries in the encyclopedia in block 512. Beyond the updates described above, the AI game engine can also determine whether existing entries (e.g., entries that are linked, entries associated with the player's character) require additional updates or changes. For example, if the player used a healing portion, then the AI can remove the portion from inventory and restore the player's health. A character player or NPC leaving an area can update the relevant trackers. A PC or NPC placing a bug or scrying a location can update the relevant trackers, etc. Other examples include, but are not limited to, an NPC mentioning an upcoming event for which the system can then link to the relevant location(s) and faction(s), an NPC introducing a new item for sale or as a quest reward triggering an encyclopedia record creation of the described item, etc. It should be understood that the disclosed system is not limited to only updating entries linked to an NPC or PC. These are merely intended to be illustrative, non-limiting examples.

When working with player messages in the narrative mode, the AI game engine can annotate them with universally unique identifiers (uuids). As a merely illustrative example, the AI game engine can annotate the following illustrative message with the information in brackets and paratheses: "The merchant offers to sell you his grandfathers [magic sword] (item://b660c1b0-db92-43b7-b6bc-3c6d40e91e0f) for 500 gold or his [bag of holding] (container://3c62b0e9-8862-45da-a6fc-f81e96ba412e) for 1000 gold." The annotations help the AI game engine to avoid duplicating items that have already been created, thereby creating a sense of object permeance. As a result, if a player has two crossbows and one breaks, the AI game engine can rely on the annotations to distinguish the two crossbows and update the relevant one's properties/entries.

In order for the AI to generate a new item, in some implementations, it can generate a prompt such as the following illustrative prompt: "The merchant offers to sell you his grandfather's magic sword for 500 gold or his bag of holding for 1000 gold." The AI can then be triggered to reflect on this message and check whether new items have been introduced in the narrative mode. If new items have been introduced, the AI game engine can create a corresponding object and mark up the text, as described above in reference to annotating the player messages. Advantageously, when prompting the AI, the AI game engine can easily identify the encyclopedia entries in play and add them to a context window for the gameplay. The AI game engine can also allow the AI to request more information about an entry by using the entry's ID or by searching for information by name. These techniques can improve consistency and response quality of the AI game engine. It is also worth noting, that the system may cancel certain actions/requests at a later time, such as the system choosing to cancel a roll request or request for information; typically this would happen if the request/action was deemed unnecessary for one or more reasons.

In some implementations, the entry IDs can be shown as clickable links on the frontend at the user device to allow the player to jump to a relevant entry. For example, the player can view detailed stats about their sword by clicking on a message with the linked ID for the sword. In some circumstances, certain fields may be intentionally occluded from the user to indicate intentionally hidden fields that may be hidden for gameplay or narrative reasons, such as the character needing to inspect the item to reveal them. In some implementations, the AI game engine can perform lookups in advance, then add information about entries into the relevant oracle context. Sometimes, the AI game engine can provide a combination of the above two implementations.

Once the entries are updated in block 512, the response generated and sent to the player in block 508 can be processed in block 510. This allows block 510 to be performed similarly to block 512 on the information newly generated by the oracle in response to the player. This also helps prepare the game state for the next generation by processing the response as early as possible. Such generation of context can be performed in the background whilst the player interacts with the most recent generation.

The AI game engine can also check if a context can be trimmed in block 518. Referring to both blocks 514 and 518, to ensure that the context provided to the oracle is not overpopulated the AI can be prompted to, after every message, check whether the message history can be trimmed reducing the number of messages that need to be sent to the oracle when generating the next response and/or relevant updates. The AI can indicate an ID of a first message to be included, which can be used as an offset for a recent message buffer for future messages. As messages are cleared out, the AI game engine can also maintain a summary message that can be grown and adjusted by the AI to preserve a context of the trimmed messages. Thus, the AI game engine can retain a digest version of prior events in the player's game. The difference between blocks 514 and 518 is that block 514 aims to clear the majority of the buffer in preparation for a transition, while block 518 is smaller in scale of updates as it is meant to operate within a game mode rather than at the transition between game modes.

A traditional AI system lacking the architecture described herein can run into issues during gameplay, such as failure to progress a narrative further (e.g., the game stalls out), inconsistent information, failure to keep track of what previously happened, inconsistencies in locations and/or directions, failure to enforce game rules, failure to close a scene without building up a next scene, etc. The disclosed process 500 can be performed to resolve many of the abovementioned issues. The AI game engine can also generate and follow pacing instructions to resolve such issues. Based on interactions during the game setting setup mode, the AI game engine can establish variables to guide the pace of the narrative. For example, the AI game engine can track active game longevity and pace level. The active game longevity can refer to whether the user wants to play a short game that will end within a few hours (e.g., a one shot in a TTRPG context), a long form game that will be played over weeks or months (e.g., a campaign in TTRGP terminology), and/or a sandbox game, where there isn't necessarily a clear end goal (e.g., open world in CRPG terminology). The pace level can refer to how quickly the AI game engine may want to close story-beats and scenes and how much of a sense of rising action should be embedded at the game. The AI game engine can ask the player about their preference for longevity to ensure that the AI game engine populates the correct fields based on the correct assumptions.

The AI game engine can also resolve the abovementioned issues by creating and maintaining a narrative tree. To help keep the narrative on track, the AI game engine can establish a multi-layered internal (hidden from the player) representation of the narrative. This can show how the AI thinks about a narrative journey in broad strokes to be colored in by the player's actions. The narrative state can include a tree of features, including but not limited to narrative, season, act, chapter, scene, story beat, open plot thread (e.g., breadcrumbs), and/or completed plot thread. With these features nested within each other from season as the highest level and story beat as the smallest, plot threads can be tracked separately. Story beats can be expected to be short atomic interactions that drive the narrative (e.g., usually between 3-5 messages). Scenes can contain multiple beats and may be aimed at the resolution of some action. Chapters can be a longer form and may revolve around multiple developments (e.g., scenes). Acts can be stages of the tale/heroes' journey with major developments within each. Seasons can be similar to campaigns, which can generally include a culmination of thousands of messages, and whole story arcs.

Before a game begins, the AI game engine can populate one pass from season to story beat to establish a starting point for the narrative. Plot threads may or may not be seeded at the beginning as open elements to be drawn on. They can also be generated as the story progresses. For example, an NPC can mention "trouble in the east," which can cause the AI game engine to set up a plot thread that the players may or may not follow. As one example, the players can go explore the plot thread and the AI can generate new content for the story. As another example, the players can ignore the plot thread, and the story can lead to a new revelation. The AI can then explain that the new revelation had been foreshadowed by the trouble in the east, with a message such as "didn't you hear about the trouble in the East?" While the AI generates original messages, the AI can generate breadcrumbs that link the original messages to changes in the storyline that occur during gameplay. The breadcrumbs can provide options for future AI responses to draw on, thereby creating intricately foreshadowed moments in the gameplay. Contrarily, players following a lead such as exploring the "trouble in the caves" and then scaring away bandits in the cave can lead to the AI game engine moving this plot thread to the completed plot thread section, so it is no longer eligible for tie-in to future narrative moments.

Another way the disclosed technology can overcome one or more drawbacks of the traditional gaming systems is by providing temporal tracking and a game date system. To maintain state appropriately, the AI game engine can maintain a sense of time. This can help account for several factors, including but not limited to a difference between memories and the current moment, travel time, background events, a living world where holidays can arrive on schedule, etc. Some games may contain flashbacks and time travel, which adds another layer of complexity as the AI game engine manages locations across time to ensure that the view of the location provided is the correct one for the time being encountered. Temporal tracking can be closely tied to the narrative tree, as each story beat preserves its start and end time. The AI game engine can also allow the AI to customize dates, so that any calendar relevant to the game world can be used. A numeric count, such as with days or a different granularity, can also be tracked by the AI game engine from game start, creating a numeric offset, to allow for easier and faster checks between times. The AI game engine can also define the game date system and provide an explanation of this system as a prompt to future date generations to ensure consistency.

FIG. 6 shows a block diagram of a process 600 for updating information in real-time as a game is being played. In some implementations, the process 600 can be performed as part of performing various blocks in the process 500 of FIG. 5, but in at least block 512. Updating objects can be a complex task. For example, sending a large complex type (many fields (e.g., array/unstructured object/structured object) types) request can lead to exceedingly long responses. Thus, the process 600 can provide an approach for modularized, small, parallelizable, and fast operations. An incoming player/user message may not have the data needed to update an entry (e.g., the player can say something such as "that is a great suggestion," to which the AI game engine described here may need to reference the contents of one or more prior message(s) or the trimmed context summary generated by blocks 514 and/or 518). Additionally, the data from the player may only be relevant to a subset of fields to be updated in a relevant encyclopedia. The disclosed process 600, therefore, can implement a flat/flattening layer structure to break down an object into component parts which may be updated accordingly. As an illustrative example, the disclosed technology can take in an object, determine each value inside the object, and/or whether the object has another layer(s) (e.g., dictionary, list). If the object has an unstructured object (e.g., a PYTHON dictionary), then the disclosed technology can determine what the keys are first (e.g., considering both existing and potentially novel new keys that would need to be inserted), then can retrigger this process for each of those keys and look for keys that may be triggered. The disclosed technology can decide what it should do in response for each of the triggered keys (e.g., add, delete, update). Similar operations can be performed if the object contains a list, in which the disclosed technology can establish a plan on how the AI will perform insertions, updates, deletions, and/or upserts (e.g., insert if not found, update if found). If many objects need to be updated in the encyclopedia at the same time, then the disclosed techniques in the process 600 can be performed for each of those changes in parallel, where each field whether it is a basic or complex type is processed. The process 600 can also include looping through one or more of the operations described herein (e.g., loop through fields, process model, process dictionary) and/or performing one or more of the operations in parallel. As such, process 600 is recursive (e.g., re-entrant) and multi-threaded for the processing of complex objects of variable types and sub-types.

The process 600 can be performed by the backend AI game system 102, and more specifically using the oracle(s) 112 and/or the architecture 114 described in reference to at least FIG. 1. The process 600 can also be performed by one or more other software modules, applications, and/or engines that are programmed to perform the disclosed techniques. Such software modules, applications, and/or engines can be implemented by one or more computing systems, devices, computers, networks, cloud-based systems, and/or cloud-based services. For illustrative purposes, the process 600 is described from the perspective of an AI game engine.

Figure 7:
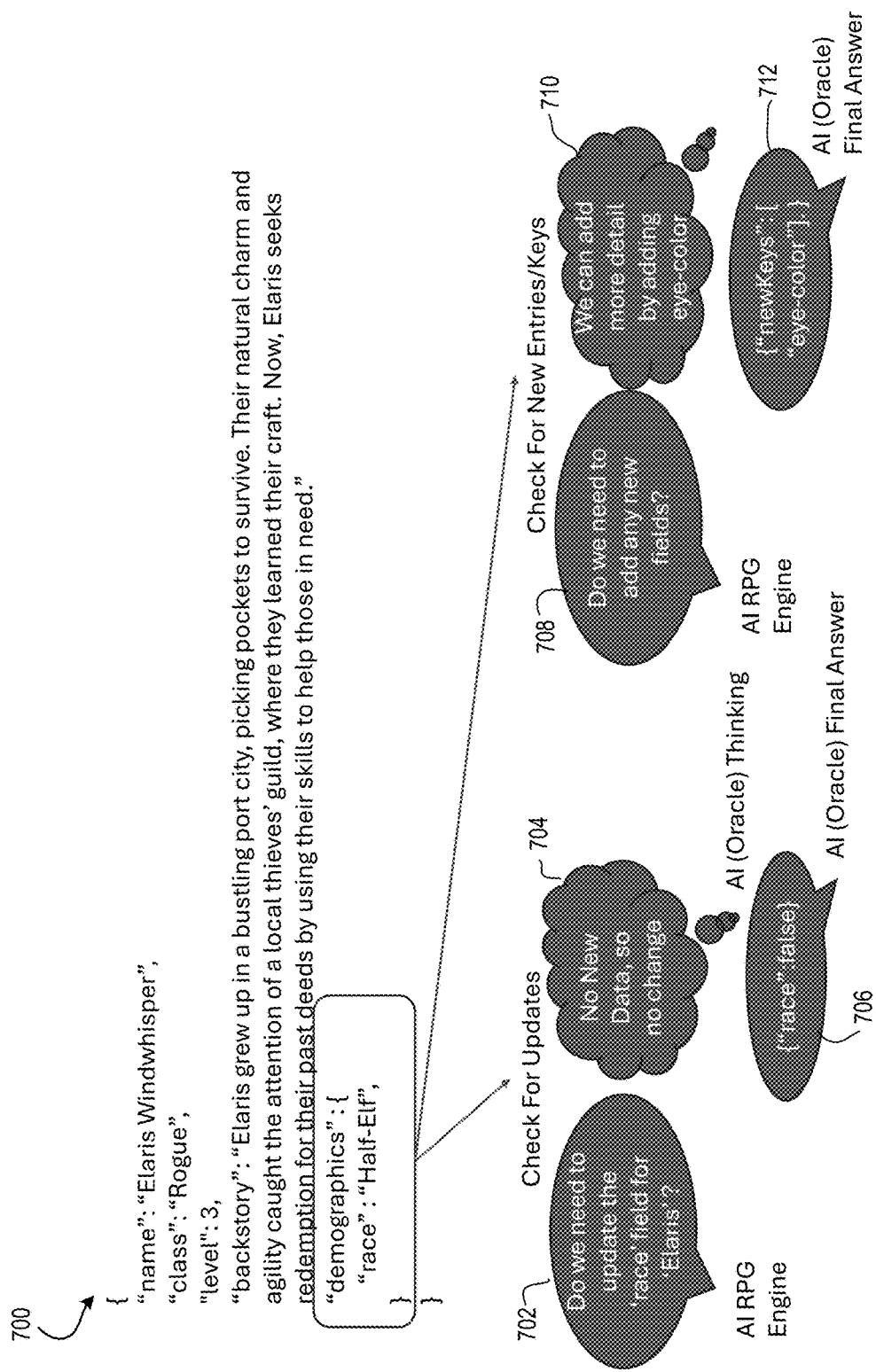
FIG. 7 shows a conceptual diagram of a process for updating an unstructured object, or associative data record where keys can map to values without the key names needing to be known in advance or encyclopedia component through interaction between a backend game system, its architecture, and/or one or more oracles.

In the process 600, the AI game engine can ask for booleans in block 620. Refer to FIG. 7 for further discussion. A first operation can include breaking down a problem (e.g., message) into smaller pieces. To determine what needs to be updated and what does not need to be updated, the AI game engine can reframe the object into an intermediary representation, such as a structured object, where each field name can be associated with a boolean. In this example, fields that are lacking available information can be identified by the oracle described herein with a boolean value of true indicating that the field can be populated with the available information or is in need of an update, whereas fields already having input that does not need to be updated, that are empty, or where relevant information for updating them is lacking can be identified by the oracle with a boolean value of false. With an intermediate representation such as this the AI game engine can frame the question of what should be updated to the oracle AI based on the available information and restrict the oracle output to an un-ambiguous response, in this example boolean values. A request about what to update can be sent to the AI in singular or batch format depending on whether one or multiple fields status should be queried in a single request. In some implementations, a request can be sent specific to each individual field such that the AI game engine only breaks down the problem into a call per field that each return one boolean response. Other implementations may instead break down the problem such that a single call could be for a group of fields such as for example asking about the status of 3 field entries, such that the returned response contains information about all 3 in one response. The AI game engine can take advantage of a lack of dependency between fields and therefore run them in parallel for structured and unstructured objects. Similarly, processing can be parallelized for list change instructions and/or basic fields. The architecture and encyclopedia described herein can be designed intentionally to eliminate or otherwise limit dependency relationships to facilitate this parallelism. The architecture can be careful to handle any special dependency cases in serial when absolutely necessary as part of its architectural design.

Sometimes, a single field, such as travel modes or inventory, can be complex, so the AI game engine may break down the field further. The AI game engine can utilize a recursive traversal system in the process 600 to perform this operation. This system can, for example, break down each list into its component entries, which in turn can be processed via the process 600, which in the case of inventory can be to handle structured (block 626) and unstructured objects (block 628), which in turn can continue to be broken down into their component parts until only basic fields (block 624) remain. This way, the process 600 acts as a generic solution for arbitrarily structured and nested objects helping to abstract away part of the AI game engine's interaction with the oracle from the data storage and design described herein. Advantageously, this approach can improve performance and quality by leveraging smaller parallel queries to the AI oracle and causing only a dependency relationship consideration to be passed on to the object design.

As such at each layer, the AI can ask itself what fields it should populate. Then, the code in the AI game engine can determine whether the field to populate is defined as basic (e.g., numeric, text, boolean) (refer to block 624), and therefore can be populated now, or complex (refer to blocks 626-630), which would require digging/recursing to another layer to populate. Therefore, as shown in the process 600, the AI game engine can continue to recursively travel down the object until it reaches the atomic basic fields composing the large object, these basic fields can then be requested from the oracle AI. Parent layers of the object can be responsible for collecting data from all the fields at lower levels of the object and merging them into a fully populated complete object. As a result, the process 600 can eliminate complexities of large requests by using established code to supplement and direct the oracle AI. The complexity of the objects nesting structure can be removed from the domain of the oracle and can be integrated into the architecture for an optimal synergy. This approach can be applied to any model or object representation so long as the fields are independent and parallelizable, if there is a dependency the same process can be used but with serialization for the relevant data.

This exploration of objects is driven by block 622, which in turn can use blocks 624-630 based on the field types to complete the recursive population of the object.

In block 624, the AI game engine can populate one or more basic fields, if a basic field 650 is identified as needing to be updated. The basic field can be populated using a retry system 602 and/or the oracle(s) 112 described herein. As non-limiting illustrative examples, a basic field could be a personality attribute/field, which would have a string type, an item description (string), item quantity (integer), and/or is_magical (boolean). The retry system 602 can wrap each call to the oracle, which often includes networked API calls. Should a request fail for any reason, the retry system 602 can issue subsequent requests in an effort to complete the required data and overcome any issues network or AI related. This lower layer within the oracle helps to improve the reliability of the oracle and reduce the potential for errors to cascade, thereby helping to prevent the cumulative failure probability of the system from growing. The retry loop in the retry system 602 can check the resulting object from the oracle AI against the expectations for the object provided as part of the structured output guidance. Fields that are aligned with these expectations are accepted, while required but missing, or invalid fields are ignored and re-queried until a full and complete object can be returned or the maximum attempts is exceeded and an error propagated up to the calling context. The retry system 602 can be managed on a per call basis, as such a retry manager exists for each parallel request, so that each request can be managed, verified, and if needed re-queried independently of all other active requests. This system 602 allows each request to be retried up to a predetermined amount (e.g., 5 times). If a request is partially completed and unable to fully populate, a viable portion can be provided back to the AI game engine. The AI game engine can then determine how to proceed such as by using the viable parts and leaving the rest empty, ignoring the whole object, and/or raising an error. If no data is available an error may be raised from the retry system itself. Lists of basic types, on the other hand, can require a call to populate the field, while lists of objects (such as list 656 described below in relation to blocks 630, 638, 640, and 642) can involve parallel recursive calls.

If a well-defined, structured object 652, where the field-names are known in advance for at least the first layer, needs to be updated, the AI game engine can execute a process model in block 626. The AI game engine can then loop back to block 620 to ask for booleans and iterate through the process 600. The process model, the sub-routine/sub-system for processing structured objects, can also benefit from descriptive instructions carefully curated for each field, as its fields are known in advanced as opposed to unstructured objects, which do not have pre-known keys. As such the block 626 can use a smart retrieval system to pull the relevant descriptions into the request sent to the oracle, such that it is better instructed on the contents expected for each of the fields. This results in a dynamic prompt injection of instructions based on the descriptions of the fields relevant to the current query as opposed to strictly hard-coded prompts to the AI oracle. As a result, the AI can be contextually primed to handle the field in different scenarios. Process 600 may use existing parts of the record or actively generated content while the operation is ongoing as part of the additional context provided in the instructions to the oracle.

Figure 8:
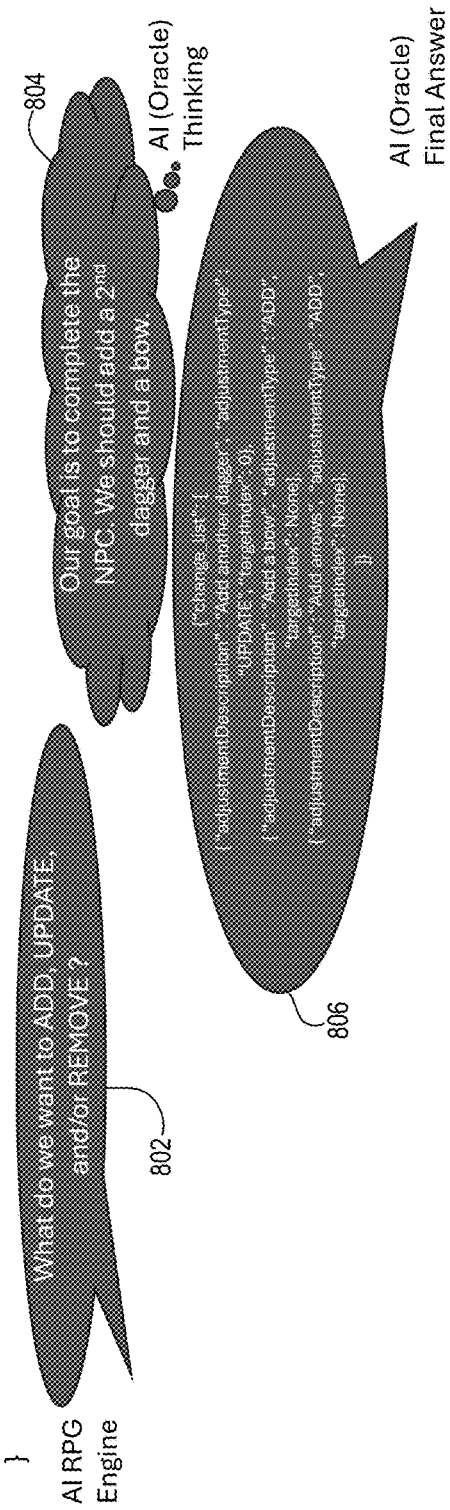
FIG. 8 is a conceptual diagram of a process for performing a change plan through interaction between a backend game system, its architecture, and/or one or more oracles.

If an unstructured object 654 requires updating, then the AI game engine can use the process dictionary subroutine/subsystem in block 628. For example, the game engine can, by using the oracle and based on looping, process hash-table data structures to update one or more entries in the dictionary or encyclopedia. Similar to ask for booleans (block 620), which acts on structured objects, check for keys (block 632) inquires with the oracle about which existing entries need to be updated/removed by using the key names in place of field names, it also uses check for new keys (block 634) to uncover if entries need to be added, and looping through each of the keys in block 636, which is the unstructured version of the structured object's block 622. Refer to FIG. 7 for further discussion about checking existing keys and checking new keys when performing a dictionary update If a list 656 requires updating, then the AI game engine can process the list in block 630. Processing the list can include establishing a change plan (block 638), looping through the plan (block 640), and processing each index in the list (block 642) before returning to loop through the fields in block 622. Refer to FIG. 8 for further discussion about updating lists with a change plan. A list can be a list of structured/unstructured objects, other lists, or basic fields. As such, lists can undergo the same or similar recursive process as objects described herein.

Referring to blocks 638, 640, and 642, lists require an index to identify a target field to update. Therefore, unlike updating the well-defined object 652 and/or the unstructured object 654, the AI game engine can take a different approach to updating the list 656. For example, the AI game engine can show the AI the list 656 or a summary representation of the list entries, and ask the AI to identify a list of proposed changes. Each change can include an index (if applicable), a description of the change, and whether it is an insertion, update, removal, or upsertion. The code in the AI game engine can then verify that update and remove operations have indexes and insertions are treated as appending. In some implementations, the AI game engine can provide direct element insertion (using a specified index). The AI game engine can then iterate (serially or in parallel) on the AI generated requests for insertion, update, removal, or upsertion.

Once the AI game engine is done looping through the fields in blocks 622-642, the AI game engine can return the completed object in block 646. The returned completed object can then be passed to one or more verification systems powered by the verifier engine 610. The verifier engine 610 can review the object(s) in the context of the game system and validate each individual field to ensure that it is appropriately and completely populated. The engine 610 can add an additional layer of robustness against hallucination and increase the completeness of responses. For example, the engine 610 can ask a series of questions based on the known objects/objects that have been updated. Then if the verifier engine 610 determines that information is missing for the known object(s), the verifier engine 610 can send a series of new special request(s) contextualized by the current object(s) to the oracle to receive additional data that can enhance, augment, update, and/or supplement the current data. In other words, the verifier engine 610 takes a detailed pass over the generated object to help pre-emptively resolve any issues that might arise in the generation flow and ensure that every object is game-ready. This system can be driven by a combination of architecture driven guidelines and oracle populated fields and instructions that are generated by the oracle under the context of the current game system(s).

As an illustrative example of the verifier engine 610, the game system(s) selected during a game setting setup mode can be provided to a custom AI prompt to generate the required elements in order for a player character to be deemed complete and ready to play. A transition exit out of the character creation mode can invoke the AI verifier engine 610 described herein to compare each of these required elements with the current player object to identify if all required fields are populated or a next step should be suggested to the player to help them provide the required information to complete their character(s). This is an illustrative example of an AI driven verifier engine 610, in which no hard rules are made for any game system, but the AI is capable of generating a comprehensive checklist over the course of multiple uses of the oracle guided by the game engine architecture. Additionally, the game engine requirements generation process can be one that is also oracle driven as the response from the oracle not only contains a list of elements, but a flag to indicate whether or not the oracle believes more requirements may be needed. Thus, the generation process for these requirement(s) may occur over multiple requests.

In some implementations, as described above, the AI game engine can also implement in-code check(s) in the verifier engine 610 that can be driven by the architecture as opposed to the oracle. In-code check(s) are elements that can be non-variable for example certain elements of dice rolling instructions that must conform to pre-established formats. These kinds of format checks can be performed in extant code without the use of the oracle. The disclosed architecture can use a hybrid approach combining AI-powered verifiers and code-only verifiers when applicable to provide optimal efficiency and flexibility. As game objects are complex and variable, many different verification steps are often need to ensure that player character, NPCs, abilities, stats, items, maps, locations, and more are properly prepared and ready to be used in a game play context. For example, items, abilities, and core statistics can often be used as part of checks, or combat and as such must contain the relevant information for dice rolling instructions. Determining whether or not the correct and sufficient information is present is one of the roles of the verifier engine 610.

FIG. 7 shows a conceptual diagram of a process 700 for updating a dictionary or encyclopedia. The process 700 can be performed by the backend AI game system 102 described herein. The process 700 can also be performed as part of performing blocks 632 (check existing keys) and 634 (check new keys) in the process 600 of FIG. 6. For illustrative purposes, the process 700 is described from the perspective of an AI game engine.

In the process 700, the AI game engine can check for updates by asking the AI (e.g., the oracle(s) 112 described herein) whether they need to update one or more fields for a nonplayer character in 702 (or any other object or element in the game world). As described herein, the AI game engine can check for updates based on asking the AI whether they need to update one or more fields for other characters, players, items, objects, and/or elements in the game world.

The AI can process and check data fields associated with the nonplayer character in 704, and determine that no new data has been provided, so no change is needed. This reflects an opportunity for the AI to think before establishing the final response.

The AI can return a result or final answer indicating that the one or more requested fields have or have not been updated in 706. For example, the AI can return a boolean value for the one or more requested fields. If the field(s)

should be updated or no change is needed the returned boolean value can be false. If the field(s) should be updated or change is needed, the returned boolean value can be true.

In the process 700, 708 reflects the AI game engine can check for new entries or keys by asking the AI whether new fields/keys should be added.

710 reflects the oracle being given time to think about the task before generating a solution. The AI can process and check the data fields associated with the relevant object, in the sample case in the figure a nonplayer character in 710, and determine that it can add more detail by adding additional fields (e.g., eye color) in 710.

The AI can then return a result or final answer in 712, which can indicate the new field(s) that was added/for which a new key was generated. In some implementations, the AI can also return in the result a value that is added to the new field(s). In cases where no value is desired the AI can return an empty list or none/null entry to indicate no insertion.

The process 700 represents a sample object, but the techniques and operations shown and described in the process 700 may be used with any unstructured object in the AI game engine.

FIG. 8 is a conceptual diagram of a process 800 for generating a change plan, such as for updating a list of entries. The process 800 can be performed by the backend AI game system 102 described herein. The process 800 can also be performed as part of performing blocks 630 (process list), specifically block 638 (establish change plan), of FIG. 6. For illustrative purposes, the process 800 is described from the perspective of an AI game engine.

In the process 800, the AI game engine can ask, in 802, the AI (e.g., the oracle(s) 112 described herein) what should be added, updated, and/or removed in an inventory list for a player character.

In 804, the AI can process and check data fields associated with the nonplayer character in 804, and determine that the goal is to complete the NPC, so the AI game engine should add additional items to the inventory list (e.g., a second dagger and a bow). This operation represents one or more thinking operations in the oracle before a decision must be made.

The AI can then return a result or final answer in 806, which can indicate which items are being added, updated, and/or removed in the list. The result or final answer can also indicate a target index for each of the items in the list that is being added, updated, and/or removed.

FIG. 9 is a conceptual diagram of a process 900 for updating structured objects, which can include asking for booleans to indicate what needs to be updated. The process 900 can be performed by the backend AI game system 102 described herein. The process 900 can also be performed as part of performing block 620 (ask for booleans) in the process 600 of FIG. 6. For illustrative purposes, the process 900 is described from the perspective of an AI game engine.

Referring to the process 900, the AI game engine can ask the AI (e.g., the oracle(s) 112 described herein) whether the engine is ready to fill in a field (personality for a player character as the illustrative example in FIG. 9) in 902. This operation would likely occur in parallel to 908 in the same figure.

The AI can process and check data fields associated with the nonplayer character in 904, and determine that the AI game engine can set up the nonplayer character's personality based on a backstory field. This reflects the presence of thinking operation(s) to consider the situation before answering.

The AI can then return a result or final answer in 906. The result or final answer can include an indication of the target field being completed. The result or final answer can include information that is generated by the AI to populate the target field based on the other field associated with the relevant object or contextual information provided.

908 illustrates the same or similar operation as 902, but is presented to highlight the parallel nature of these kinds of operations. The AI game engine can ask the AI whether the engine is ready to fill in any other field for the relevant object at the same layer as part of processing, and in some cases, layers above and below as well.

The AI can process and check the data fields associated with the player character in 910, and determine whether the engine has or does not have enough details about the relevant object to complete the field. This is the same or similar operation as 904 and is present to reflect the parallel nature of oracle operations.

As a result, the AI can return a result or final answer in 912, just as in 906, which is the same type of operation occurring in parallel. The AI can return many different types of results for the final answer including a none/null response to indicate insufficient information.

Figure 10:
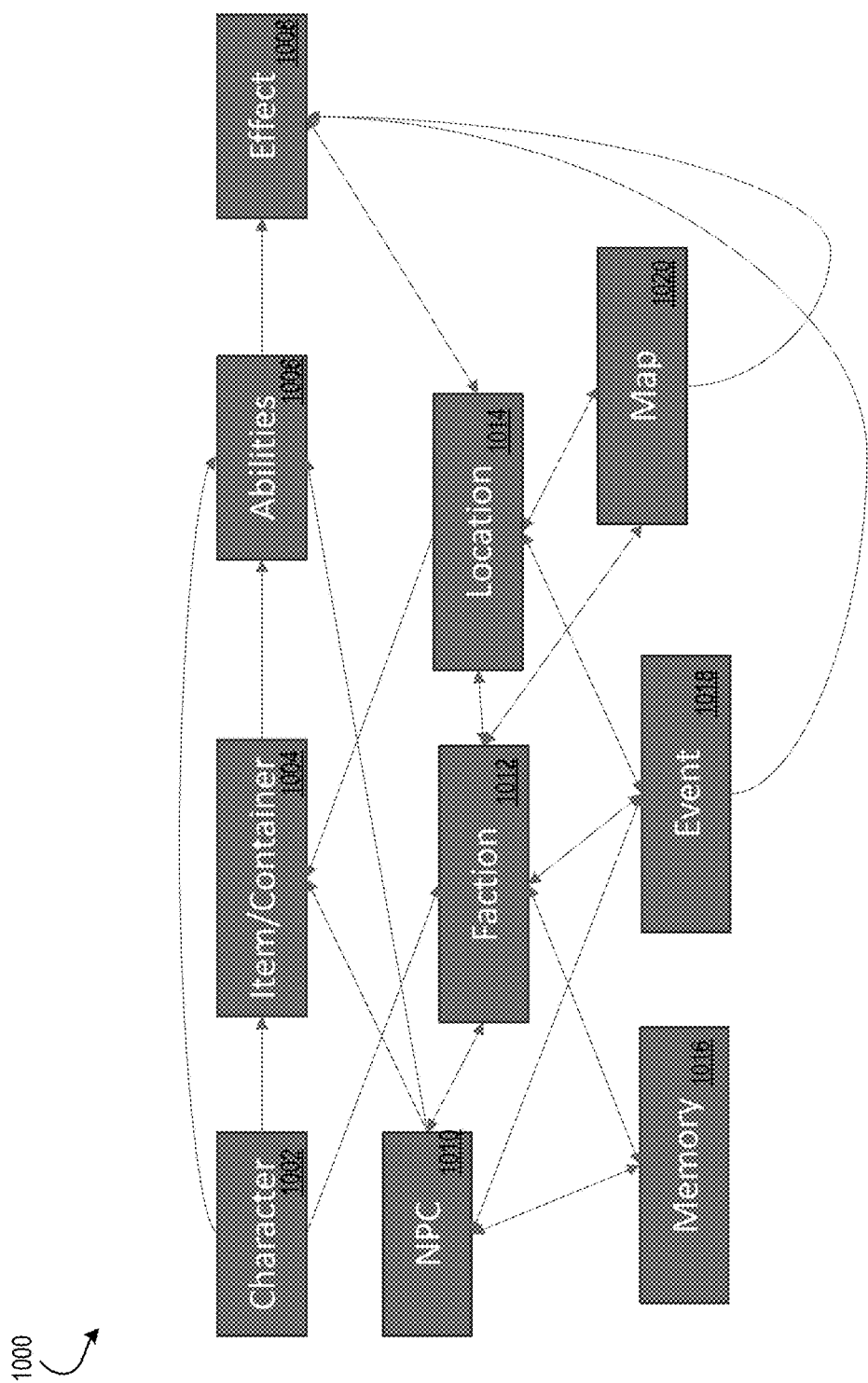
FIG. 10 illustrates an example of a knowledge graph that can connect entries of an encyclopedia described herein.

FIG. 10 illustrates an example knowledge graph 1000. The knowledge graph 1000 can show how different encyclopedia entry types are interconnected with each other helping to keep the game world consistent. The knowledge graph 1000 can also illustrate nesting relationships. In some game worlds, connections between some attributes/fields can be unidirectional. In other game worlds, the connections between some attributes/fields can be bidirectional.

Here, the knowledge graph 1000 shows an illustrative but nonlimiting example relationships between one or more of the following encyclopedia entry types: character 1002, item/container 1004, abilities 1006, effect 1008, NPC 1010, faction 1012, location 1014, memory 1016, event 1018, and/or map 1020. Although the example encyclopedia entry types in the knowledge graph 1000 are shown/described in the singular, there can be one or more of each of these encyclopedia entry types (e.g., multiple characters, multiple locations). In some implementations, the character 1002, the item/container 1004, and/or the effect 1008 can each have different, the same, and/or similar abilities 1006. Sometimes, the location 1014 can have active ongoing effects 1008. As another example, the location 1014 can have one or more map(s) 1020, but only some of the maps 1020 and/or locations 1014 may have effects 1008. In TTRPGs, the locations 1014 can be part of a larger cosmology. Such cosmological maps can be based on mythology. Planar systems can also be implemented for the locations 1014. Various different universes, galaxies, and/or dimensions can be part of the locations 1014 in some implementations. To keep track of all the different locations 1014, the disclosed AI game engine can maintain a hierarchy for each location indicating its class (e.g., indicating whether the location is a planet or a store or a room in a building or in a starship, etc. By preserving this set of relationships, the disclosed system can also create a consistent and enforced sense of direction in the game world. These location hierarchy records can be stored in a location stack. The location stack can operate, as a merely illustrative example, in granularity from dimensional→galactic_map→star_system_map→planet_map→continent_map→city_town_or_village_map→building_map→floor_or_room_map.

Additionally, as part of initial game setup, the disclosed system can establish where the game begins, which can include a full location stack from a dimension and/or plane all the way to an immediate room level. Any of these aspects can be sub-classifications of the locations 1014 attribute. If the character 1002 is wandering lost in the woods, for example, the AI in the disclosed technology may only reach a continent level granularity and then begin to expand lower layers as information is revealed regarding the location 1014. The disclosed technology can also track the locations 1014 throughout the gameplay of other encyclopedia entry types, including tracking the characters 1002, the NPCs 1010, and/or the items/containers 1004. This can involve a complex process as the above encyclopedia entry types may be linked to other encyclopedia types, as in the case of an item being carried by a character, and as such departure and arrival from/to a location 1014 may trigger special update operations in the disclosed technology.

Regarding the maps 1020, the disclosed technology can generate grid representations of the locations 1014 and/or the maps 1020 to aid the AI in identifying directions. In some implementations, a local traversal algorithm can also be used via the grid representation to help provide supplementary data to the oracle or remove the need for the oracle in certain operations. As described above, each of the locations 1014 can also be assigned to one or more of the maps 1020. The maps 1020 can contain references to sub-locations (e.g., sub-classifications of the locations 1014), such that a building floor map can have a room in its cell, and the room map may have items in its cells. A galactic map can hold a star system in its cells, which in turn can hold planets or planetary scale objects in its cells, etc. This can provide a way to visualize links from varying levels of detail/scale in the locations 1014 and the maps 1020. The cells at each grid level can, in an illustrative example, equate to one or more of the following: dimensional map, planar map, galactic map, star system map, planet map, continent map, city, town, or village map, building map, and/or floor or room map. A sense of distance from the grid representation in the maps 1020 can allow for the disclosed system to approximate travel time based on travel modes available to the players.

In some implementations, some factions 1012 can be linked to the events 1018 (e.g., war), which can be further associated with one or more locations 1014 or maps 1020. The factions 1012 can include groups of people NPCs 1010 or PCs 1002 that make up an organized unit and/or have some affiliation with one another. The NPCs 1010 can be part of the factions 1012 and players 1002 may to choose to join, ally, and/or fight one or more of the factions 1012. The factions 1012 may take actions such as declaring wars or becoming affiliated with events 1018 and/or the locations 1014. If the PC character 1002 takes action against or in favor of the factions 1012, members of the factions 1012 can respond, and other factions 1012 may take note as well. One or more different types of the factions 1012 can be established, including but not limited to: an order, nation, religion, religious order, religious movement, religious denomination, religious organization, cult, guild, tribe, clan, party, troupe, caravan, trading company, philosophy, clerical order, magical order, knightly order, mercenary company, rebel group, resistance movement, counterculture, academic institution, royal family, noble family, court, judiciary, political body, governing body, research institute, nongovernmental organization, nonprofit, conspiracy, alliance, corporation, criminal organization, military order, political party, secret society, trade company, and/or other faction type.

As another illustrative example, the NPC 1010 can have the memory 1016 of the event 1018 that involves the faction 1012. As conversations unfold in the game world, anyone, such as the NPCs 1010, within listening range can hear of the event 1018 and thus create the memory 1016 of this conversation, which can then come up in future discussions. Similar to the NPCs 1010, the factions 1012 can also have their own memories 1016, and their memories may in turn be communicated to other members of the faction 1012 but at varying degrees of reach depending on the magnitude of the event. For example, helping an elven village may gain reputation with that village but not an entire eleven nation. Saving the elven king may be known with a much wider reach.

In the case of both the NPCs 1010 and the factions 1012, the memories 1016 can have a salience and the salience may decrease over time. In some examples, the memories 1016 may need a long time, decades, centuries, etc. to fade and that may be outside the scope of a game. However, for some games especially those involving aspects such as cryogenic storage or time travel the memories 1016 and long-term decay rates may yet become important. Such elements of the memories 1016 can be managed by the AI described herein in terms of determining whether something is still relevant should such situations arise. The memories 1016 also can contain information such as how they were obtained, as the NPC 1010 or the faction 1012 may have obtained information through secret or underhanded means that they don't want to reveal by indicating awareness of the information. A confidence level of the information in the memories 1016 can also be stored by the disclosed system, which can indicate whether a memory was directly observed, whether the memory is a rumor, whether the memory was communicated by a reliable or unreliable source. The memories 1016 can include one or more different types of cognizance, which can include but are not limited to participant, overheard, eavesdropped, scried, told, spied, and/or intercepted. The memories 1016 can include one or more different types of veracity, which can include but are not limited to guess, suspicion, intuition, rumor, belief, and/or proven fact. The memories 1016 can include one or more different types of confidentiality, which can include but are not limited to public, private, secret, and/or top secret. The memories 1016 can include one or more different types of sources, which can include but are not limited to direct, read, and/or told.

As described above, the NPCs 1010, the factions 1012, and/or the locations 1014 can be tied to the events 1018. The events 1018 can sometimes occur when a correct date arrives, regardless of whether or not the player characters 1002 are present. This is one of the key ways that the disclosed system can ensure that the game world is alive. For example, if someone truthfully tells the player characters 1002 that an army will arrive in one month and the player characters 1002 do not intercede, then the army will arrive and that has side-effects on the game world. A temporal tracking of story beats allows the disclosed system to keep track of when the events 1018 occur and/or when the events 1018 should be triggered. The player characters 1002 may not hear about the events 1018 until later, but those events 1018 would still occur. As another example, if the player characters 1002 want to come back for a harvest festival and they arrive at the right time, the disclosed system will know/remember to include this event 1018 at the appropriate location(s) 1014. But, if the player characters 1002 arrive early, the NPCs 1010 can mention that they are preparing for the event 1018, thereby keeping the game world consistent.

Another example of links that can be established by the disclosed technology is that of functional relationships. An illustrative example can be provided from an example consumption functional relationship, which can occur between effects/abilities and other entries, typically items. For example, a bow's 'shoot' effect/ability may be linked to one or more arrow entries in the inventory through a consumption relationship, such that when the ability/effect is used, one or more of the relevant linked item(s) may be used. Additionally and alternatively, a functional link may occur when an effect/ability needs to refer to its owner (PC or NPC)'s statistics, such as to identify their relevant numeric modifier for a die roll as part of a 'check' to determine the efficacy/outcome of the effect/ability. Such links can be typically created by asking the oracle described herein to identify the presence of functional relationships and the need for a linked entry. In the case of die rolls, for example, a process can be used in which the die roll expression such as "1d20+ # of arrows may+STR_MOD" be used. Not only does the oracle generate the expression, but the expression can be broken into terms that can be processed in parallel. The oracle can also be given contextual data about the player/user to help identify what links may need to be made, and in some cases a special type of entry may be needed, such that the user can be prompted to provide the relevant information. In this illustrative example, "the # of arrows" can be a user input term and the "STR_MOD" can be a reference term, in this case to a "Strength Modifier", that may be linked by the oracle to the relevant information in the player/user's object/encyclopedia entry.

The knowledge graph 1000 and encyclopedia entry listings are merely illustrative examples. One or more other or different types and connections with appropriate attributes/fields and encyclopedia entry types can be established or expanded to ensure an active representation of the game world through the knowledge graph 1000's relationships and encyclopedia's contents. Additionally or alternatively, sometimes, one or more of the attributes/fields in the knowledge graph 1000 and encyclopedia can have sub-classifications, which can be depicted in the knowledge graph 1000 or in other knowledge graphs. For example, the item/container 1004 encyclopedia entry type can include sub-classifications such as currency to support new relationships such as currency conversions. As another example, the abilities 1006 attribute can have sub-classifications based on ability types such as technical for piloting a spaceship, picking a lock, etc. or magical for learning to detect magic, and many more possibilities.

FIGS. 11A, 11B, 11C, 11D, 11E, 11F, 11G, 11H, 11I, and 11J illustrate example UIs for different types of interactions a player may experience. The example UIs depict interactions that the player may experience during a single-player gaming mode. The example UIs can also, in some implementations, depict interactions that the player may experience during multiplayer gaming. For example, a chat in the UI can display messages, responses, and/or prompts from the player, the AI/oracle(s) described herein, and/or other players in the multiplayer game. Other variations in the UIs are also possible to support multiplayer gaming.

Figure 11A:
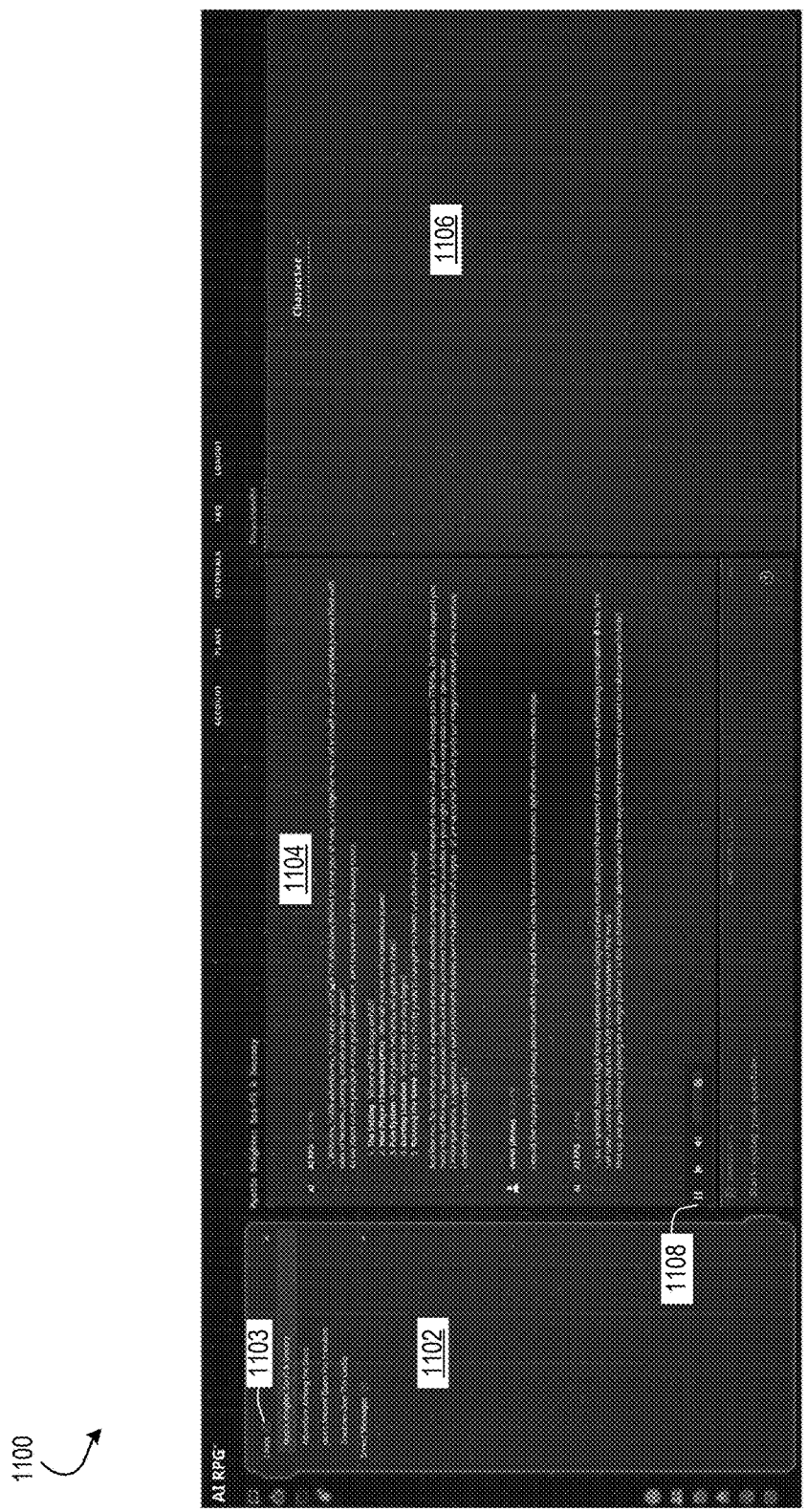
FIGS. 11A, 11B, 11C, 11D, 11E, 11F, 11G, 11H, 11I, and 11J illustrate example UIs for a player who develops a game world and plays in the game world using an AI game engine as described herein.

FIG. 11A illustrates a UI 1100 in which a player is building their game world (e.g., a game setting setup mode/state). The UI 1100 can be presented in one or more different themes and/or styles, which can be user selectable. For example, in FIG. 11A the UI 1100 is presented with a science fiction theme. In some implementations, the presentation themes for the UI 1100 can be selected by the disclosed game engine system to align with a theme of the game world being developed and/or played by the player. Illustrative presentation themes for the UI 1100 include but are not limited to terminal, science fiction, plain, light, and/or dark. Other presentation themes can also be developed and provided for player/system selection.

The UI 1100 can include a panel 1102, which can present selectable options to access a user's existing chats/games as well as a selectable option 1103 to create a new chat/game. The UI 1100 can include a chat 1104, which can present messages that were generated/inputted by the player and AI messages that were generated in response to the player. The AI messages can be generated using the disclosed techniques. The UI 1100 can include a context window 1106, which is automatically populated by the AI described herein with information about the game world, game settings, character, and/or other aspects of gameplay. The context window 1106 can be populated with such information as the gameplay progresses and/or the different encyclopedia entries generated through the different game modes described herein. In the example of FIG. 11A, the context window 1106 is not currently populated with information because the player is in the game setting setup mode and has not yet progressed to a character creation mode to create their character. In some implementations, the UI 1100 can include an audio control bar 1108, which can receive user input to control sound, audio, and/or music that is automatically played by the AI described herein. In some implementations, the audio control bar 1008 may only be presented in the GUI 1100 when the AI described herein receives enough information from the chat messages to curate a soundtrack or playlist for the particular chat/game world.

Figure 11B:
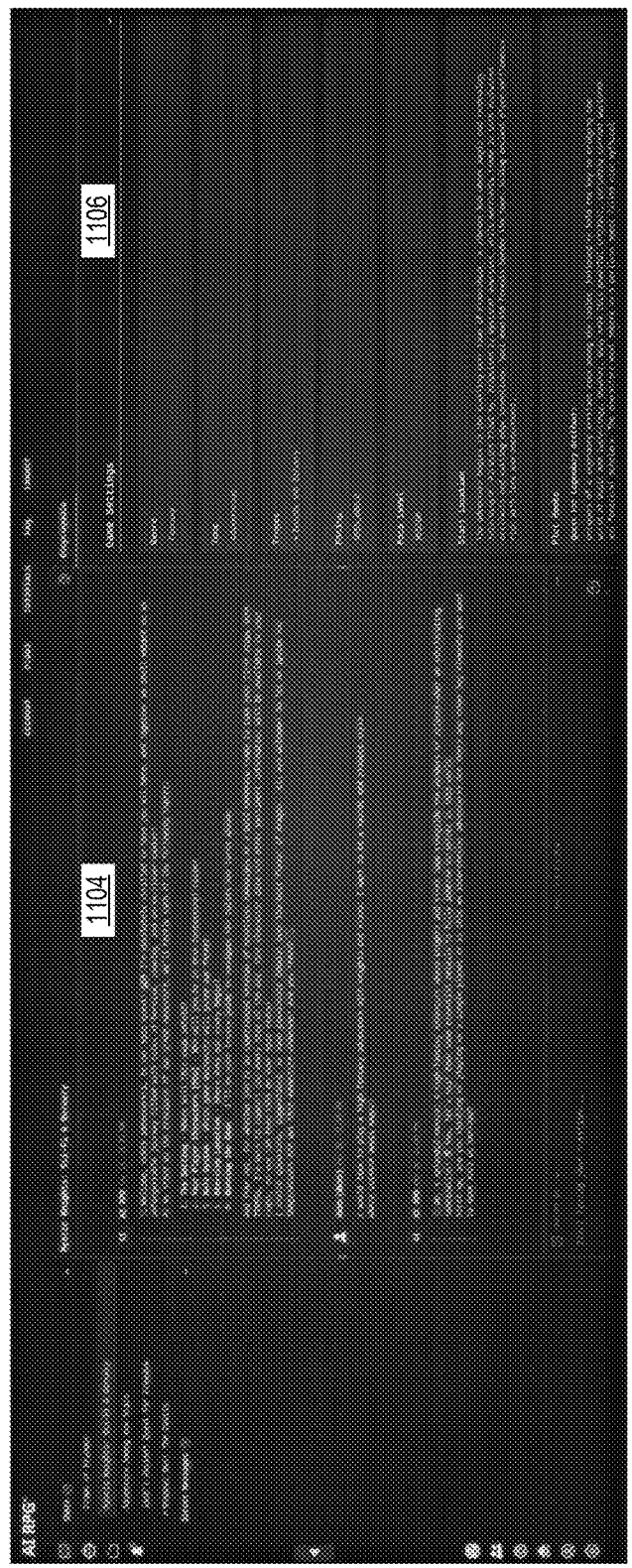

FIG. 11B illustrates the UI 1100 once the player has progressed through the game setting setup mode described in reference to FIG. 11A (e.g., by providing messages/inputs in the chat 1104. As a result, the context window 1106 has been automatically updated and populated with game settings that are determined by the AI described herein and based on the player inputs in the chat 1104. In the illustrative example of FIG. 11B, the UI 1100 is also presented with a terminal theme.

Figure 11C:
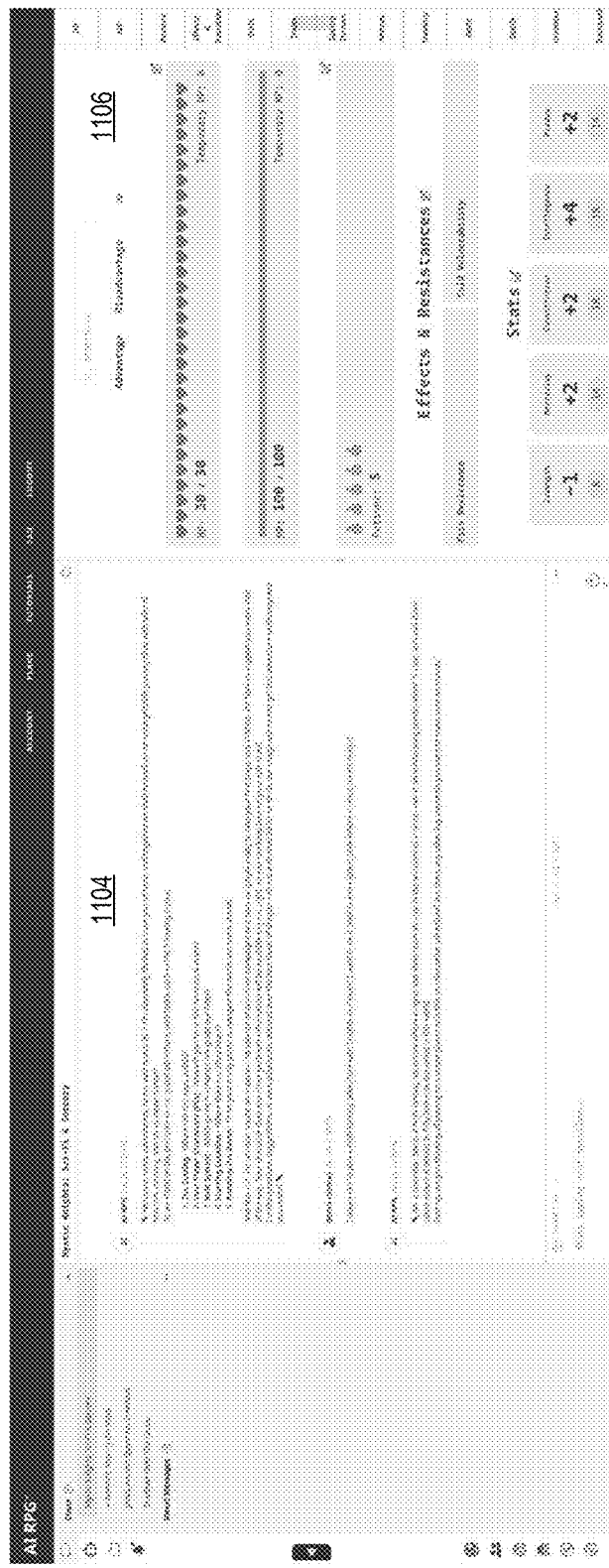

FIG. 11C, specifically the context window 1106, illustrates the UI 1100 and its elements that may appear once the player has completed the game setting setup mode, completed the character creation mode, and is in the gameplay/narrative mode. The player can provide inputs/messages in the chat 1104, which can be processed by the AI described herein to provide AI-generated responses in the chat 1104 and updates in the context window 1106. In the example of FIG. 11C, the context window 1106 can include graphical depictions or other visualizations of the player's health metrics, advantages, disadvantages, effects, resistances, and/or other player statistics. In the illustrative example of FIG. 11C, the UI 1100 is also presented with a light theme.

Figure 11D:
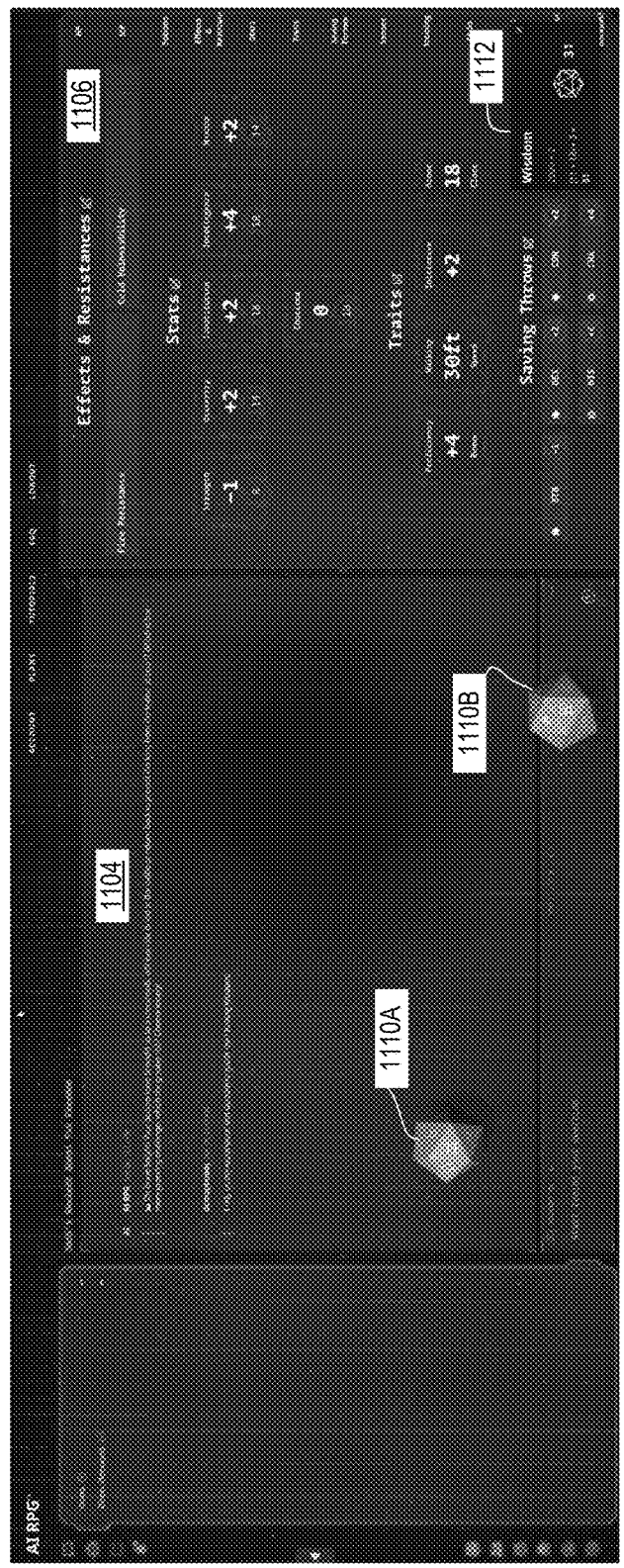

Similar to FIG. 11C, FIG. 11D illustrates the UI 1100 during the gameplay/narrative mode and/or other game modes described herein. In the example of FIG. 11D, the player can provide input into the chat 1104 indicating a desire or instruction to roll dice 1110A and 1110B. The dice 1110A and 1110B can be rolled automatically or on user confirmation depending on the circumstance by the disclosed system, the dice 1110A and 1110B roll can be visually displayed across the UI 1100, overlaying one or more portions of the UI 1100 such as the chat 1104 and/or the context window 1106. A pop-out window 1112 can optionally overlay at least a portion of the UI 1100 to present results of rolling the dice 1110A and 1110B. In some implementations, the pop-out window 1112 can be presented over a portion of the context window 1106 and/or over a portion of the chat 1104, and/or any combination thereof. In the illustrative example of FIG. 11D, the UI 1100 is also presented with a science fiction theme.

Figure 11E:

Similar to FIG. 11D, the FIG. 11E illustrates the UI 1100 during the gameplay/narrative mode and/or other game modes described herein. In the example of FIG. 11E, the player can select one or more selectable options 1112A-N in the chat 1104 to cause the disclosed system to visually present and roll the dice rolls 1110A-B in the UI 1100. As shown in FIG. 11E, the context window 1106 is also updated to show attributes and/or other data fields associated with the player's character. The panel 1102 can also be updated to present selectable options of other chats/gameplays that the player has created using the disclosed system. FIG. 11E also demonstrates the disclosed system's ability to prompt the player for dice rolls at relevant in game moments, in this case to roll stats/attribute/ability scores for their character. In the illustrative example of FIG. 11E, the UI 1100 is also presented with a terminal theme.

Figure 11F:
Figure 11G:
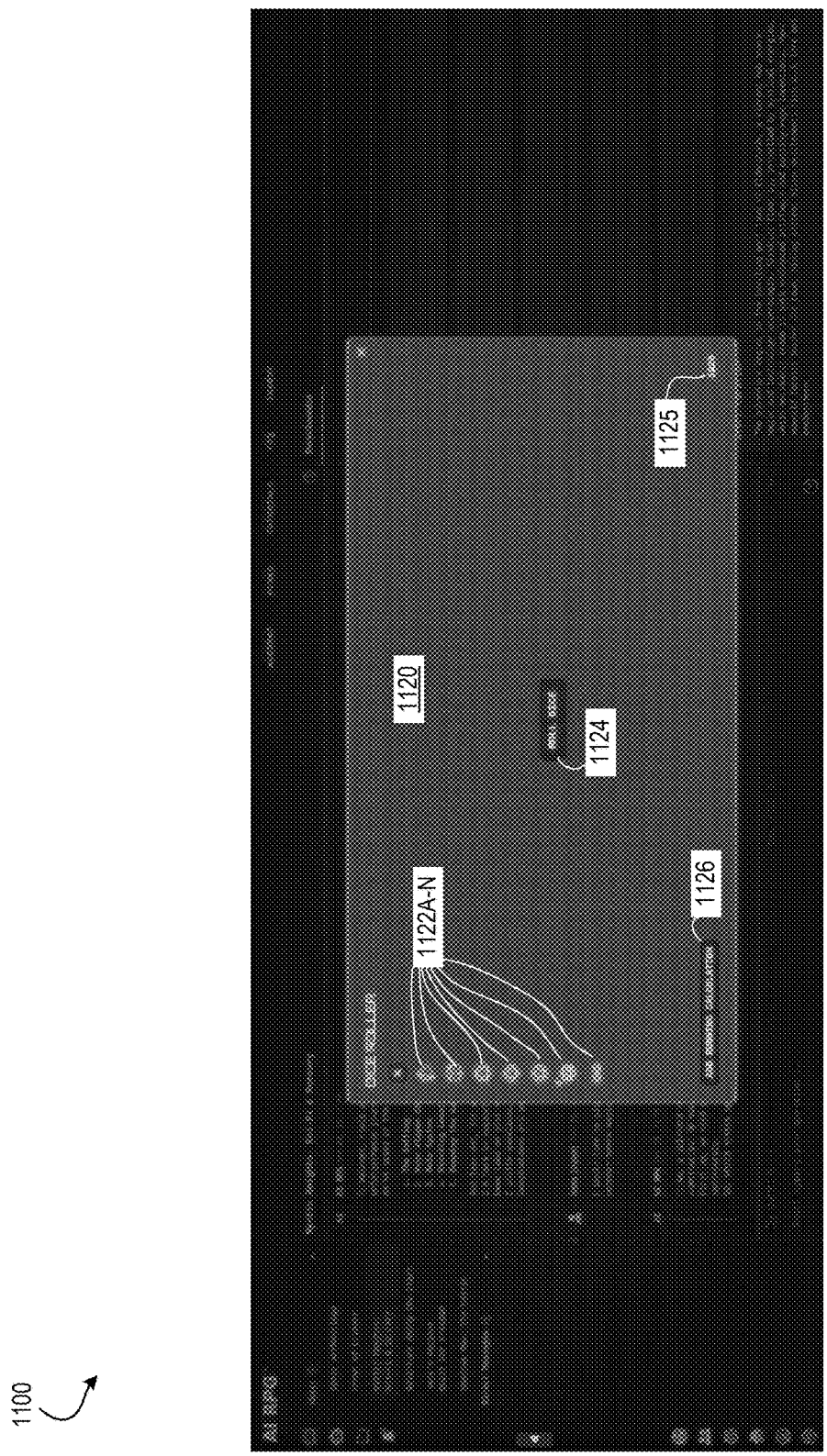

Similar to FIG. 11E, the FIG. 11F shows the UI 1100 during the gameplay/narrative mode and/or other modes described herein. In the example of FIG. 11G, the player has selected an option (refer to the options 1112A-N) to roll the dice 1110A-B in the UI 1100. Each time the dice 1110A-B are rolled, the disclosed system can automatically update the chat 1104 with dice roll information 1114 and/or 1116. The information 1114 and/or 1116 can output information such as the total value as well as a breakdown of the elements rolled on each die even for complex die expressions and may include color highlighting and other visual adjustments to help the user identify the values rolled. In the illustrative example of FIG. 11F, the UI 1100 is also presented with a terminal theme.

In FIG. 11G, the UI 1100 is updated to include a popout window 1120 that partially overlays at least a portion of the UI 1100. The popout window 1120 can be presented in response to the player selecting an option to roll the dice described in reference to at least FIGS. 11E and 11F. The popout window 1120 can present selectable visual depictions 1122A-N of different type of dice that the player can select and customize to be rolled. The popout window 1120 can also present a selectable option 1124 to roll dice that were selected and customized by the player. The popout window 1120 can also present a selectable option 1126 to add the selected and customized dice to a running calculation in the current game. The popout window 1120 can also include an equation 1125. In the illustrative example of FIG. 11G, the equation 1125 can read 2D20 indicating that two of the twenty-sided die where rolled, where the notation can be number of dice, 2 in this example, followed by 'd' as a delimiter/separator and then the number of sides on the dice, 20 in this example. The equations may include additional, alternative, less, and/or more complexity and terms. In the illustrative example of FIG. 11G, the UI 1100 is also presented with a terminal theme.

Figure 11H:
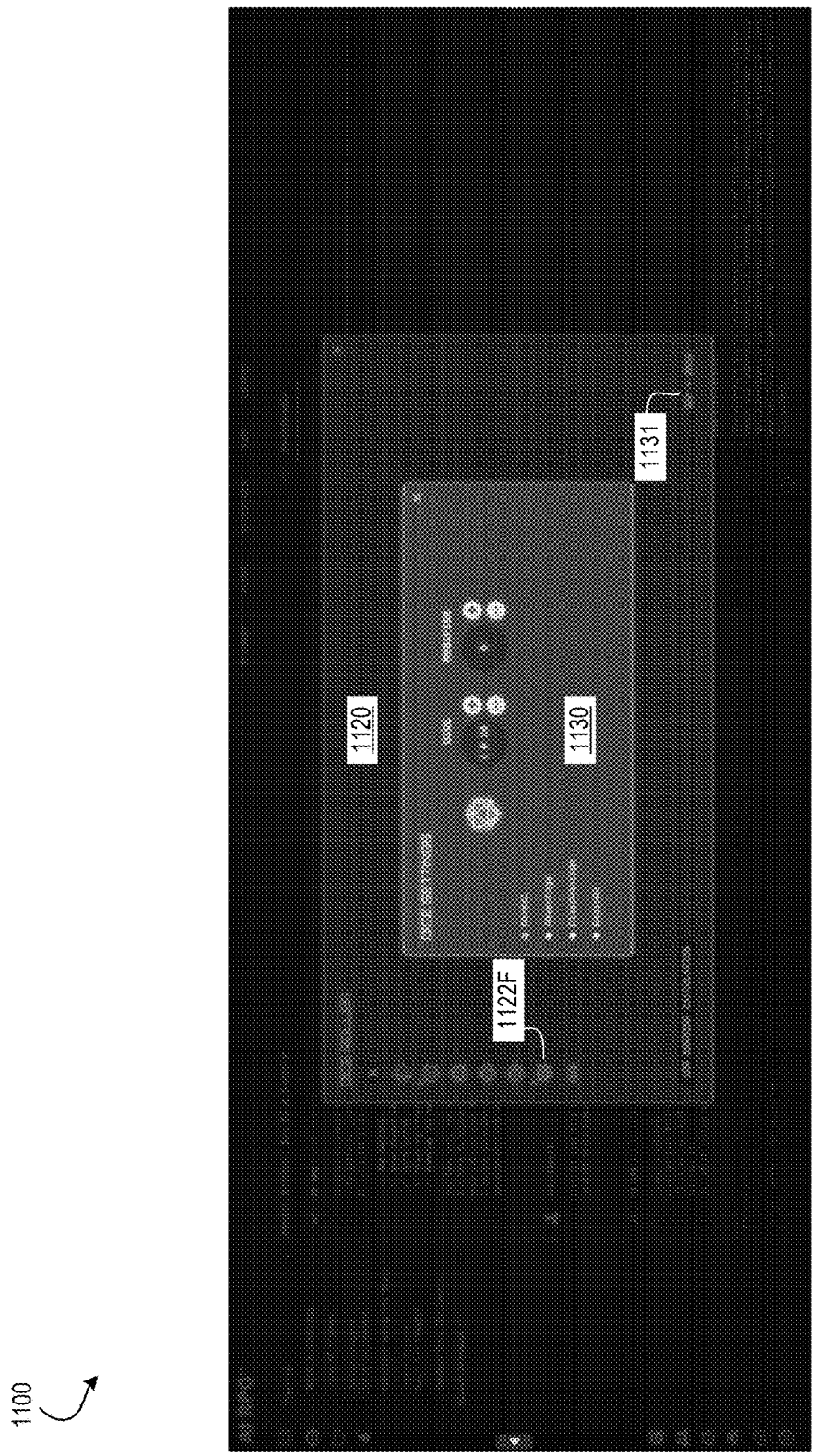

In FIG. 11H, the player selected the visual depiction 1122F of a dice in the popout window 1120, which caused a second popout window 1130 to be presented and visually overlaying at least a portion of the popout window 1120. The popout window 1130 can present selectable options for the player to customize their selected dice settings. Any selections made by the player in the popout window 1130 can be saved and then used to roll the selected/customized dice once the player selects the roll dice option 1124 in the popout window 1120, which is described in reference to FIG. 11G. The popout window 1120 can also include an equation 1131. In the illustrative example of FIG. 11H, the equation 1131 can read 2D6+2D20, this equation implies that two six-sided die and two twenty-sided die will be rolled and the total value (sum) provided. In the illustrative example of FIG. 11H, the UI 1100 is also presented with a terminal theme.

Figure 11I:
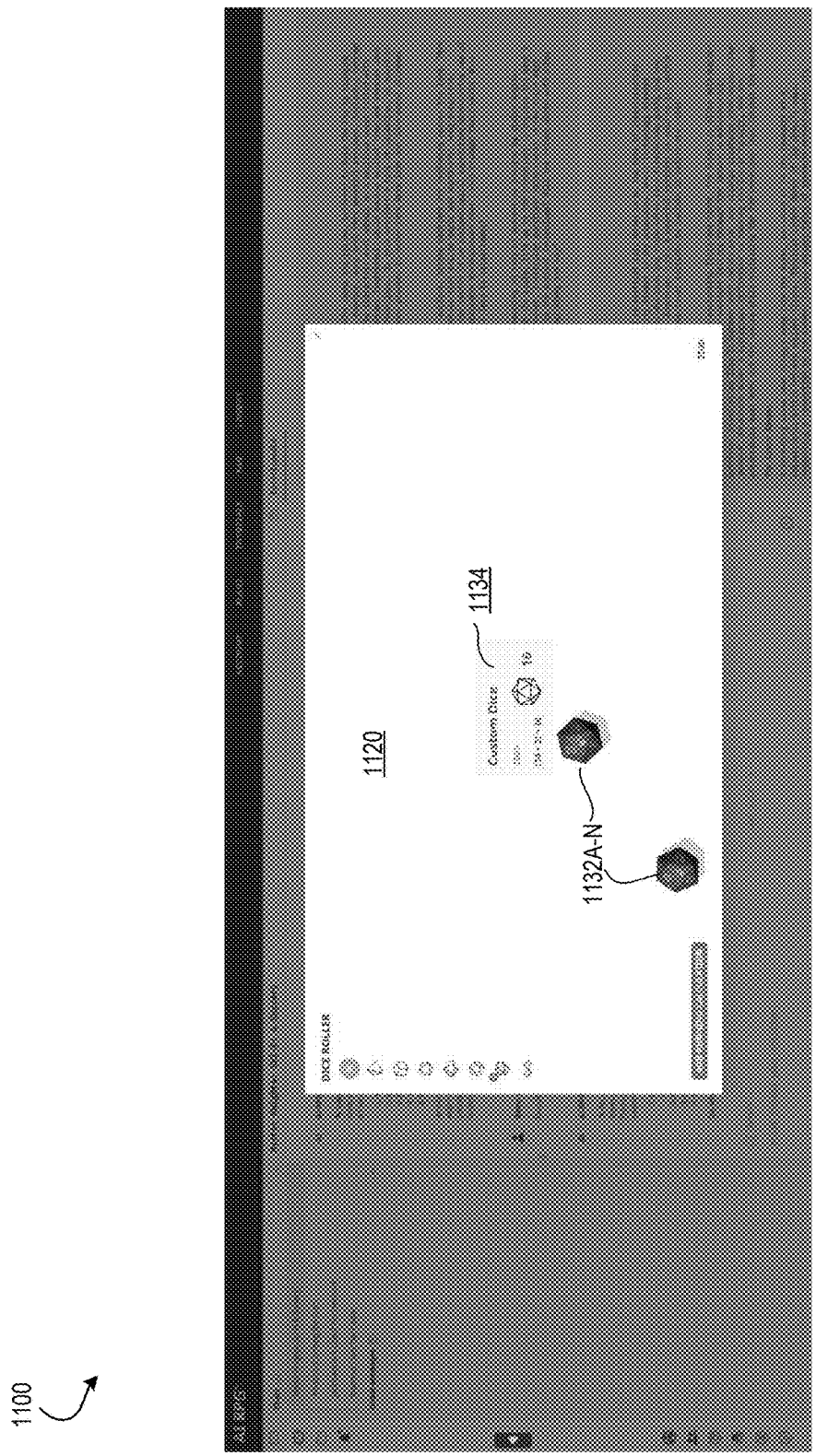

Once the player selects the dice as described in FIGS. 11G and 11H, the UI 1100 can be updated as shown in FIG. 11I. In FIG. 11I, dice 1132A-N can be rolled by the disclosed system over the popout window 1120. Roll results can then be presented in another popout window 1134, which can overlay a portion of the popout window 1120 where the dice 1132A-N did not land/stop. The popout window 1134 can also be configured to overlay any other portion of the UI 1100. In the illustrative example of FIG. 11I, the UI 1100 is also presented with a light theme.

Figure 11J:
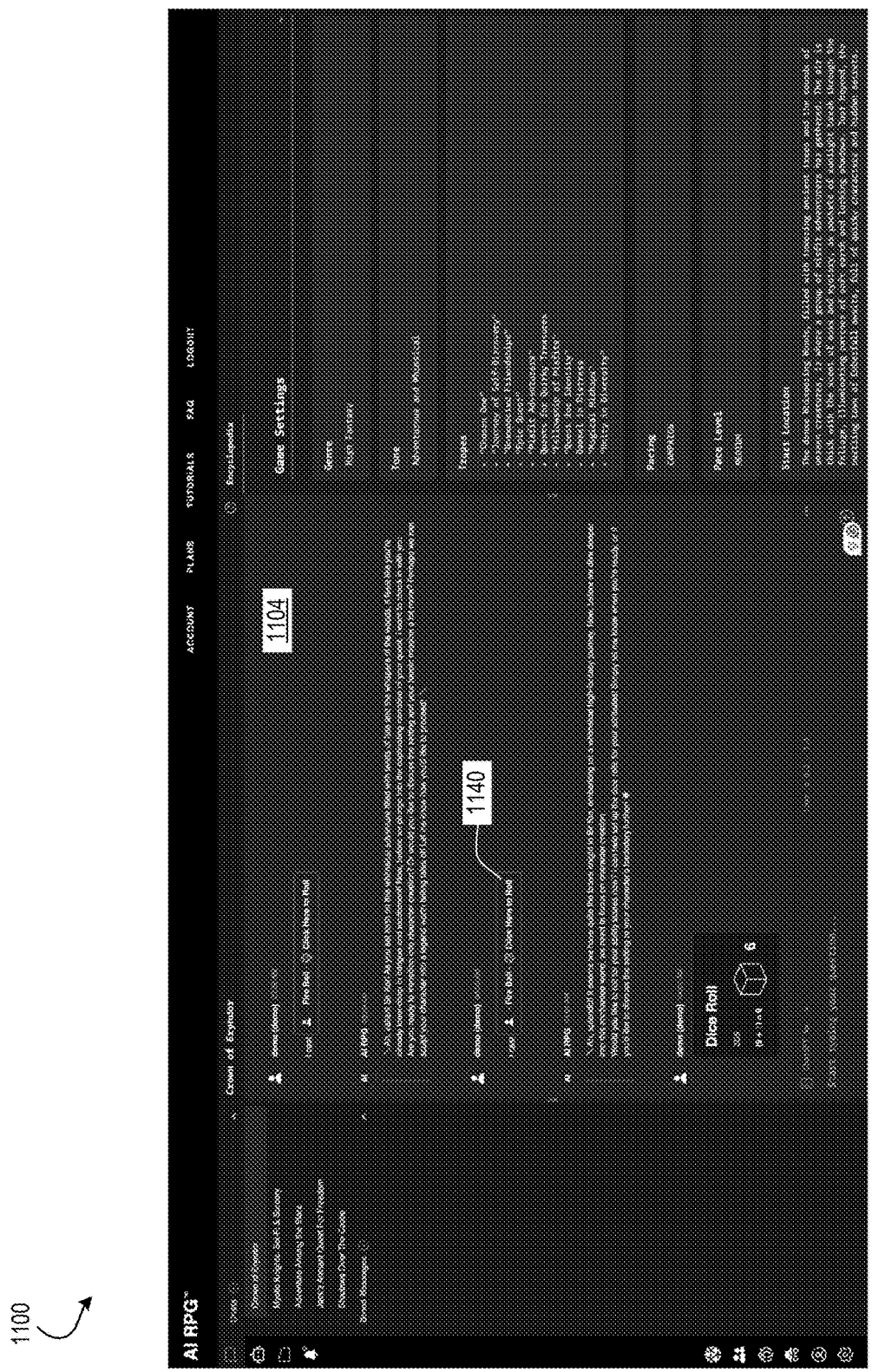

FIG. 11J illustrates another example of the UI 1100 in which the player can type instructions 1140 into the chat 1104 to cause dice to be automatically rolled. The instructions 1140 can include "I cast <," where '<' is a possible control code which can then cause the UI described herein to respond by automatically presenting options of actions that can be taken by the player and which will in most cases trigger a roll. The player can select one of the options, which can cause the instructions 1140 to automatically update/populate with the player-selected option (e.g., "Fire Ball"). The player can then click or select the updated instructions 1140 to cause the selected dice to be automatically rolled by the disclosed system. In the illustrative example of FIG. 11J, the UI 1100 is also presented with a midnight theme.

Figure 12A:
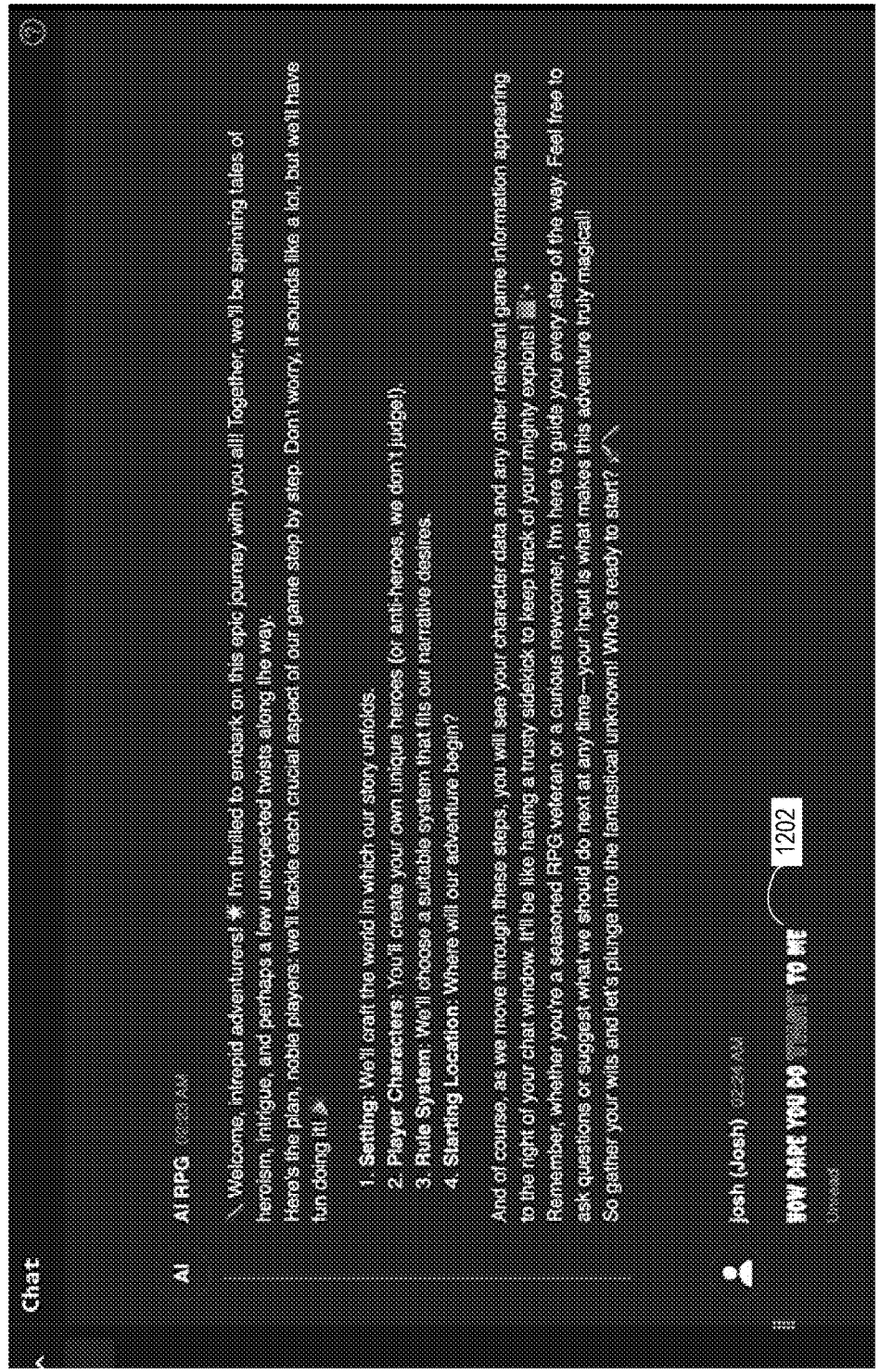
Figure 12B:
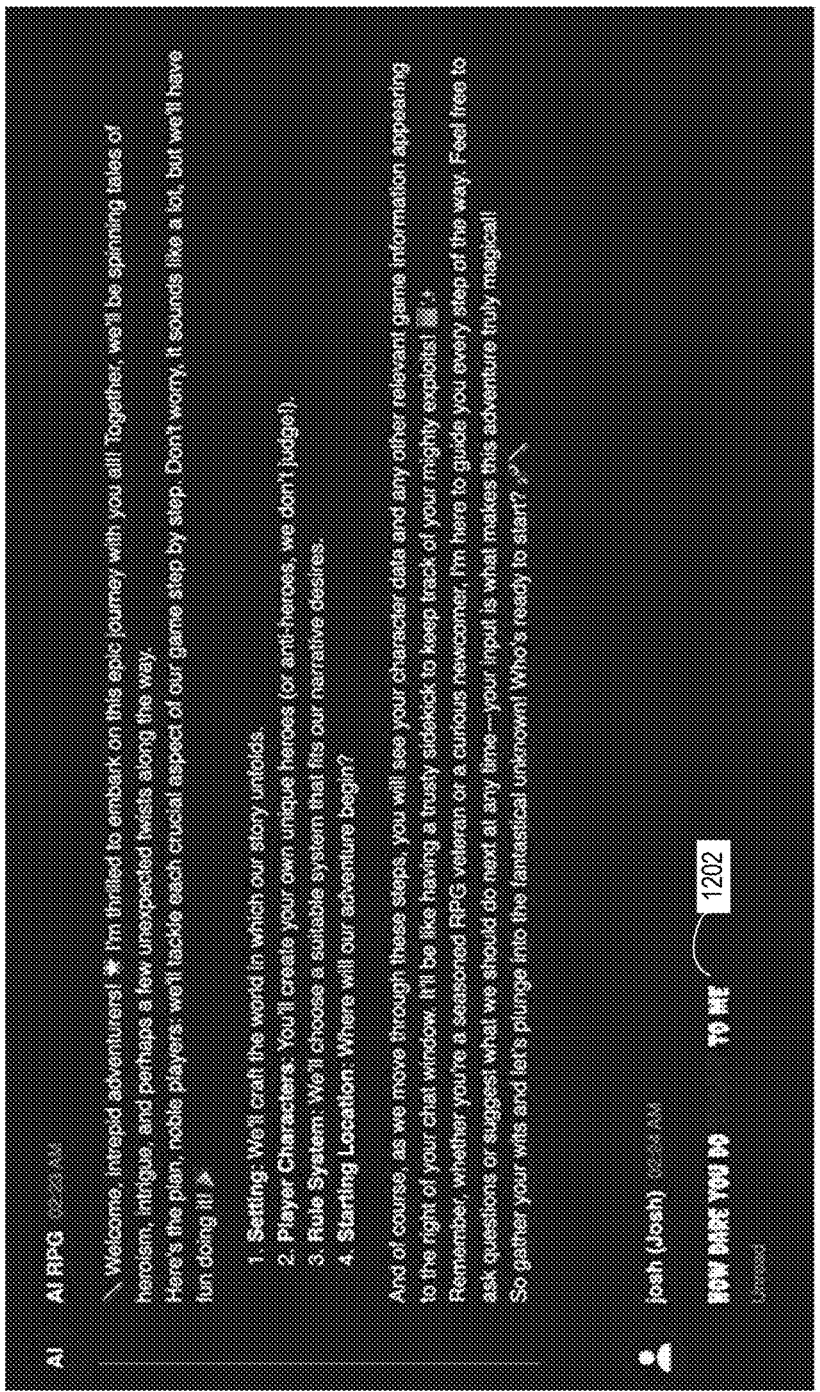
Figure 12C:
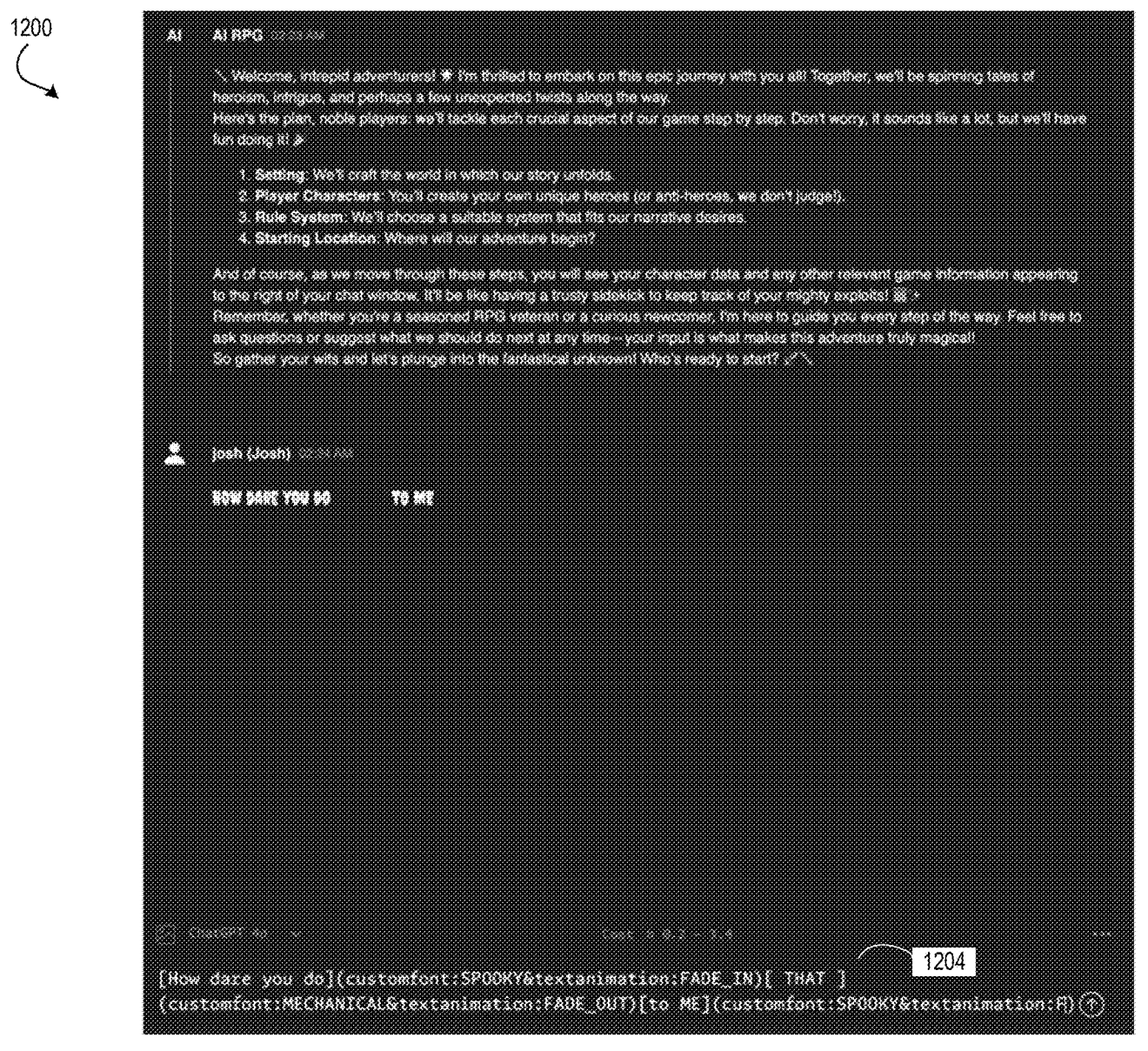
Figure 12E:
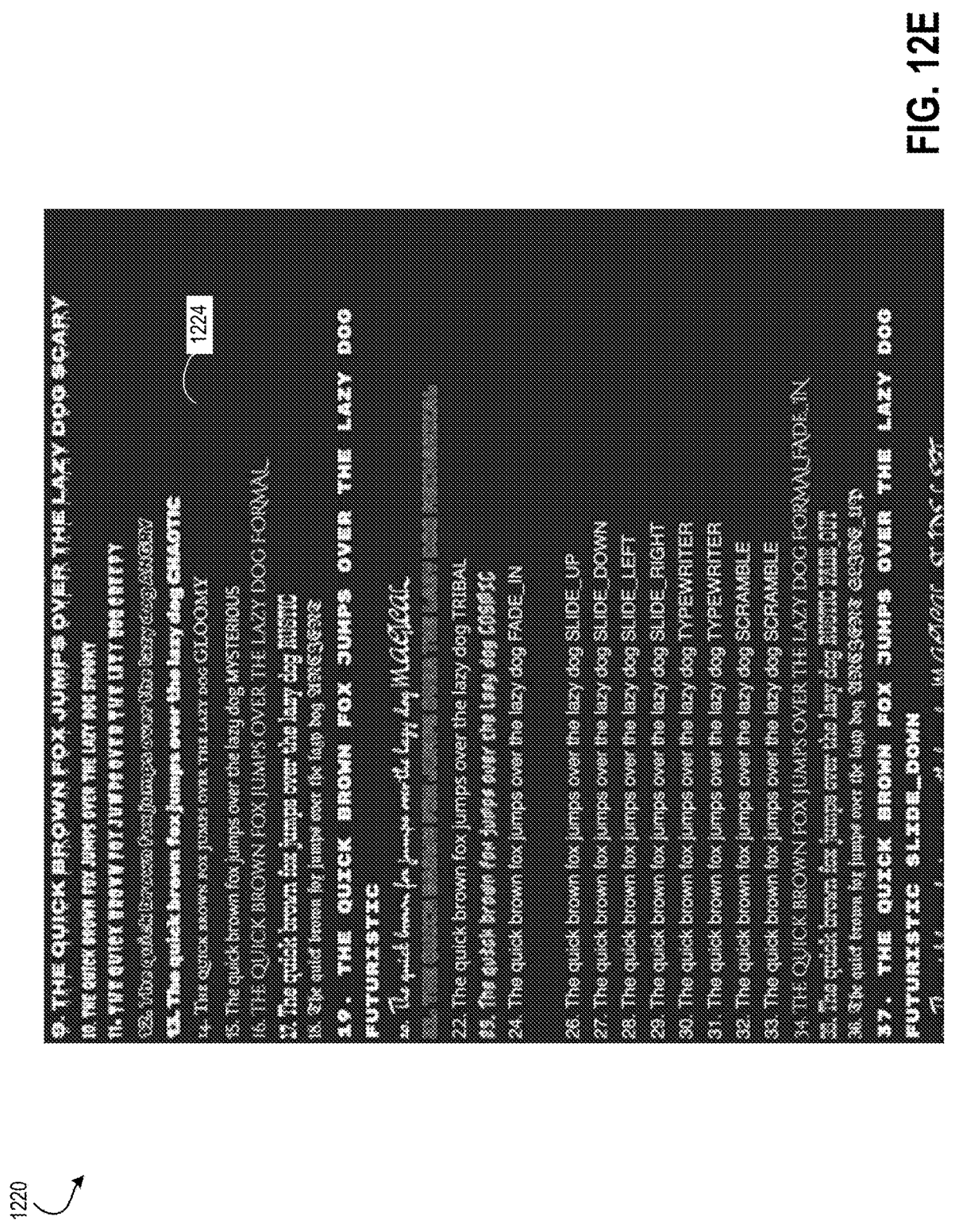

FIGS. 12A, 12B, 12C, 12D, and 12E illustrate example UIs that can be activated by the AI or a player. These UI elements include text transitions and animations and are induced by the expanded markdown language. The UIs of FIGS. 12A, 12B, 12C, 12D, and 12E can be presented with one or more different themes described herein. In the illustrative examples herein, the UIs can be presented in a dark theme. FIGS. 12A, 12B, and 12C display an example chat 1200 in a UI as described herein. In the chat 1200, the player has provided instructions 1204 to the UI described herein to cause text 1202 to visually transition in the chat 1200. In FIG. 12A, for example, a portion of the text 1202 ("that") appears visible or mostly visible in the chat 1200. According to the player's instructions 1204 (which are shown in the chat 1200 in FIG. 12C), the same portion of the text 1202 can disappear, until it is nearly visible or invisible, as shown in FIG. 12B. The player or AI can also input other instructions 1204 to cause different types of transitions and/or changes to the text 1202 in the chat 1200. The player or AI can also input other instructions 1204 to cause the transitions to occur at different speeds and/or for different durations. Similarly, FIGS. 12D and 12E depict an example chat 1220 in which the player provides instructions 1222 to cause text 1224 to be presented in different fonts, colors, and/or animations in the chat 1220. These examples are for illustrative purposes to demonstrate some of the extended markdown structure described herein. This capability can be primarily intended for use by the AI. Player interactions with the disclosed system, when used, can be through a control code or UI driven process, as opposed to direct expression of the expanded markdown structure.

Figure 13A:
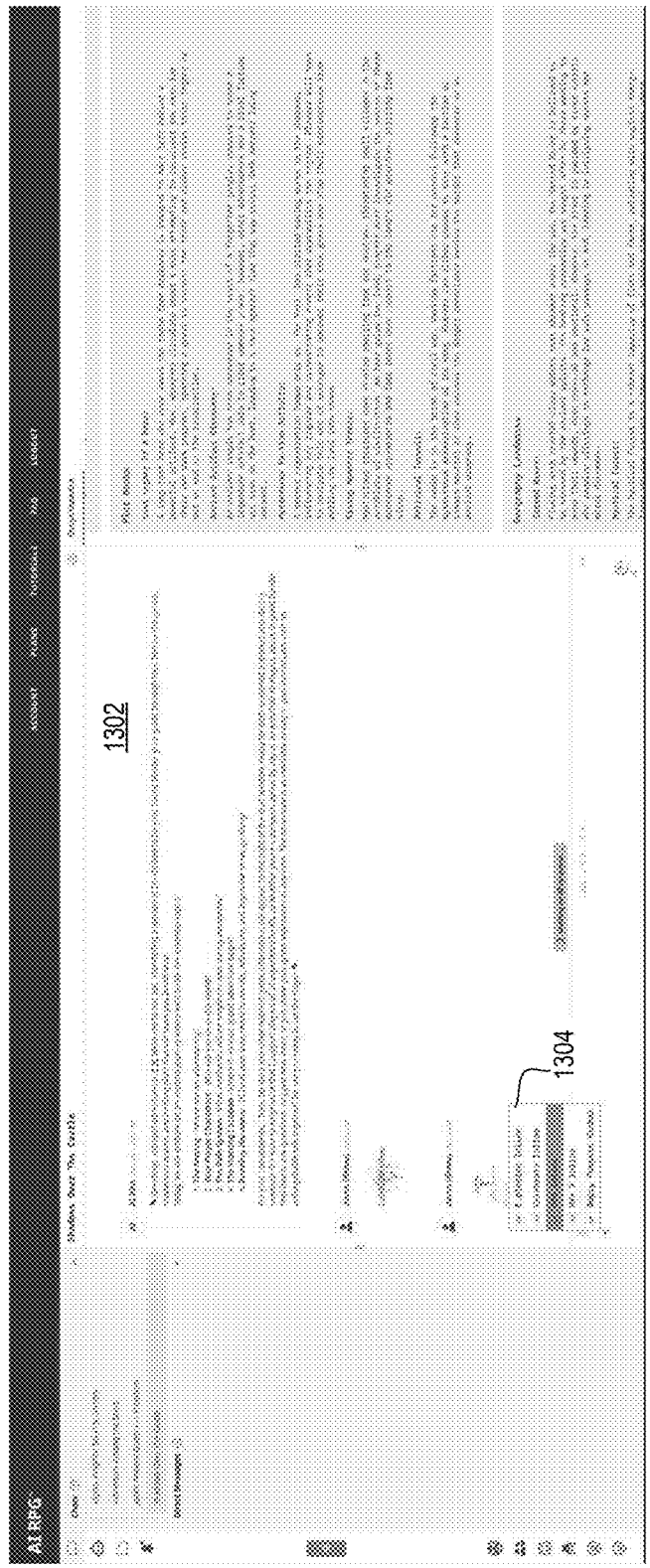
FIGS. 13A, 13B, and 13C illustrate example UIs for a player who makes animations in the game world using the processes described herein.
Figure 13B:
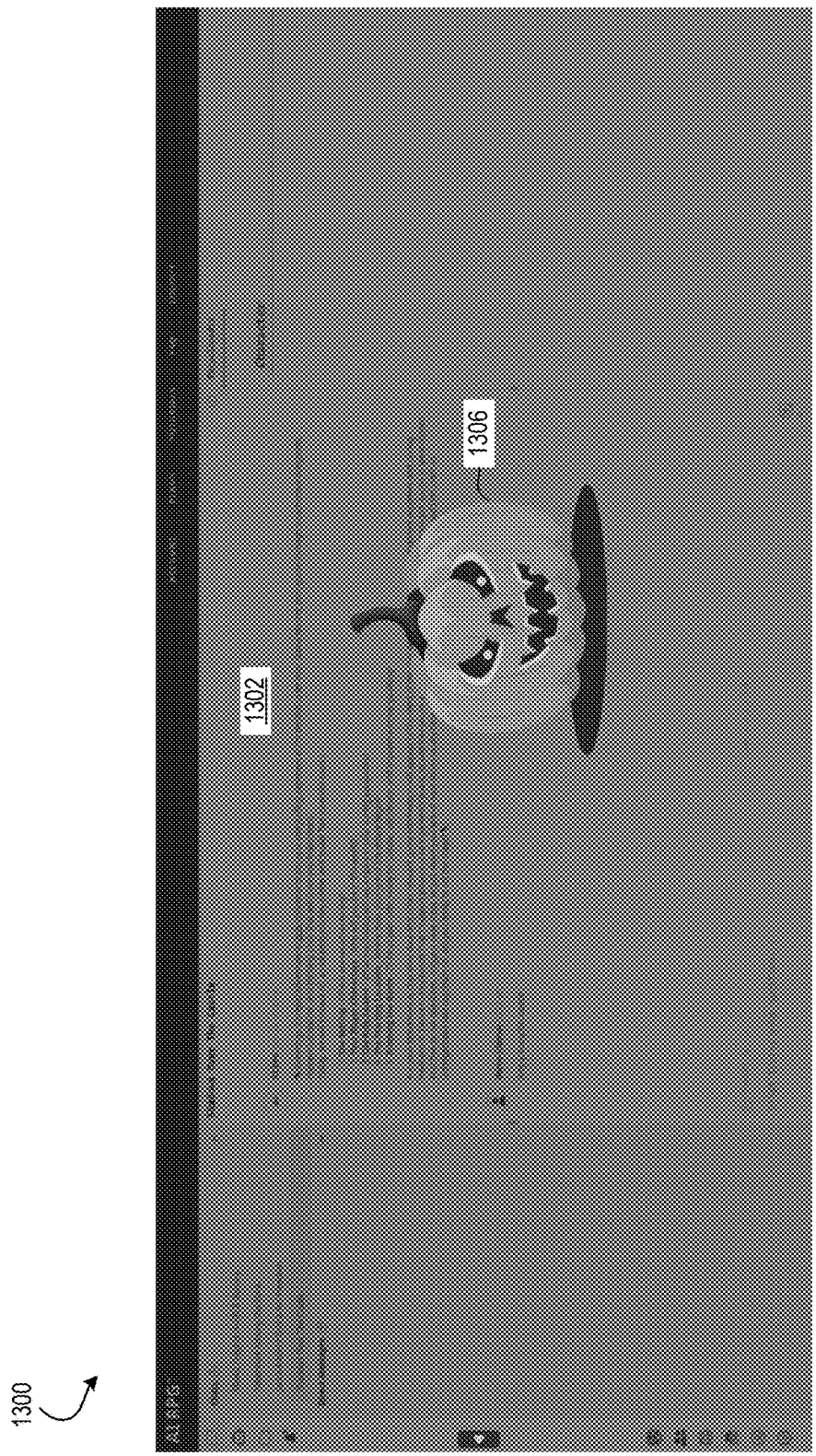
Figure 13C:
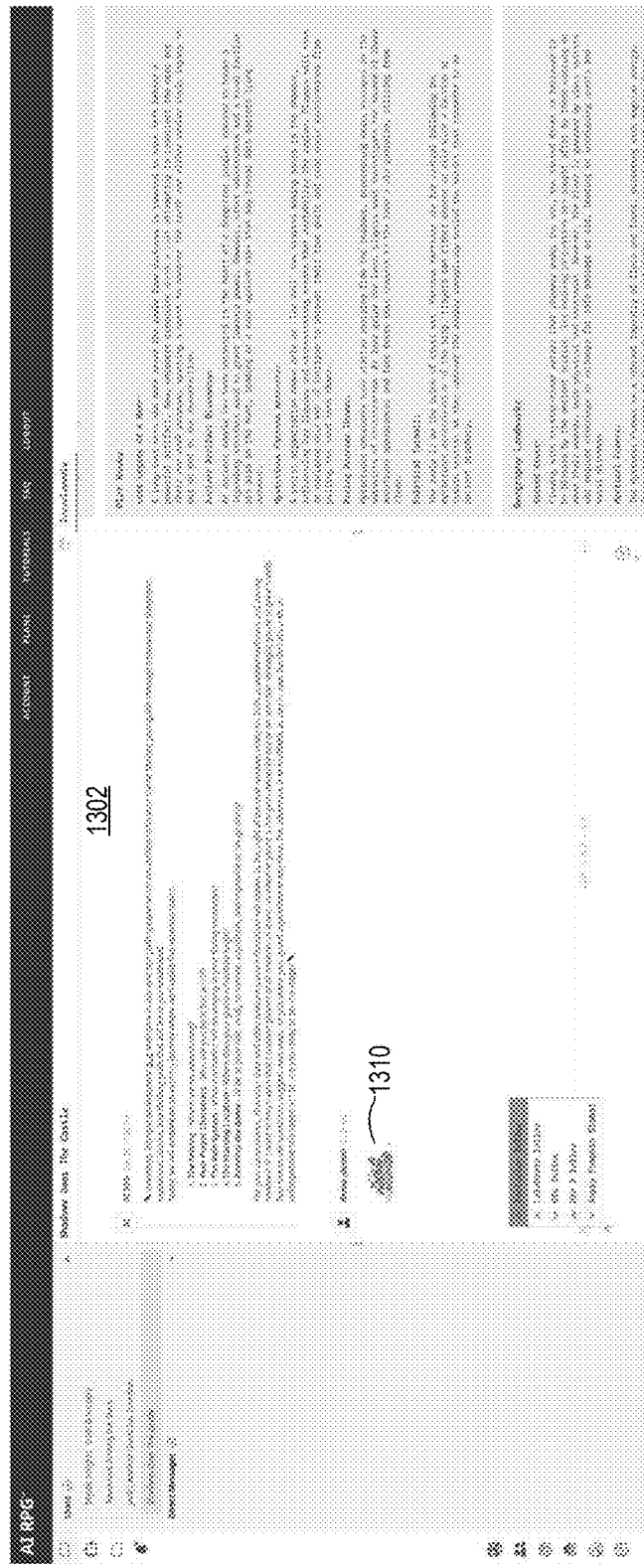

FIGS. 13A, 13B, and 13C illustrate example UIs for a player to induce an animations in the game world using the UI. This form of selection can be player focused, but the AI can also trigger this functionality in its messages. The UIs of FIGS. 13A, 13B, and 13C can be presented with one or more different themes described herein. In the illustrative examples herein, the UIs can be presented in a light theme.

In FIG. 13A, a UI 1300 can present a chat 1302, similar to the chat described in the previous figures. In the chat 1302, the UI 1300 can also present a popout window 1304, which can overlay a portion of the chat 1302 and provide the player with selectable options. The options can indicate options for presenting animations that overlay a portion of the UI 1300 and/or animations that are presented inline in the chat 1302. The player can select one of the options for "angry pumpkin global." The name global here is meant to be illustrative of the fact that this is a screen wide animation as opposed to one that appears inline overlayed over the text of the message itself. In response to the player's selection, the UI 1300 can be updated, as shown in FIG. 13B. In FIG. 13B, a pumpkin visualization 1306 can be presented to visually overlay at least a portion of the UI 1300, such as a portion of the chat 1302. The pumpkin visualization 1306 can be animated. In some implementations, one or more global animations are available to the AI and can be rendered by the UI and presented in the popout window 1304 as described in FIG. 13A. For example, the AI can induce the rendering of different types of animations via the expanded markdown language, similarly the UI may make available some or all of the animations to the player as well through a structure similar to that shown in popout window 1304, options available may or may not be curated based on characteristics and/or settings of the player's game world and/or gameplay. The pumpkin visualization 1306 is merely an illustrative non-limiting example.

As another illustrative example, the player can select an option from the popout window 1304 in FIG. 13A for an "explosion inline." In response to this selection, the disclosed system can update the UI 1300 as shown in FIG. 13C. The updated UI 1300 can include an animated explosion 1310 inline, or otherwise within the chat 1302. As discussed above, the inline animations and/or visualizations can be determined by the AI and based on a variety of characteristics and/or settings in the game world and/or during gameplay. The animated explosion 1310 is merely an illustrative example. This functionality may be triggered by the AI via the expanded markdown language or the user via the command code and menu or other UI option.

Figure 14:
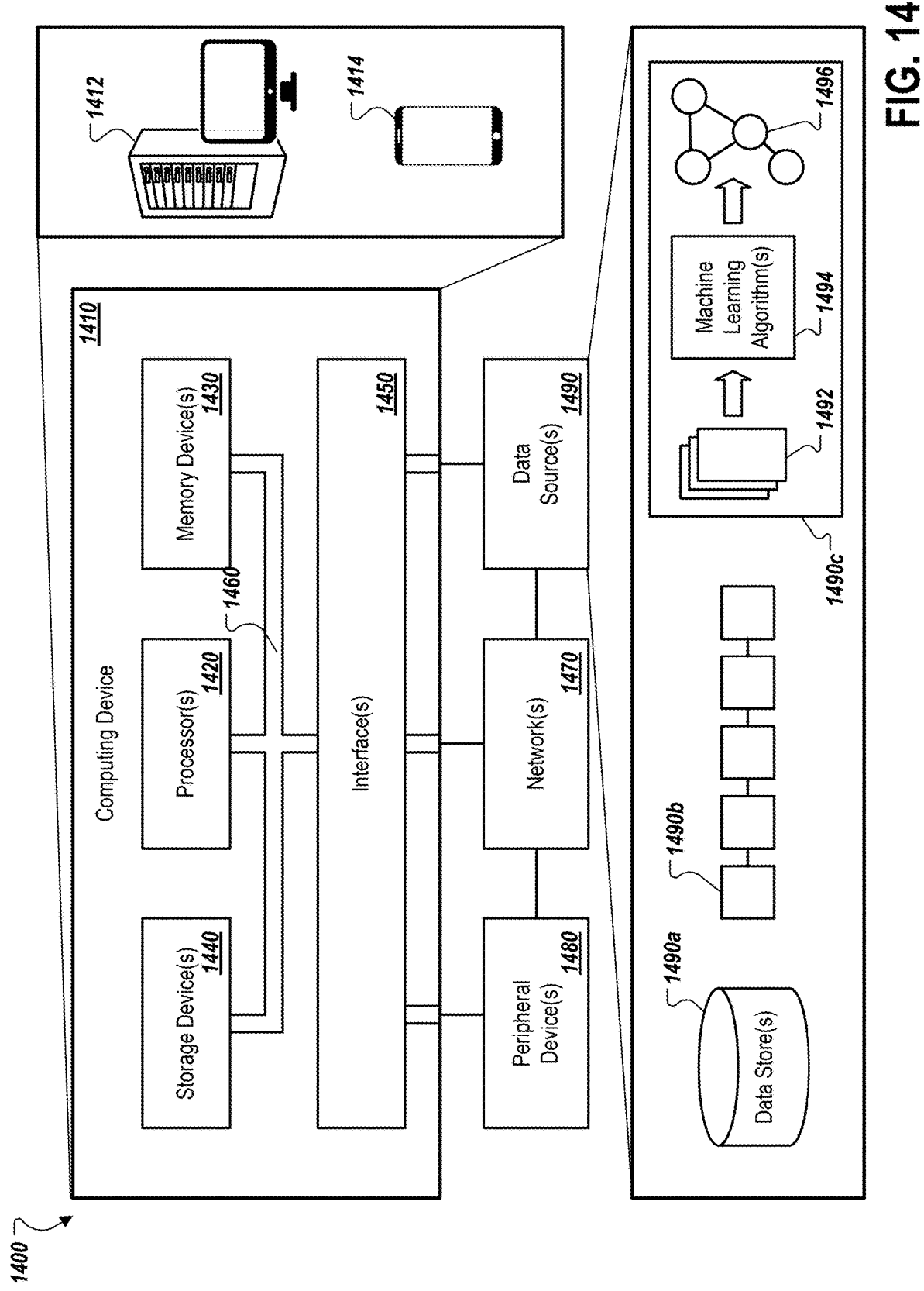
FIG. 14 is a schematic diagram that shows an example of a computing device and a mobile computing device.

FIG. 14 is a schematic diagram that shows an example of a computing system 1400 that can be used to implement the techniques described herein. The computing system 1400 includes one or more computing devices (e.g., computing device 1410), which can be in wired and/or wireless communication with various peripheral device(s) 1480, data source(s) 1490, and/or other computing devices (e.g., over network(s) 1470). The computing device 1410 can represent various forms of stationary computers 1412 (e.g., workstations, kiosks, servers, mainframes, edge computing devices, quantum computers, etc.) and mobile computers 1414 (e.g., laptops, tablets, mobile phones, personal digital assistants, wearable devices, etc.). In some implementations, the computing device 1410 can be included in (and/or in communication with) various other sorts of devices, such as data collection devices (e.g., devices that are configured to collect data from a physical environment, such as microphones, cameras, scanners, sensors, etc.), robotic devices (e.g., devices that are configured to physically interact with objects in a physical environment, such as manufacturing devices, maintenance devices, object handling devices, etc.), vehicles (e.g., devices that are configured to move throughout a physical environment, such as automated guided vehicles, manually operated vehicles, etc.), or other such devices. Each of the devices (e.g., stationary computers, mobile computers, and/or other devices) can include components of the computing device 1410, and an entire system can be made up of multiple devices communicating with each other. For example, the computing device 1410 can be part of a computing system that includes a network of computing devices, such as a cloud-based computing system, a computing system in an internal network, or a computing system in another sort of shared network. Processors of the computing device (1410) and other computing devices of a computing system can be optimized for different types of operations, secure computing tasks, etc. The components shown herein, and their functions, are meant to be examples, and are not meant to limit implementations of the technology described and/or claimed in this document.

The computing device 1410 includes processor(s) 1420, memory device(s) 1430, storage device(s) 1440, and interface(s) 1450. Each of the processor(s) 1420, the memory device(s) 1430, the storage device(s) 1440, and the interface(s) 1450 are interconnected using a system bus 1460. The processor(s) 1420 are capable of processing instructions for execution within the computing device 1410, and can include one or more single-threaded and/or multi-threaded processors. The processor(s) 1420 are capable of processing instructions stored in the memory device(s) 1430 and/or on the storage device(s) 1440. The memory device(s) 1430 can store data within the computing device 1410, and can include one or more computer-readable media, volatile memory units, and/or non-volatile memory units. The storage device(s) 1440 can provide mass storage for the computing device 1410, can include various computer-readable media (e.g., a floppy disk device, a hard disk device, a tape device, an optical disk device, a flash memory or other similar solid state memory device, or an array of devices, including devices in a storage area network or other configurations), and can provide date security/encryption capabilities.

The interface(s) 1450 can include various communications interfaces (e.g., USB, Near-Field Communication (NFC), Bluetooth, WiFi, Ethernet, wireless Ethernet, etc.) that can be coupled to the network(s) 1470, peripheral device(s) 1480, and/or data source(s) 1490 (e.g., through a communications port, a network adapter, etc.). Communication can be provided under various modes or protocols for wired and/or wireless communication. Such communication can occur, for example, through a transceiver using a radiofrequency. As another example, communication can occur using light (e.g., laser, infrared, etc.) to transmit data. As another example, short-range communication can occur, such as using Bluetooth, WiFi, or other such transceiver. In addition, a GPS (Global Positioning System) receiver module can provide location-related wireless data, which can be used as appropriate by device applications. The interface(s) 1450 can include a control interface that receives commands from an input device (e.g., operated by a user) and converts the commands for submission to the processors 1420. The interface(s) 1450 can include a display interface that includes circuitry for driving a display to present visual information to a user. The interface(s) 1450 can include an audio codec which can receive sound signals (e.g., spoken information from a user) and convert it to usable digital data. The audio codec can likewise generate audible sound, such as through an audio speaker. Such sound can include real-time voice communications, recorded sound (e.g., voice messages, music files, etc.), and/or sound generated by device applications.

The network(s) 1470 can include one or more wired and/or wireless communications networks, including various public and/or private networks. Examples of communication networks include a LAN (local area network), a WAN (wide area network), and/or the Internet. The communication networks can include a group of nodes (e.g., computing devices) that are configured to exchange data (e.g., analog messages, digital messages, etc.), through telecommunications links. The telecommunications links can use various techniques (e.g., circuit switching, message switching, packet switching, etc.) to send the data and other signals from an originating node to a destination node. In some implementations, the computing device 1410 can communicate with the peripheral device(s) 1480, the data source(s) 1490, and/or other computing devices over the network(s) 1470. In some implementations, the computing device 1410 can directly communicate with the peripheral device(s) 1480, the data source(s), and/or other computing devices.

The peripheral device(s) 1480 can provide input/output operations for the computing device 1410. Input devices (e.g., keyboards, pointing devices, touchscreens, microphones, cameras, scanners, sensors, etc.) can provide input to the computing device 1410 (e.g., user input and/or other input from a physical environment). Output devices (e.g., display units such as display screens or projection devices for displaying graphical user interfaces (GUIs)), audio speakers for generating sound, tactile feedback devices, printers, motors, hardware control devices, etc.) can provide output from the computing device 1410 (e.g., user-directed output and/or other output that results in actions being performed in a physical environment). Other kinds of devices can be used to provide for interactions between users and devices. For example, input from a user can be received in any form, including visual, auditory, or tactile input, and feedback provided to the user can be any form of sensory feedback (e.g., visual feedback, auditory feedback, or tactile feedback).

The data source(s) 1490 can provide data for use by the computing device 1410, and/or can maintain data that has been generated by the computing device 1410 and/or other devices (e.g., data collected from sensor devices, data aggregated from various different data repositories, etc.). In some implementations, one or more data sources can be hosted by the computing device 1410 (e.g., using the storage device(s) 1440). In some implementations, one or more data sources can be hosted by a different computing device. Data can be provided by the data source(s) 1490 in response to a request for data from the computing device 1410 and/or can be provided without such a request. For example, a pull technology can be used in which the provision of data is driven by device requests, and/or a push technology can be used in which the provision of data occurs as the data becomes available (e.g., real-time data streaming and/or notifications). Various sorts of data sources can be used to implement the techniques described herein, alone or in combination.

In some implementations, a data source can include one or more data store(s) 1490a. The database(s) can be provided by a single computing device or network (e.g., on a file system of a server device) or provided by multiple distributed computing devices or networks (e.g., hosted by a computer cluster, hosted in cloud storage, etc.). In some implementations, a database management system (DBMS) can be included to provide access to data contained in the database(s) (e.g., through the use of a query language and/or application programming interfaces (APIs)). The database(s), for example, can include relational databases, object databases, structured document databases, unstructured document databases, graph databases, and other appropriate types of databases.

In some implementations, a data source can include one or more blockchains 1490b. A blockchain can be a distributed ledger that includes blocks of records that are securely linked by cryptographic hashes. Each block of records includes a cryptographic hash of the previous block, and transaction data for transactions that occurred during a time period. The blockchain can be hosted by a peer-to-peer computer network that includes a group of nodes (e.g., computing devices) that collectively implement a consensus algorithm protocol to validate new transaction blocks and to add the validated transaction blocks to the blockchain. By storing data across the peer-to-peer computer network, for example, the blockchain can maintain data quality (e.g., through data replication) and can improve data trust (e.g., by reducing or eliminating central data control).

In some implementations, a data source can include one or more machine learning systems 1490c. The machine learning system(s) 1490c, for example, can be used to analyze data from various sources (e.g., data provided by the computing device 1410, data from the data store(s) 1490a, data from the blockchain(s) 1490b, and/or data from other data sources), to identify patterns in the data, and to draw inferences from the data patterns. In general, training data 1492 can be provided to one or more machine learning algorithms 1494, and the machine learning algorithm(s) can generate a machine learning model 1496. Execution of the machine learning algorithm(s) can be performed by the computing device 1410, or another appropriate device. Various machine learning approaches can be used to generate machine learning models, such as supervised learning (e.g., in which a model is generated from training data that includes both the inputs and the desired outputs), unsupervised learning (e.g., in which a model is generated from training data that includes only the inputs), reinforcement learning (e.g., in which the machine learning algorithm(s) interact with a dynamic environment and are provided with feedback during a training process), or another appropriate approach. A variety of different types of machine learning techniques can be employed, including but not limited to convolutional neural networks (CNNs), deep neural networks (DNNs), recurrent neural networks (RNNs), and other types of multi-layer neural networks.

Various implementations of the systems and techniques described herein can be realized in digital electronic circuitry, integrated circuitry, specially designed ASICs (application specific integrated circuits), computer hardware, firmware, software, and/or combinations thereof. A computer program product can be tangibly embodied in an information carrier (e.g., in a machine-readable storage device), for execution by a programmable processor. Various computer operations (e.g., methods described in this document) can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, by a computer to perform a certain activity or bring about a certain result. A computer program can be written in any form of programming language, including compiled or interpreted languages, and can be deployed in any form, including as a stand-alone program or as a module, component, subroutine, or other unit suitable for use in a computing environment. A computer program product can be a computer- or machine-readable medium, such as a storage device or memory device. As used herein, the terms machine-readable medium and computer-readable medium refer to any computer program product, apparatus and/or device (e.g., magnetic discs, optical disks, memory, etc.) used to provide machine instructions and/or data to a programmable processor, including a machine-readable medium that receives machine instructions as a machine-readable signal. The term machine-readable signal refers to any signal used to provide machine instructions and/or data to a programmable processor.

Suitable processors for the execution of a program of instructions include, by way of example, both general and special purpose microprocessors, and can be a single processor or one of multiple processors of any kind of computer. Generally, a processor will receive instructions and data from a read-only memory or a random access memory or both. The elements of a computer are a processor for executing instructions and one or more memory devices for storing instructions and data. Generally, a computer can also include, or can be operatively coupled to communicate with, one or more mass storage devices for storing data files. Such devices can include magnetic disks (e.g., internal hard disks and/or removable disks), magneto-optical disks, and optical disks. Storage devices suitable for tangibly embodying computer program instructions and data can include all forms of non-volatile memory, including by way of example semiconductor memory devices, flash memory devices, magnetic disks (e.g., internal hard disks and removable disks), magneto-optical disks, and optical disks. The processor and the memory can be supplemented by, or incorporated in, ASICs (application-specific integrated circuits).

The systems and techniques described herein can be implemented in a computing system that includes a back end component (e.g., a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). The computer system can include clients and servers, which can be generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for just-in-time (JIT) game development and gameplay, the system comprising:
   a game engine;
   an oracle comprising one or more AI models, wherein the oracle is called by the game engine during JIT game development and JIT gameplay; and
   a data store that is in network communication with the game engine,
   wherein the game engine is configured to perform a process comprising:
      receiving user input from a user device of a player to build a new JIT game world;
      generating the new JIT game world based on processing, by the oracle, the user input;
      generating, in the data store and based on the user input, data field entries in an encyclopedia associated with the new JIT game world for the player;
      providing the new JIT game world with corresponding JIT gameplay to the user device for presentation in a user interface (UI); and
      continuously:
         receiving user input from the user device for playing in the new JIT game world as the new JIT game world is generated,
         updating the new JIT game world and the corresponding JIT gameplay based on processing, by the oracle and based on the data field entries in the encyclopedia associated with the new JIT game world for the player that is maintained in the data store, the continuously-received user input and the JIT gameplay, wherein updating the new JIT game world and the corresponding JIT gameplay comprises:
            annotating entities in the new JIT game world with universally unique identifiers (uuids) based on the continuously-received user input,
            linking the uuids to one or more of the data field entries in the encyclopedia to establish data connections between the entities in the new JIT game world and the continuously-received user input, and
            generating, responsive to the continuously-received user input and based on the data connections, actions in the new JIT game world; and
         generating, based on the JIT gameplay and the actions in the new JIT game world, updates to the data field entries in the encyclopedia associated with the new JIT game world for the player that is maintained in the data store.

2. The system of claim 1, wherein the updates to the data field entries in the encyclopedia associated with the new JIT game world are generated in parallel with providing the JIT gameplay to the player at the user device.

3. The system of claim 1, wherein the updates to the data field entries in the encyclopedia associated with the new JIT game world are generated as background processes while providing the JIT gameplay to the player at the user device.

4. The system of claim 1, wherein the oracle comprises one or more pre-trained AI models or systems.

5. The system of claim 1, wherein providing the JIT gameplay to the user device comprises providing instructions to cause the user device to visualize the new JIT game world in the UI.

6. The system of claim 5, wherein the process further comprises simultaneously or in parallel to transmitting, to the user device, the instructions for visualizing the new JIT game world, updating one or more of the data field entries in the encyclopedia associated with the JIT gameplay based on the user input.

7. The system of claim 5, wherein the process further comprises:
   simultaneously or in parallel to transmitting the instructions for visualizing the new JIT game world, trimming, using the oracle, a context of the JIT gameplay; and
   transmitting a transitional message for presentation at the user device, wherein the transitional message indicates that a transition is occurring between first and second game modes.

8. The system of claim 1, wherein the data field entries in the encyclopedia associated with the JIT gameplay comprise at least one of a game environment data, player data, nonplayer character data, game events data, game locations data, plot hooks data, or narrative state data.

9. The system of claim 1, wherein providing the JIT gameplay to the user device for presentation comprises:
   checking whether a transition between game modes is required; and
   in response to checking that the transition between the game modes is required, changing one or more system behaviors.

10. The system of claim 9, wherein the game modes comprise one or more from a group consisting of: a game setting setup mode, a character creation mode, a narrative gameplay mode, and a combat mode.

11. The system of claim 1, wherein generating the updates to the data field entries in the encyclopedia associated with the new JIT game world comprises:
   looping through one or more of the data field entries in the encyclopedia that is stored in the data store;
   populating, by the oracle and based on the looping, one or more basic fields in the encyclopedia;
   upserting, by the oracle, one or more well-defined objects in the encyclopedia;
   processing, by the oracle and based on the looping, hash-table data structures to update one or more entries in the encyclopedia;
   processing, by the oracle and based on the looping, a list to update one or more indexed data entry fields in the list; and
   returning information about the one or more data entry fields.

12. The system of claim 11, wherein processing, by the oracle and based on the looping, the hash-table data structures comprises:
   checking for existing keys;
   checking for new keys; and
   looping through the existing keys or the new keys to update one or more data entry fields associated with the existing keys or the new keys.

13. The system of claim 11, wherein processing, by the oracle and based on the looping, the list comprises:
   establishing a change plan;
   looping through the change plan; and
   processing each of the one or more indexed data entry fields in the list/array based on the change plan.

14. The system of claim 1, wherein providing the JIT gameplay to the user device comprises:
   receiving user input about rolling dice; and
   in response to the user input, initiating, by the oracle, a corresponding roll request.

15. The system of claim 14, wherein the oracle is configured to identify whether a game master (GM), a player, or a non-player character (NPC) is rolling the dice.

16. The system of claim 15, wherein based on identifying that the GM or the NPC is rolling the dice, the game engine is configured to automatically roll the dice.

17. The system of claim 15, wherein based on identifying that the player is rolling the dice, the game engine is configured to transmit the roll request to the user device that causes the user device to present, in the one or more UIs, information about a specific dice roll.

18. The system of claim 17, wherein the roll request includes a title and description of the dice roll to contextualize the request to the player at the user device.

19. The system of claim 14, wherein the game engine is configured to automatically link an outcome from the dice roll with one or more of the data entry fields in the encyclopedia that is maintained in the data store.

20. The system of claim 19, wherein the one or more data entry fields correspond to one or more of an ability, an effect, and an item in the new JIT game world.

21. The system of claim 1, wherein the game engine is further configured to:
   link the uuids to a knowledge graph to establish data connections between the actions in the new JIT game world during the JIT gameplay, the entities in the new JIT game world, and the continuously-received user input.

22. The system of claim 1, wherein the game engine is further configured to establish a game marketplace for publishers and players of their respective JIT game worlds to produce encyclopedia game states, wherein the encyclopedia game states are traded, shared, sold, and provided to the players in the marketplace.

23. The system of claim 1, wherein the encyclopedia comprises a game representation for the new JIT game world.

24. The system of claim 1, wherein the process further comprises:
   receiving a document comprising information for establishing the encyclopedia for the new JIT game world;
   converting the document into a markdown representation;
   populating the data field entries in the encyclopedia based on the markdown representation; and
   plugging the markdown representation into an architecture of the game engine to be played by the player at the user device.

25. The system of claim 1, wherein the process further comprises:
   providing the JIT gameplay to a plurality of user devices, the plurality of user devices including the user device; and
   attributing actions and inputs to players of the plurality of user devices to enforce narrative consistency during the JIT gameplay in the new JIT game world for the players of the plurality of user devices.

26. A method for just-in-time (JIT) game development and gameplay, the method comprising:
   receiving user input from a user device to build a new JIT game world;

generating the new JIT game world based on processing, by an oracle, the user input;

generating, in a data store and based on the user input, data field entries in an encyclopedia associated with the new JIT game world for a player associated with the user device;

providing the new JIT game world with corresponding JIT gameplay to the user device for presentation in a UI; and continuously:
receiving user input from the user device for playing in the new JIT game world as the new JIT game world is generated, updating the new JIT game world and the corresponding JIT gameplay based on processing, by the oracle and based on the data field entries in the encyclopedia associated with the new JIT game world for the player that is maintained in the data store, the continuously-received user input and the JIT gameplay, wherein updating the new JIT game world and the corresponding JIT gameplay comprises:
annotating entities in the new JIT game world with universally unique identifiers (uuids) based on the continuously-received user input,
linking the uuids to one or more of the data field entries in the encyclopedia to establish data connections between the entities in the new JIT game world and the continuously-received user input, and
generating, responsive to the continuously-received user input and based on the data connections, actions in the new JIT game world; and generating, based on the JIT gameplay and the actions in the new JIT game world, updates to the new JIT game world.

27. The method of claim 26, wherein generating the updates to the new JIT game world comprises updating one or more of the data field entries in the encyclopedia that is associated with the new JIT game world and that is maintained in the data store.

28. The method of claim 26, wherein providing the JIT gameplay to the user device for presentation comprises:
identifying a current game mode in the JIT gameplay;
checking whether a transition is required between the current game mode and a next game mode; and
in response to determining that the transition is required, transmitting a notification for presentation at the user device indicating that the transition will occur while providing the JIT gameplay to the user device for presentation.

29. The method of claim 26, wherein generating the updates to the new JIT game world comprises:
looping through one or more data entry fields in the encyclopedia;
populating, based on the looping, one or more basic fields in the encyclopedia;
upserting one or more well-defined objects in the encyclopedia;
processing, based on the looping, hash-table data structures to update one or more entries in the encyclopedia;
processing, based on the looping, a list to update one or more indexed data entry fields in the list; and
returning information about the one or more data entry fields.

30. The method of claim 26, further comprising:
providing the JIT gameplay to a plurality of user devices, the plurality of user devices including the user device; and
attributing actions and inputs to players of the plurality of user devices to enforce narrative consistency during the JIT gameplay in the new JIT game world for the players of the plurality of user devices.

* * * * *